US011922770B2

(12) United States Patent
Berman et al.

(10) Patent No.: US 11,922,770 B2
(45) **Date of Patent: *Mar. 5, 2024**

(54) GAMING DEVICE HAVING SUBSEQUENT GAME SYMBOL BONUS

(71) Applicant: KING SHOW GAMES, INC., Minnetonka, MN (US)

(72) Inventors: Bradley Berman, Minnetonka, MN (US); Jacob Lamb, Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,356

(22) Filed: May 3, 2021

(65) Prior Publication Data

US 2021/0256818 A1 Aug. 19, 2021

Related U.S. Application Data

(63) Continuation of application No. 16/188,743, filed on Nov. 13, 2018, now Pat. No. 10,997,824, which is a continuation of application No. 14/941,538, filed on Nov. 13, 2015, now Pat. No. 10,127,772.

(60) Provisional application No. 62/079,282, filed on Nov. 13, 2014.

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/3213* (2013.01); *G07F 17/3244* (2013.01); *G07F 17/3258* (2013.01); *G07F 17/34* (2013.01)

(58) Field of Classification Search
CPC ............ G07F 17/3211; G07F 17/3213; G07F 17/3267; G07F 17/34
See application file for complete search history.

(56) References Cited

U.S. PATENT DOCUMENTS

| | | | | |
|---|---|---|---|---|
| 4,700,948 A * | 10/1987 | Okada | G07F 17/34 | 273/143 R |
| 5,456,465 A * | 10/1995 | Durham | G07F 17/34 | 463/21 |
| 5,772,506 A * | 6/1998 | Marks | G07F 17/32 | 463/13 |
| 5,833,537 A | 11/1998 | Barrie | | |
| 6,004,207 A * | 12/1999 | Wilson, Jr. | G07F 17/3244 | 463/20 |
| 6,149,521 A * | 11/2000 | Sanduski | G07F 17/3267 | 463/16 |
| 6,234,897 B1 | 5/2001 | Frohm et al. | | |
| 6,251,013 B1 | 6/2001 | Bennett | | |
| 6,328,649 B1 * | 12/2001 | Randall | G07F 17/34 | 463/20 |
| 6,561,904 B2 | 5/2003 | Locke et al. | | |

(Continued)

*Primary Examiner* — Steven J Hylinski

(57) ABSTRACT

Embodiments of the present invention set forth systems, apparatuses and methods for bonusing symbols in subsequent games of gaming devices based on a current game outcome. Accordingly, a gaming device can be configured to initiate and display a first gaming event on a game display of the gaming device. If one or more symbols appear as part of a predefined criterion, such as being part of a winning symbol combination, the one or more symbols may be associated with a modifier, such as a multiplier, in one or more subsequent gaming events.

1 Claim, 42 Drawing Sheets

(56) References Cited

U.S. PATENT DOCUMENTS

| | | | | |
|---|---|---|---|---|
| 6,612,927 | B1 * | 9/2003 | Slomiany | G07F 17/3267 463/16 |
| 7,121,942 | B2 | 10/2006 | Baerlocher | |
| 7,147,559 | B2 | 12/2006 | Englman | |
| 7,258,611 | B2 | 8/2007 | Bigelow, Jr. et al. | |
| 7,530,894 | B1 | 5/2009 | Marks et al. | |
| 7,704,141 | B1 | 4/2010 | Marks et al. | |
| 7,740,245 | B2 | 6/2010 | Tarantino | |
| 7,922,575 | B2 | 4/2011 | Jankowski | |
| 8,021,224 | B2 | 9/2011 | Marks et al. | |
| 8,021,226 | B2 * | 9/2011 | Souza | G07F 17/34 463/20 |
| 8,062,124 | B2 | 11/2011 | Jaffe | |
| 8,272,938 | B2 | 9/2012 | Gilmore et al. | |
| 8,535,143 | B2 | 9/2013 | Hornik et al. | |
| 8,690,659 | B2 | 4/2014 | Moody | |
| 9,138,634 | B2 | 9/2015 | Moody | |
| 9,633,522 | B2 | 4/2017 | Berman | |
| 9,870,677 | B1 * | 1/2018 | Nottke | G07F 17/3293 |
| 10,997,824 | B2 * | 5/2021 | Berman | G07F 17/3211 |
| 2002/0025846 | A1 | 2/2002 | Bennett et al. | |
| 2003/0013517 | A1 | 1/2003 | Bennett et al. | |
| 2003/0036420 | A1 | 2/2003 | Baerlocher et al. | |
| 2003/0036423 | A1 | 2/2003 | Vancura | |
| 2003/0054875 | A1 | 3/2003 | Marks et al. | |
| 2003/0162585 | A1 * | 8/2003 | Bigelow, Jr. | G07F 17/34 463/20 |
| 2004/0038731 | A1 * | 2/2004 | Englman | G07F 17/3244 463/25 |
| 2004/0048646 | A1 | 3/2004 | Visocnik | |
| 2004/0087359 | A1 | 5/2004 | Cuddy et al. | |
| 2004/0180716 | A1 * | 9/2004 | Seelig | G07F 17/3227 463/20 |
| 2004/0219969 | A1 | 11/2004 | Casey et al. | |
| 2004/0235552 | A1 * | 11/2004 | Gauselmann | A63F 13/00 463/16 |
| 2004/0248641 | A1 * | 12/2004 | Jarvis | G07F 17/3225 463/20 |
| 2005/0148384 | A1 | 7/2005 | Marks et al. | |
| 2008/0076496 | A1 | 3/2008 | Baerlocher et al. | |
| 2008/0146305 | A1 * | 6/2008 | Moody | G07F 17/3244 463/13 |
| 2008/0311973 | A1 * | 12/2008 | Jaffe | G07F 17/3258 463/20 |
| 2009/0124326 | A1 * | 5/2009 | Caputo | G07F 17/34 463/20 |
| 2009/0227356 | A1 | 9/2009 | Moroney | |
| 2010/0062829 | A1 | 3/2010 | Chan | |
| 2010/0190542 | A1 | 7/2010 | Mizue | |
| 2011/0151961 | A1 | 6/2011 | Stevens et al. | |
| 2014/0031099 | A1 | 1/2014 | Williams | |
| 2014/0335931 | A1 * | 11/2014 | Kemper | G07F 17/326 463/20 |
| 2017/0124799 | A1 * | 5/2017 | Berman | G07F 17/3213 |
| 2018/0130296 | A1 | 5/2018 | Berman et al. | |
| 2019/0051096 | A1 | 2/2019 | San | |

* cited by examiner

GAMING DEVICE HAVING SUBSEQUENT GAME SYMBOL BONUS

RELATED APPLICATIONS

This application is a continuation of U.S. application Ser. No. 16/188,743, filed Nov. 13, 2018, now U.S. Pat. No. 10,997,824, which is a continuation of U.S. application Ser. No. 14/941,538, filed Nov. 13, 2015, now U.S. Pat. No. 10,127,772, which claims the benefit of Provisional Patent Application No. 62/079,282, filed on Nov. 13, 2014, to which priority is claimed pursuant to 35 U.S.C. § 119(e) and which is incorporated herein by reference in its entirety.

FIELD OF THE INVENTION

This disclosure relates generally to games, and more particularly to systems, apparatuses and methods for bonusing symbols in subsequent games of gaming devices based on a current game outcome.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming" As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate bonusing symbols in subsequent games of gaming devices based on a current game outcome. In one embodiment, a gaming device includes a display and a processor that is operable to initiate a first gaming event, determine an outcome of the first gaming event, and display the determined outcome of the first gaming event on the display. The processor is further operable to identify each symbol used in a symbol combination associated with an award in a predefined paytable from the determined outcome of the first gaming event, and associate a bonus condition with the identified symbols. Additionally, the processor is operable to initiate a second gaming event, determine an outcome of the second gaming event, and display the determined outcome of the second gaming event on the display. The processor is further operable to modify any symbols or symbol combinations associated with a bonus condition from the first gaming event.

DETAILED DESCRIPTION

Figure 1:
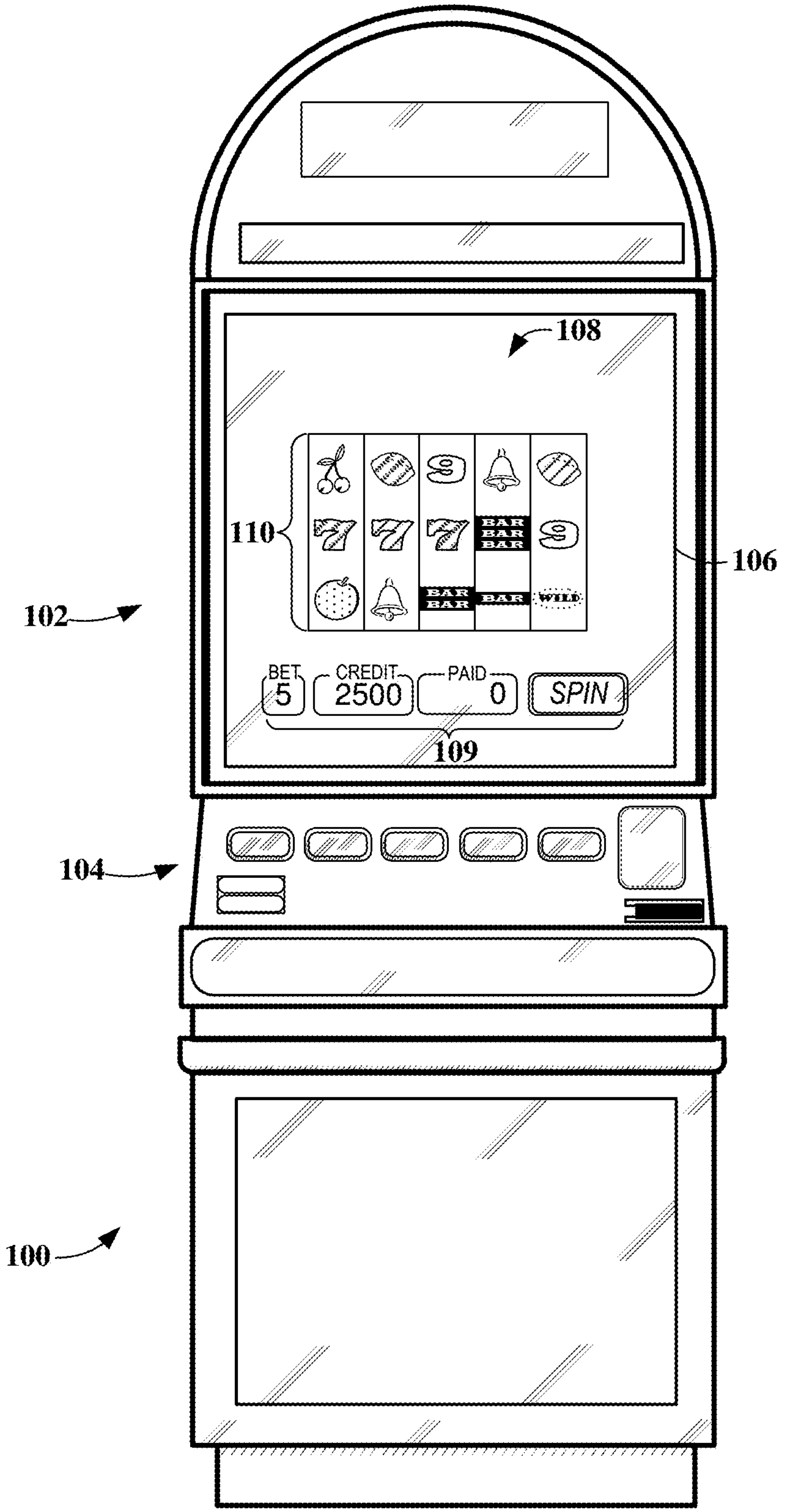
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Additionally, the terms "games" and "gaming events" are used in conjunction with describing embodiments of the invention. These terms may be used interchangeably to describe a single game of chance, such as the process of receiving a wager through paying any awards associated with an outcome on the game of chance, or may describe a portion of a game of chance, such as a process step or stage within a single game of chance. Additionally, these terms may refer to multiple games of chance. In one example, a gaming event may refer to a single stage of a multi-stage game of chance, such as base game portion of a game of chance. In another example, a gaming event may refer to multiple "free games" in a bonus won as a result of a base game portion of a game of chance. Hence, the terms "game" or "gaming event" should not be limited to a specific description, illustration, or embodiment.

Generally, systems, apparatuses and methods are described for enhancing winning result opportunities in gaming activities by bonusing symbols in subsequent games of gaming devices based on a current game outcome. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc.

Further, the disclosure may be applied to games of chance, and descriptions provided in the context of any representative game (e.g. slot game) are provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that utilizes operations of bonusing symbols in subsequent games of gaming devices based on a current game outcome. In one embodiment, a gaming device includes a display and a processor that is operable to initiate a first gaming event, determine an outcome of the first gaming event, and display the determined outcome of the first gaming event on the display. The processor is further operable to identify each symbol used in a symbol combination associated with an award in a predefined paytable from the determined outcome of the first gaming event, and associate a bonus condition with the identified symbols. Additionally, the processor is operable to initiate a second gaming event, determine an outcome of the second gaming event, and display the determined outcome of the second gaming event on the display. The processor is further operable to modify any symbols or symbol combinations associated with a bonus condition from the first gaming event.

In some embodiments a side wager may be required for a player to be eligible for the symbol bonuses in the subsequent games. Here, the amount of the side wager may determine which, if any, symbols are eligible for the bonusing in the subsequent games. Alternatively, the amount of the side wager may determine the type or amount of the symbol bonusing in the subsequent games. In other embodiments, the side wager may be a consistent amount relative to the primary wager on the game. In yet other embodiments, no side wager may be required for the symbol bonusing game enhancement to be active.

The bonusing of symbols or symbol combinations in one or more subsequent games may be part of a series of separate games of chance with separate wagers, and/or may be active during a bonus event, such as a "free games" or "free spins" bonus event, within a single game of chance.

The bonusing of symbols in subsequent games may be triggered by a game outcome received in a current gaming event. Alternatively, the symbol bonusing in the subsequent game or games may be triggered in part or in whole by a random determination made in the current game. In one example embodiment, a winning symbol combination received in a current game bonuses the symbols similar to the symbols used in the winning symbol combination in one or more future games. For example, in a five reel slot game a game outcome including the symbols M1 M1 M1 xx xx (that is three "M1" symbols and two other non-M1 symbols) creates a three symbol win in the current game and bonuses the M1 symbols in the next (second) game of chance In this second game, if, for example, the player receives M1 M1 M1 M1 xx on a played payline, the player would receive a bonus. Examples of possible bonusing are provided below.

The symbol bonusing in the one or more subsequent games can be quite different depending on the implemented embodiment. In some embodiments, the bonused symbols in the subsequent game are associated with a multiplier. In the above example using the "M1" symbol combinations, any winning symbol combinations in the second (subsequent) game that included one or more M1 symbols may be given a "5×" multiplier so that award for that symbol combination is multiplied by "5." The multiplier may be predetermined, may be based on an amount of a side wager, may be randomly selected from a table of possible multipliers, may be based on the number of M1 symbols received in the first game, or may be based on the number of M1 symbols received in the second game. For example, in the above M1 example, each M1 symbol used in a winning symbol combination in the second game may be given a "2×" multiplier. Thus, since four "M1" symbols were received in the second game, the award associated with a symbol combination of four "M1" symbols would be multiplied by 16× (2× for each of the M1 symbols received multiplied together). Alternatively, these multipliers may be summed rather than multiplied. In these embodiments, the above four "M1" symbol combination in the second game would have the corresponding award multiplied by 8× (2×+2×+2×+2×).

In other embodiments, symbols bonused in a subsequent game may be given a bonus credit value. These bonus credit values may correspond to the number of symbols used in symbol combination in the subsequent game, may be fixed for any number of symbols in the subsequent symbol combination, may depend on the amount of a side wager, and/or may depend on another game condition. In the above example with the M1 symbols, the second game may be given a fixed credit bonus award of 100 credits times a coin/line bet. Here, the amount of the bonus award associated with the symbols is fixed regardless of the number of symbols received in the winning symbol combination in the second game. In other embodiments, each M1 symbol received in the second game may be associated with a bonus credit value. In some embodiments, the symbols received in the second game do not need to be part of a winning symbol combination. Rather the bonus credits are awarded solely based on them appearing on the game grid in the second game outcome. In other embodiments, the symbols are required to be part of a winning symbol combination in order to have the bonus credits awarded to the player. In some embodiments, the value of each received bonused symbol goes up in the second game. For example, Table 1 may be used to determine the bonus value of the M1 symbols in the second game in a 5×3 grid using the above described example

TABLE 1

| Number of Symbols Received in Subsequent Game | Credits for Incremental Symbol Received | Total Bonus for Number of Symbols Received |
|---|---|---|
| 1 | 2 | 2 |
| 2 | 3 | 5 |
| 3 | 5 | 10 |
| 4 | 10 | 20 |
| 5 | 25 | 45 |
| 6 | 35 | 80 |
| 7 | 50 | 120 |
| 8 | 80 | 200 |
| 9 | 100 | 300 |
| 10 | 150 | 450 |
| 11 | 200 | 650 |
| 12 | 250 | 900 |
| 13 | 300 | 1200 |
| 14 | 400 | 1600 |
| 15 | 900 | 2500 |

While the above example uses predefined values, other embodiments may randomly select values from a weighted table to associate with the bonused symbols received in the second game.

In yet other embodiments, the bonused symbols in the subsequent game or games are used to trigger a bonus game. The bonus game may be a second screen bonus, or may be bonus played directly on the game grid. In one example embodiment, each bonused symbol on the game grid may become active and can be selected to reveal a prize. The bonus symbols may need to be part of a winning symbol combination to be eligible for this selection bonus. Alternatively, a minimum number or any received bonus symbols may be activated and associated with an award when selected by a player. In another example embodiment, receiving a winning combination of bonused symbols (or a minimum number of bonused symbols on the game grid) may trigger a second screen bonus, such as a free games bonus, a pick bonus, or any other type of second screen bonus.

In other embodiments, the bonused symbols are bonused by adding one or more symbols to the symbol combination received in the second game. In the above example using M1, the four received M1 symbols in the second game may be bonused by adding another M1 symbol so that it pays as a five-symbol M1 combination from the paytable instead of a four-symbol M1 combination. This may be especially useful if three M1 symbols are required for an award in the paytable, since two M1 symbols received in the second game would be bumped up to a three-symbol M1 combination and provided with an award. Here, if a five-symbol M1 combination was received in the second game, a multiplier may be given or randomly chosen to multiply the award associated with the five-symbol M1 combination. Alternatively, six-symbol pays for each type of eligible symbol may be defined in the paytable. Other types of bonusing are also possible in other embodiments for five-symbol combinations received in second or subsequent games.

In other embodiments, each received M1 symbol may be split into two M1 symbols in the same symbol location (that is, each symbol location with M1 may be subdivided into two or more subsections where each subsection is associated with an M1 symbol. In the above example, if each M1 symbol split into two M1 symbols, an eight-symbol M1 symbol combination would be received. In some embodiments, each bonused symbol has a random chance of being split into two or more symbols.

The bonusing of the symbols can last only for the next game or may continue beyond the second game. In some embodiments, the symbol may be bonused as long as a winning symbol combination using the bonused symbols is received. In addition, the bonusing awards associated with the bonuses symbol may be increased for the third and subsequent games. In the above M1 symbol example where a three-symbol M1 symbol combination was received in the first game, and a four-symbol M1 symbol combination was received in the second game, suppose that any M1 symbol combination was given a "2×" multiplier for the second game. Therefore, the four-symbol M1 award for the second game was multiplied by 2. However, because another M1 symbol combination was received, the M1 symbols are further bonused for the third game. In this example, another M1 symbol combination received in the third game would be bonused at "10×". This additional bonusing may increase exponentially since the chances of getting "n" number of games in a row with a particular type of symbol combination decreases exponentially.

In some embodiments, other symbol combinations won during the bonusing of a different symbol may begin their own bonusing scheme. In other embodiments, the originally bonused symbols may simply "stay alive" or continue as long as any winning symbol combination is received, although other winning symbol combination may or may not start their own bonusing schemes. In yet other embodiments, a symbol may remain bonused until another symbol combination using it is received. Hence, in the above M1 embodiment, the three-symbol M1 symbol combination may trigger a "2×" multiplier to be activated for any other M1 symbol combination wins. This multiplier may stay active over the next "n" number of games until another winning symbol combination including M1 is received. When this next M1 symbol combination is received, the award associated with it may be multiplied by "2×" and the M1 bonusing may cease until another winning symbol combination is received with M1 symbols. This active streak of bonused symbols may only last for a current player of the gaming device (e.g., as long as there are a minimum number of credits left on the machine), or may continue until they are otherwise ended by receipt of another symbol combination.

In yet other embodiments, the bonusing of the symbol may last for a fixed number of subsequent games (e.g., three games, five games, etc.) or for a fixed amount of time (e.g., 1 minute, 3 minutes, etc.). These fixed numbers may be dependent on the amount of a side wager, a type of triggering win in the current game (e.g., a 3 symbol win may provide bonusing for 3 additional games while a five symbol win may provide bonusing for 10 additional games), or another game condition. In some embodiments, each symbol may be associated with its own meter for a number of remaining games where an associated modifier can be used. In other embodiments, these meters may be entries in a bonus table that shows each bonused symbol, the number of games remaining for that bonused symbol, and a modifier/multiplier value associated with the bonused symbol. Each modifier/multiplier value may be fixed, increasable, or decreasable. The remaining games may also be decremented (or incremented and displayed in the table).

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, or other games of chance. Some of these other types of embodiments will be discussed below as variations to the examples illustrated. However, many other types of games can implement similar techniques and fall within the scope of this inventive concept.

Referring to the example gaming apparatus 100 shown in FIG. 1, the gaming apparatus includes a display area 102 (also referred to as a gaming display), and a player interface area 104, although some or all of the interactive mechanisms included in the user interface area 104 may be provided via graphical icons used with a touch screen in the display area 102 in some embodiments. The display area 102 may include one or more game displays 106 (also referred to as "displays" or "gaming displays") that may be included in physically separate displays or as portions of a common large display. Here, the game display 106 includes a primary game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player loyalty information to identify a user or player of the gaming device. This mechanism may be card reader, biometric scanner, keypad, or other input device. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touchscreen, entering text, entering voice commands, or other known data entry methodology.

The game display 106 in the display area 102 may include one or more of an electronic display, a video display, a mechanical display, and fixed display information, such as paytable information associated with a glass/plastic panel on the gaming machine 100 and/or graphical images. The symbols or other indicia associated with the play of the game may be presented on an electronic display device or on mechanical devices associated with a mechanical display. Generally, the display 106 devotes the largest portion of viewable area to the primary gaming portion 108. The primary gaming portion 108 is generally where the visual feedback for any selected game is provided to the user. The primary gaming portion 108 may render graphical objects such as cards, slot reels, dice, animated characters, and any other gaming visual known in the art. The primary gaming portion 108 also typically informs players of the outcome of any particular event, including whether the event resulted in a win or loss.

In some the example embodiments illustrated herein, the primary gaming portion 108 may display a grid (or equivalent arrangement) of game elements 110 or game element positions (also referred to as "reel stop positions" herein). As illustrated in the embodiment shown in FIG. 1, the grid includes three rows and five columns of game elements 110, which may form a game outcome of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as paytables, navigation controls, etc.

FIGS. 2A-2D, 3A-3H, FIGS. 4A-4F, FIGS. 5A-5D, FIGS. 6A-6D, FIGS. 7A-7F, FIGS. 8A-8F, FIGS. 9A-9F, FIGS. 10A-10F, and FIGS. 11A-11F are detail diagrams of gaming displays showing various example embodiments of game progressions using principles of the invention. Although these specific example embodiments are shown, many additional embodiments and variations are possible that fall within the broad scope and spirit of the invention. In these detail diagrams, some features of the display devices may be omitted or simplified so as not to obscure elements that are being discussed.

Figure 2A:
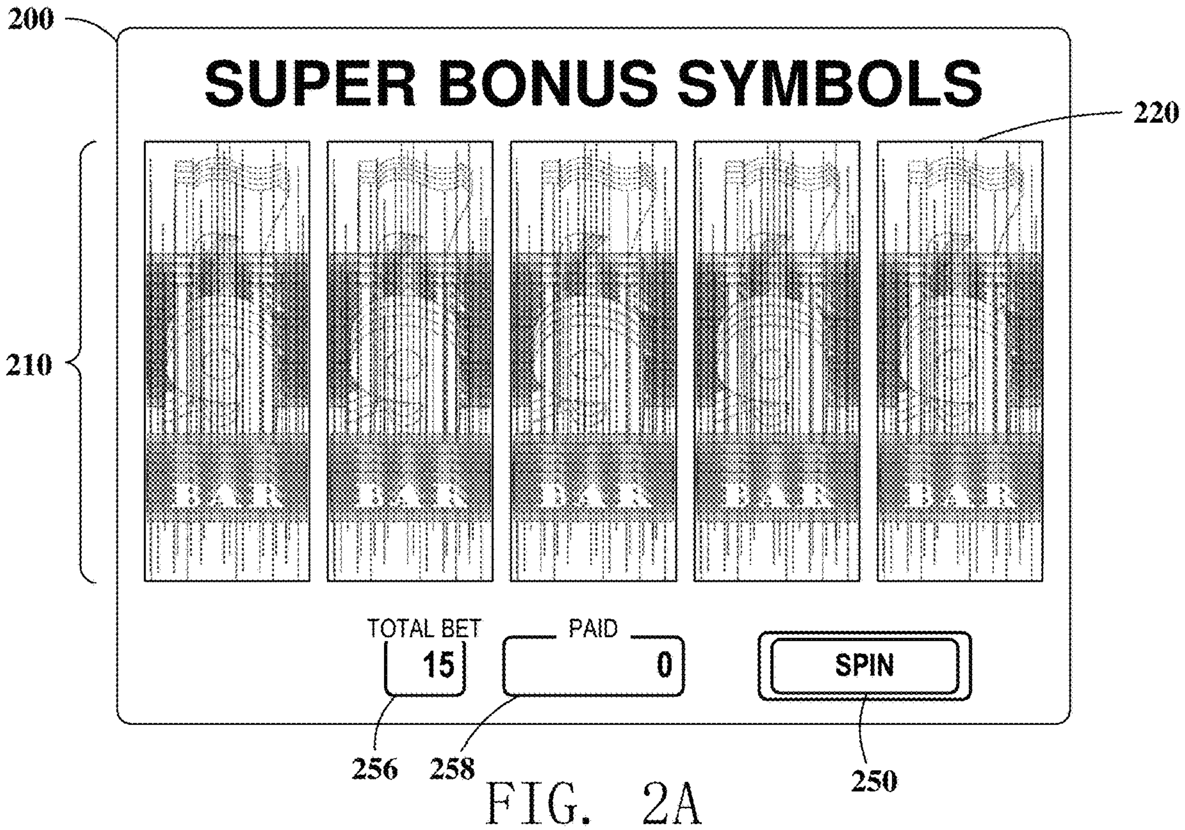
FIGS. 2A-2D are detail diagrams of a gaming device display illustrating an example game progression according to embodiments of the invention.
Figure 2B:
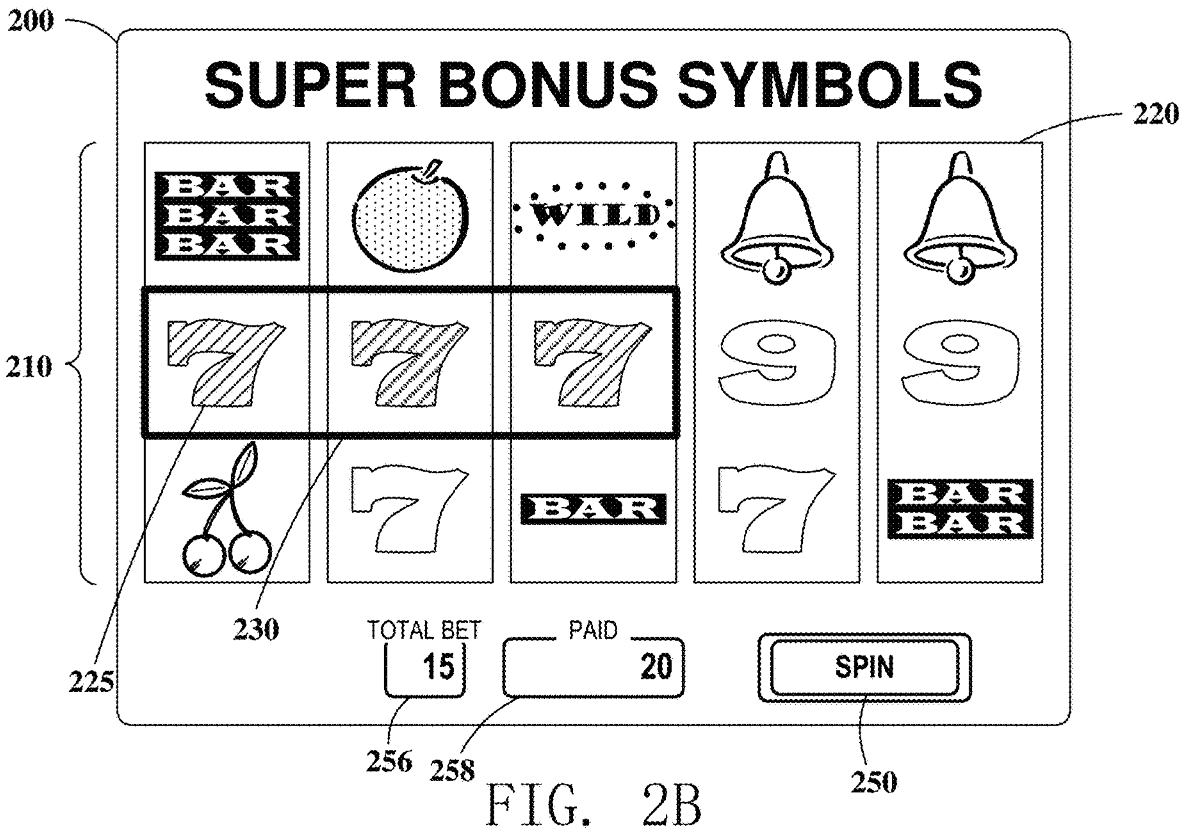

Referring to FIGS. 2A-2D, a gaming display 200 includes a game grid 210 in a game play area displaying portions of multiple game reels 220. The game display also includes a control area having various buttons and meters, such as a "Spin" button 250, a "Total Bet" meter 256, and a "Paid" meter 258. In FIG. 2A, the game reels 220 are spun when a first gaming event is initiated. In FIG. 2B, the game reels 220 are stopped to show a first game outcome in the game grid 210. As shown in FIG. 2B, a symbol combination of "shaded 7" symbols 225 is received on a center horizontal payline, which is emphasized by markings such as win boxes 230 outlining the symbols involved in the winning combination. In other embodiments, these symbols forming a winning symbol combination may be set apart or otherwise emphasized in different manners to communicate to the player that they were a winning combination.

Figure 2C:
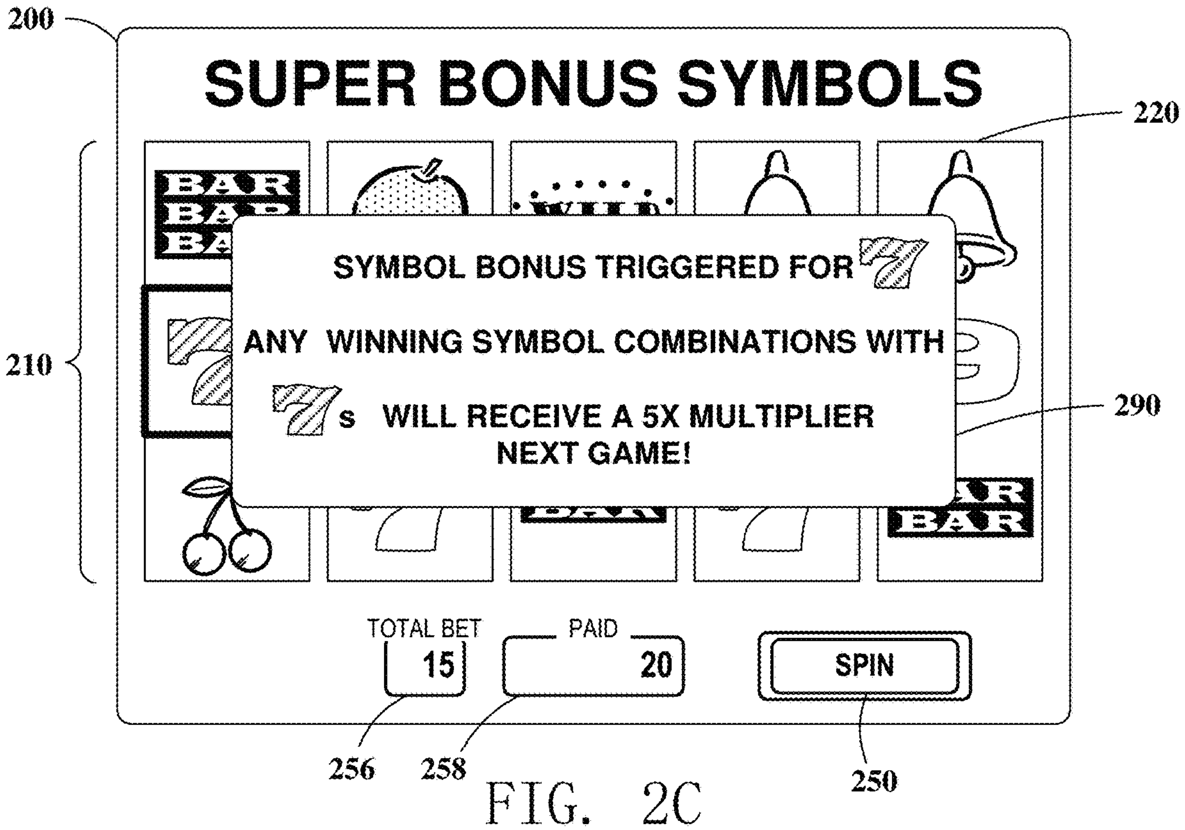
Figure 2D:
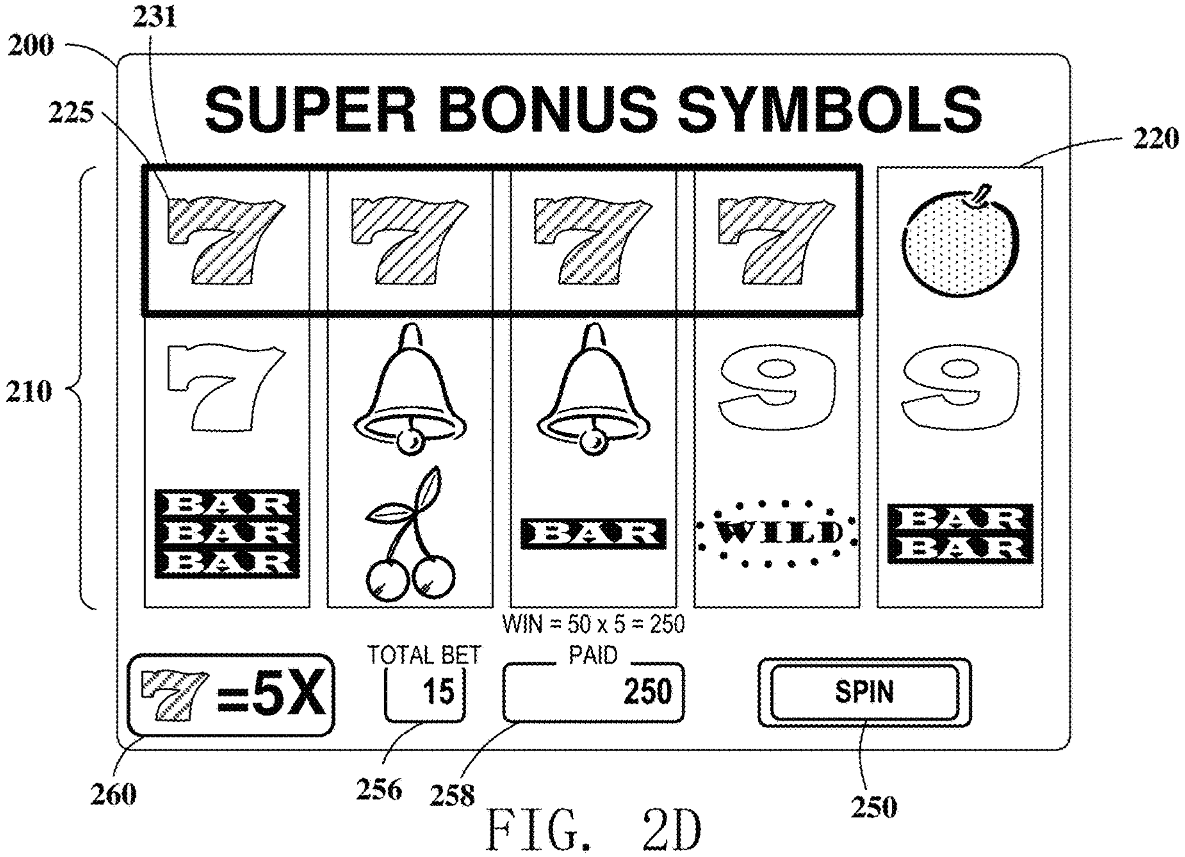

In FIG. 2C, a message box 290 is displayed to inform the player that a bonus has been triggered for the shaded 7s symbols 225, which will be applied in the next gaming event. This bonus is triggered in this example embodiment based on the shaded 7 symbols 225 being involved in a win in the first (current) gaming event. In some embodiments, only specific symbols may be eligible to trigger similar bonuses on subsequent games, where the specific symbols may be predefined or randomly during the first gaming event. In other embodiments, any winning symbol combination may trigger the bonus for similar symbols in subsequent gaming events. Winning symbol combinations are generally those symbol combinations that are associated with awards in a game paytable. In other embodiments, however, bonuses on subsequent symbols may be triggered partially or entirely on other game conditions and/or random/mystery events.

As shown in the message box 290, any winning symbol combinations in the next gaming event that include shaded 7 symbols 225 will have an associated award multiplied by "5×." FIG. 2 D illustrates a second gaming event outcome shown on the game grid 210 of the game display 200. Here, a four-symbol shaded 7 symbol 225 win is received on top horizontal payline as shown by the win box 231. A bonus indicator 260 also shows the current symbol modification bonus that is active for this gaming event, which in this case is a "5×" multiplier associated with the shaded 7 symbols 325. As shown in the Paid Meter 258, the typical 50 credit award associated with the four symbol combination is multiplied by "5×" for a total pay of 250 credits.

Figure 3A:
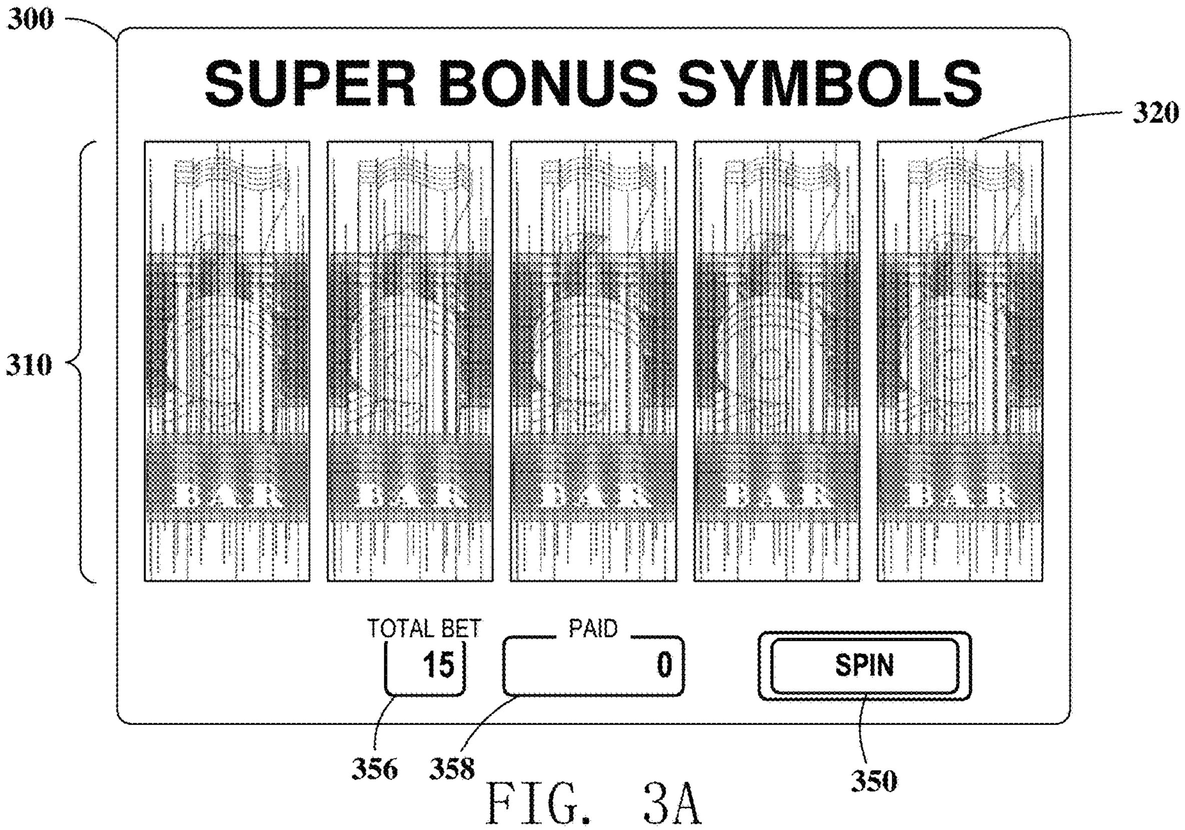
FIGS. 3A-3H are detail diagrams of a gaming device display illustrating another example game progression according to embodiments of the invention.
Figure 3B:
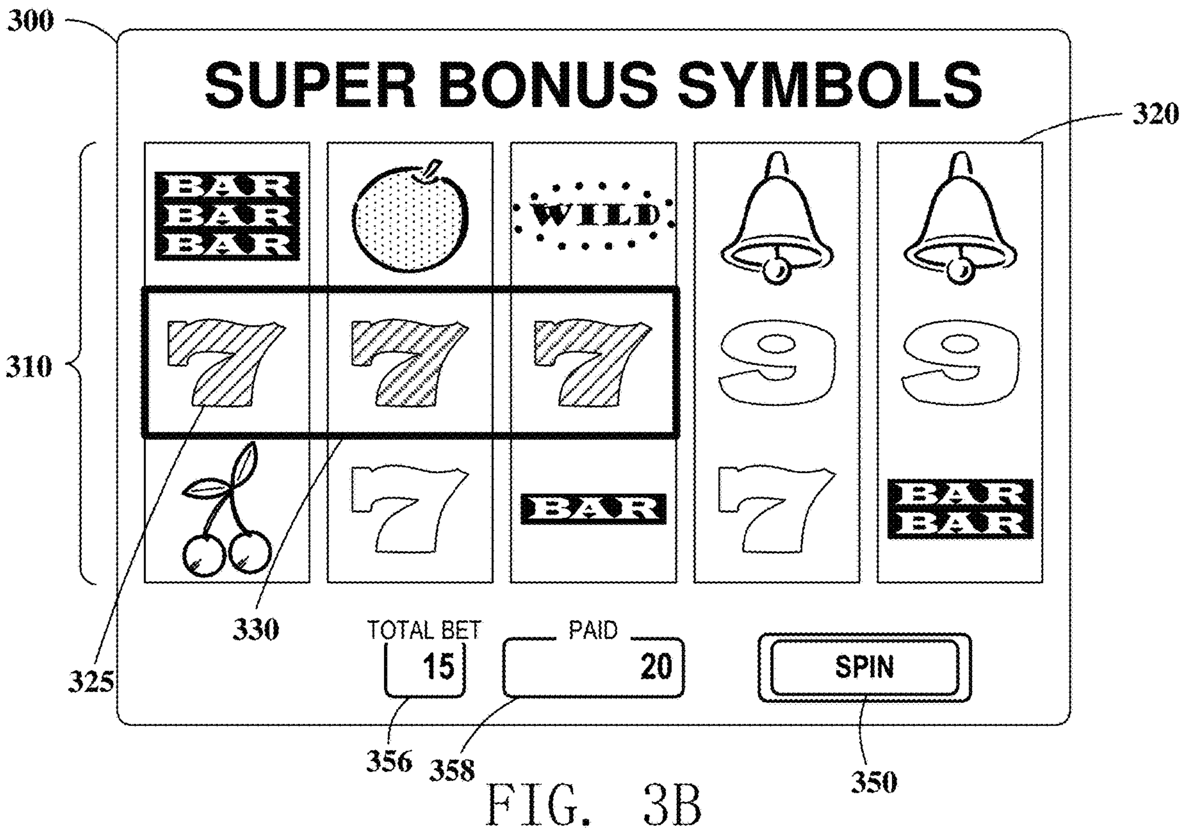

Referring to FIGS. 3A-3H, a gaming display 300 includes a game grid 310 in a game play area displaying portions of multiple game reels 320. The game display also includes a control area having various buttons and meters, such as a "Spin" button 350, a "Total Bet" meter 356, and a "Paid" meter 358. In FIG. 3A, the game reels 320 are spun when a first gaming event is initiated. In FIG. 3B, the game reels 320 are stopped to show a first game outcome in the game grid 310. As shown in FIG. 3B, a symbol combination of "shaded 7" symbols 325 is received on a center horizontal payline, which is emphasized by markings such as win boxes 330 outlining the symbols involved in the winning combination.

Figure 3C:
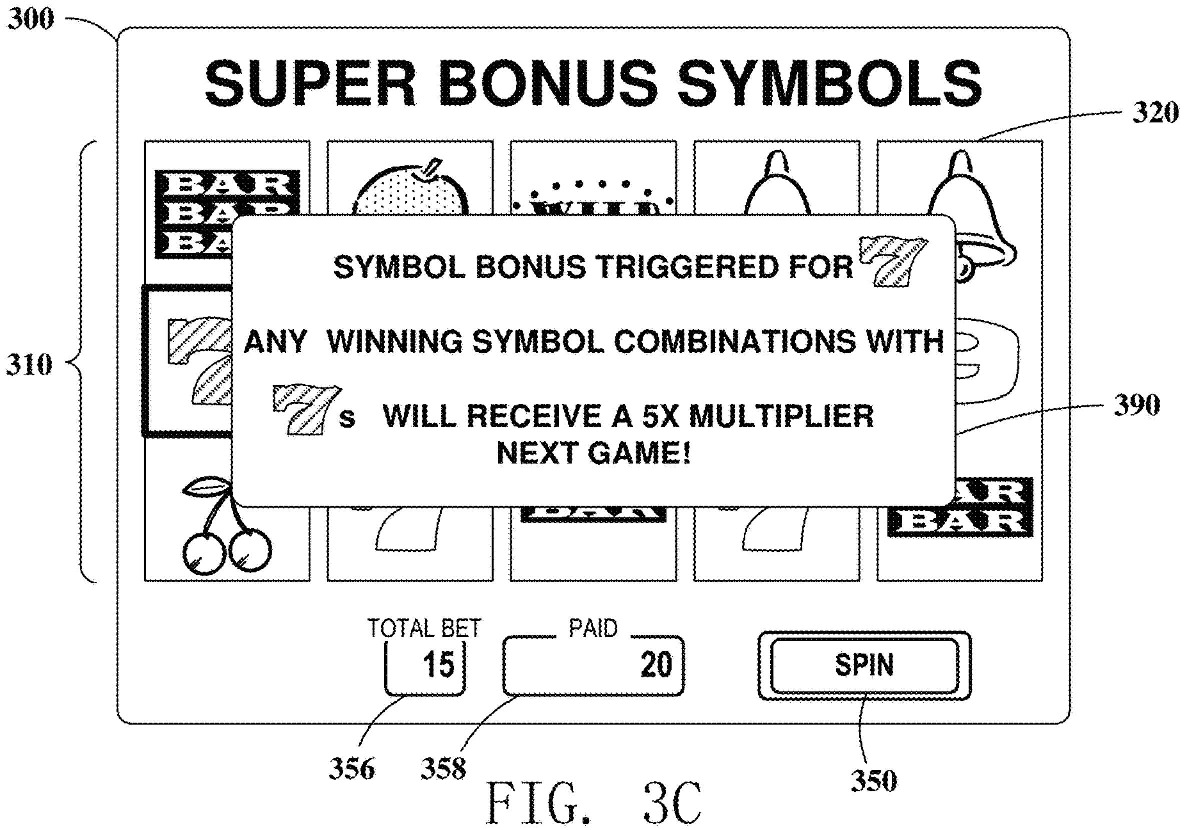
Figure 3D:
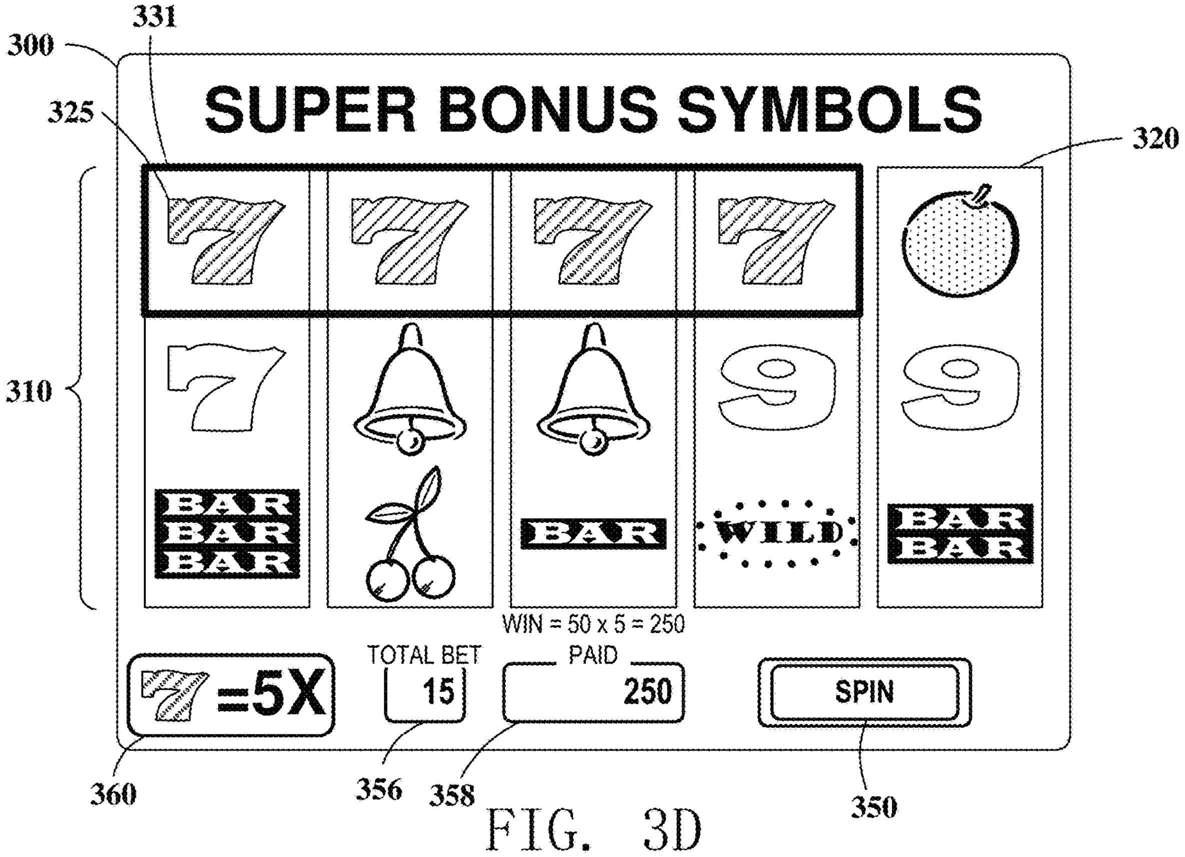
Figure 3E:
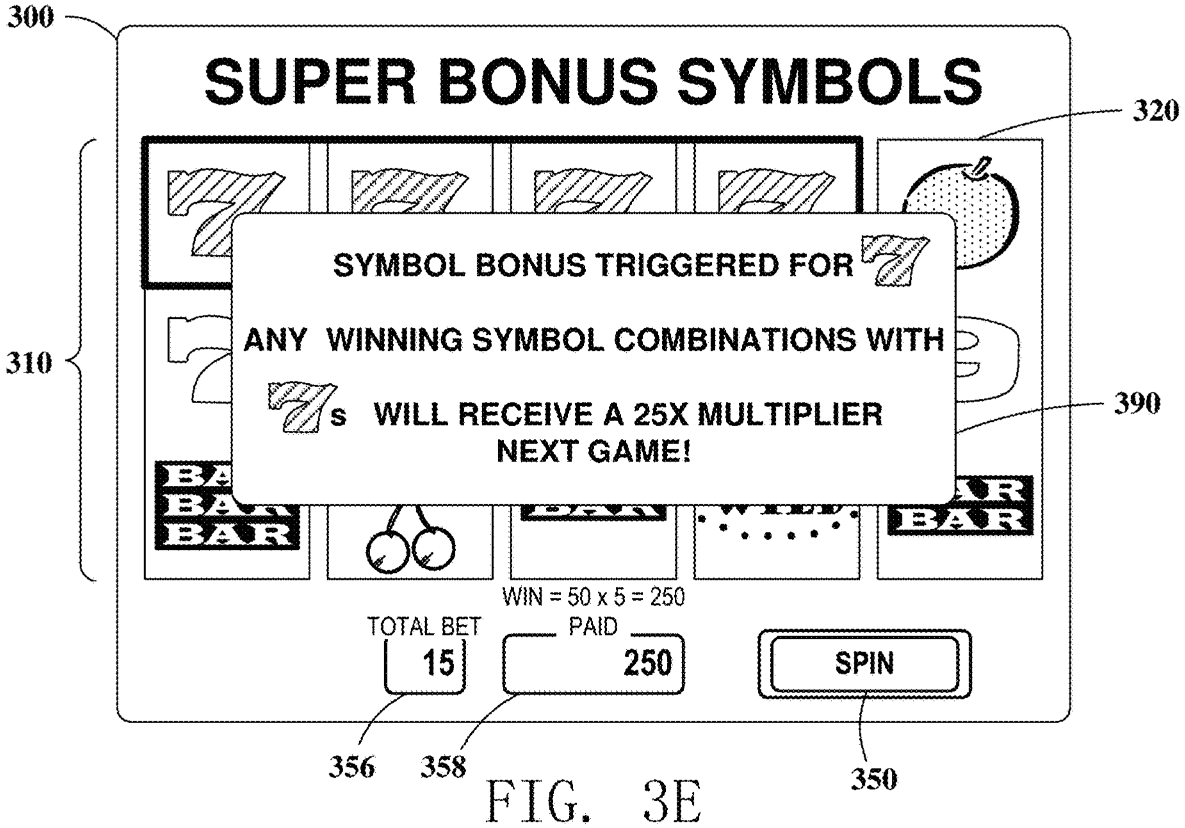

In FIG. 3C, a message box 390 indicates that this winning symbol combination has triggered a bonus where any winning symbol combination included shaded 7 symbols 325 in a subsequent gaming event will be modified by a "5×" multiplier. In FIG. 3D, the player again receives a four symbol win for the shaded 7 symbols 325 and has an associated award multiplied by the "5×" multiplier as shown in the bonus indicator 360. In FIG. 3E, the message box 390 appears again after this second gaming event to indicate that the shaded 7 symbols 325 have been bonuses again and are now associated with a "25×" multiplier for any winning symbol combinations including the shaded 7 symbols in the next (now third) gaming event.

Figure 3F:
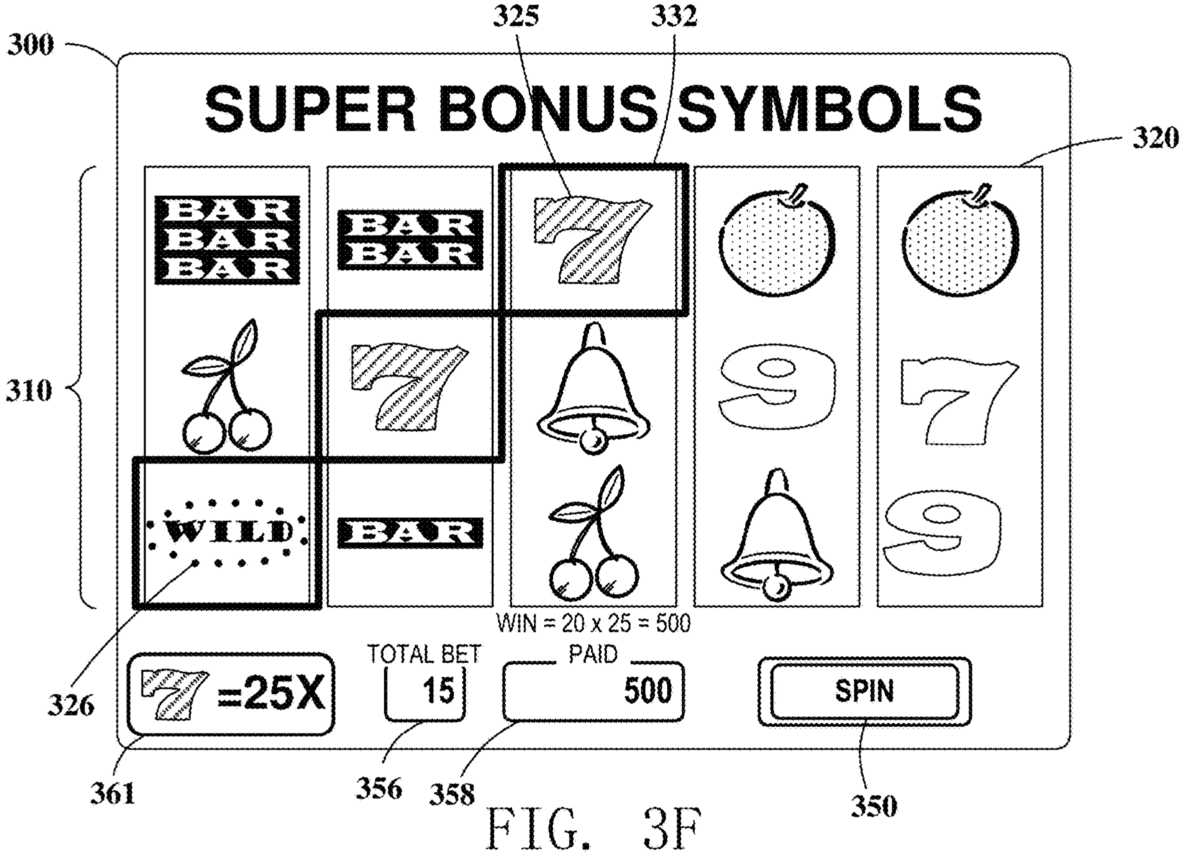
Figure 3G:
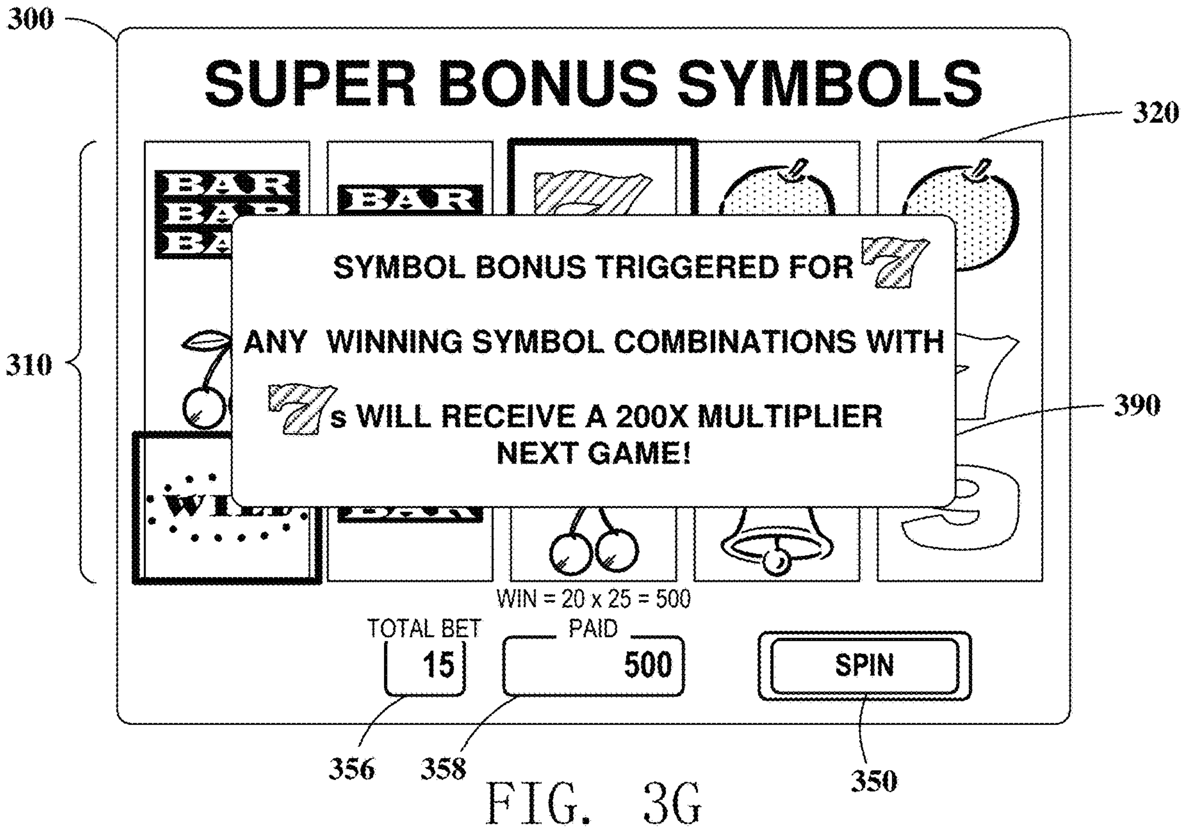
Figure 3H:
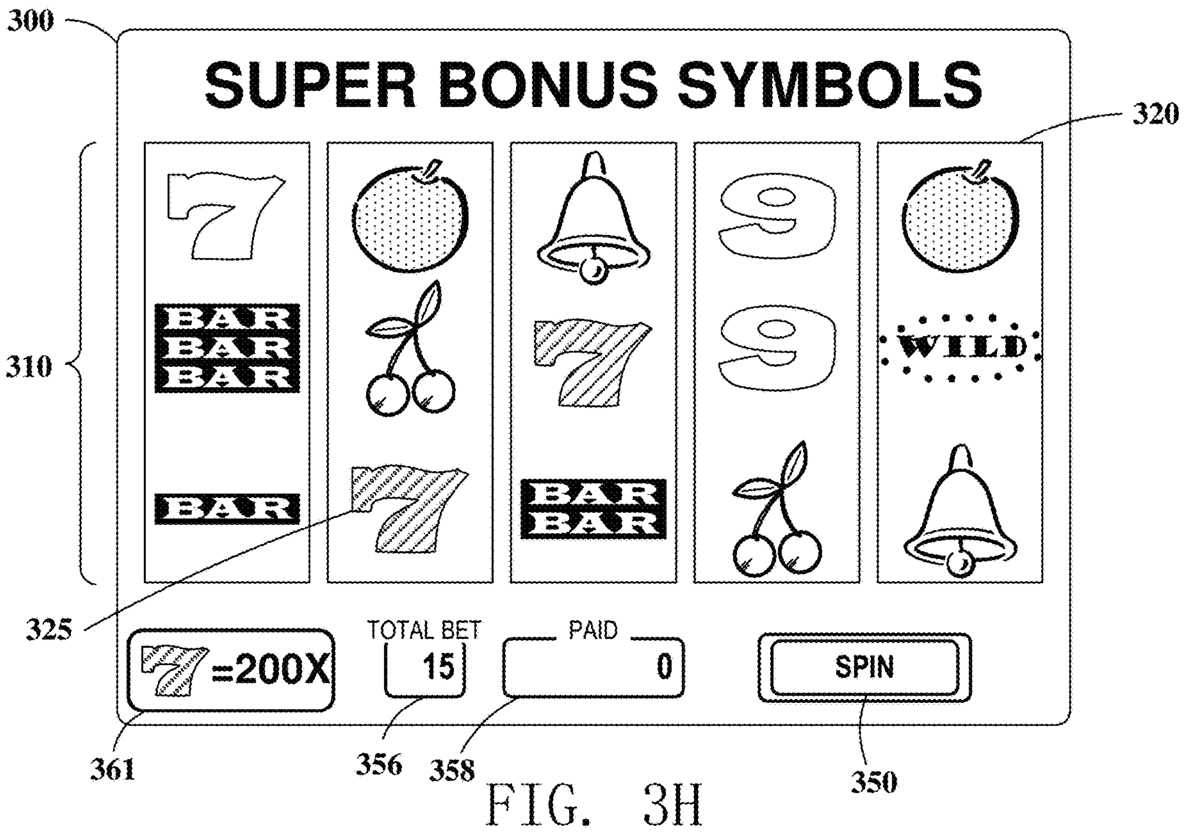

FIG. 3F illustrates the outcome of the third game event, where the player has received another winning symbol combination using the shaded 7 symbols 325. In this instance, the winning symbol combination includes a "Wild" symbol 326. However, because a shaded 7 symbol 325 is involved with the winning symbol combination, the associated credit pay for the three symbol win of 20 credits is multiplied by “25×” in the bonus indicator 361 for a total award of 500 credits, as shown in the Paid Meter 358. The bonus multiplier associated with particular symbol continues to increase each time it consecutively appears in a winning symbol combination in this embodiment. As shown in FIG. 3G, the symbol bonus for shaded 7 symbols 325 is now set to a “200×” multiplier. However, in FIG. 3H, a winning symbol combination with shaded 7 symbols 325 is not received and the bonusing of that symbol ends.

Figure 4A:
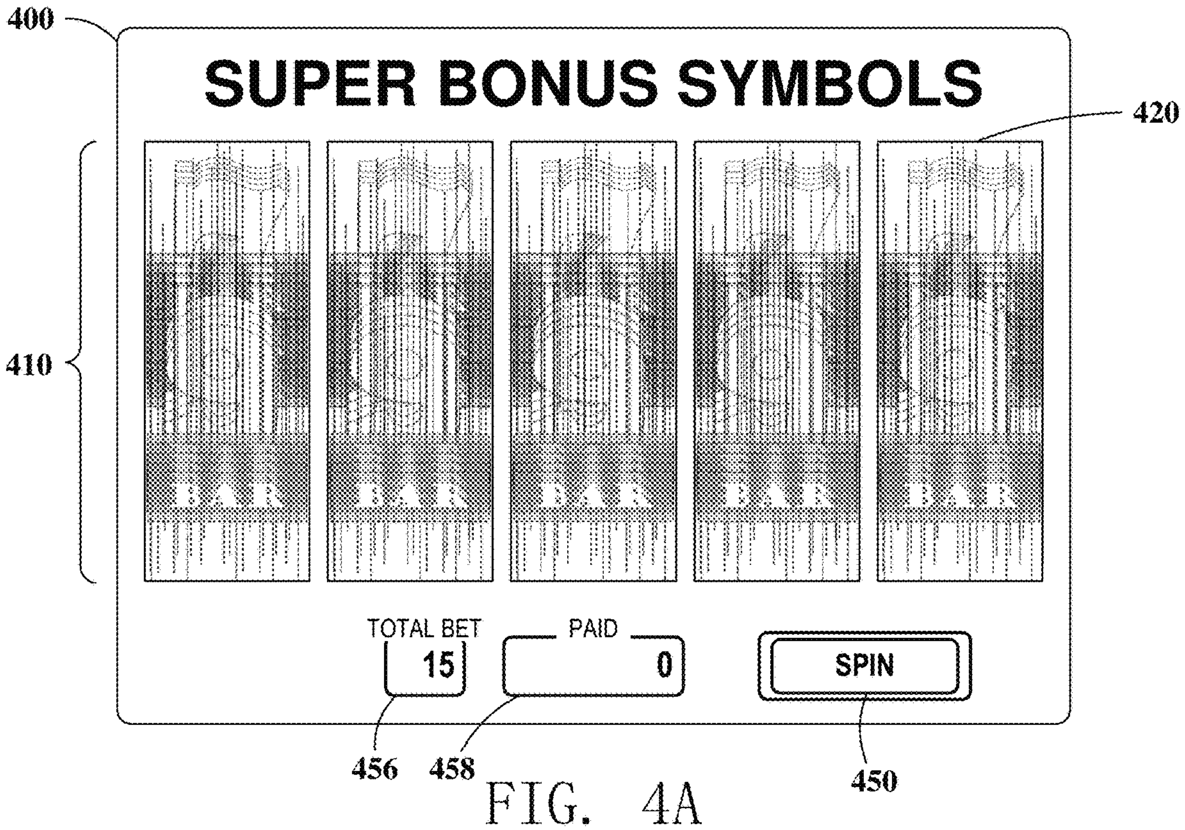
FIGS. 4A-4F are detail diagrams of a gaming device display illustrating another example game progression according to embodiments of the invention.
Figure 4B:
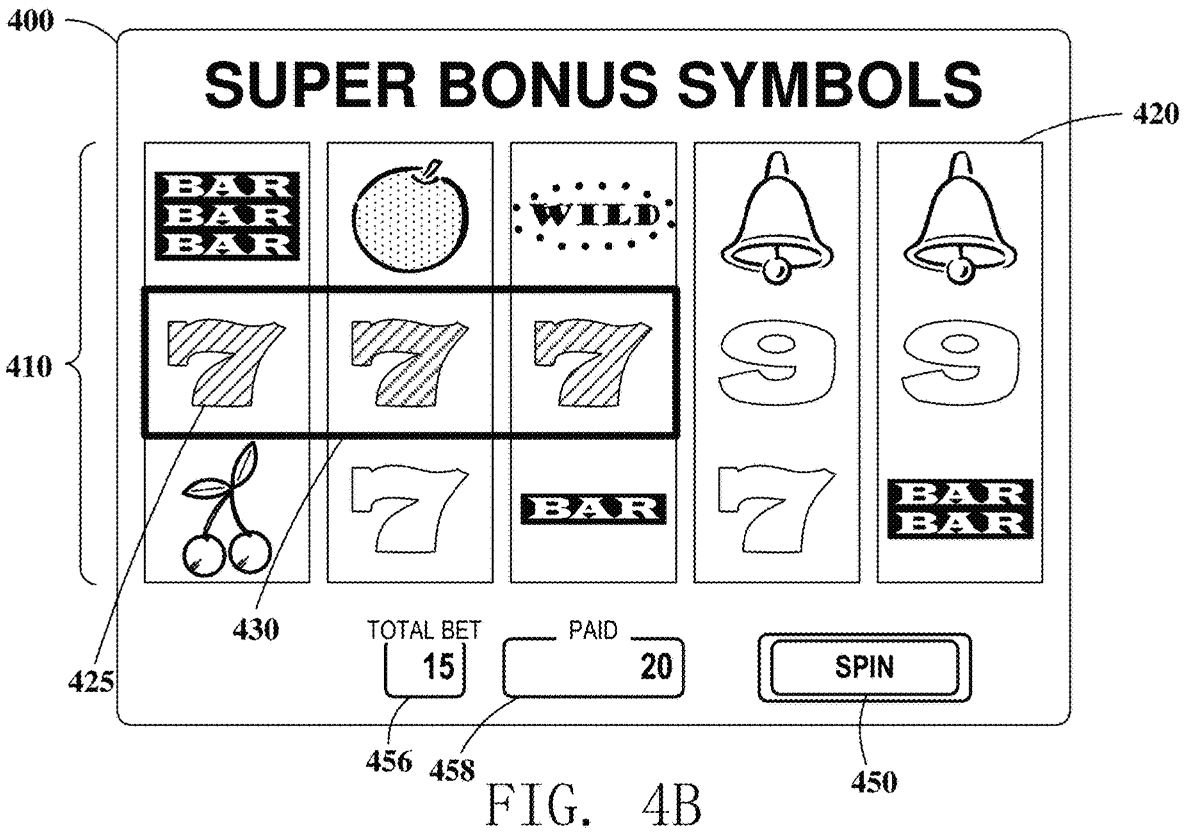

Referring to FIGS. 4A-4F, a gaming display 400 includes a game grid 410 in a game play area displaying portions of multiple game reels 420. The game display also includes a control area having various buttons and meters, such as a “Spin” button 450, a “Total Bet” meter 456, and a “Paid” meter 458. In FIG. 4A, the game reels 420 are spun when a first gaming event is initiated. In FIG. 4B, the game reels 420 are stopped to show a first game outcome in the game grid 410. As shown in FIG. 4B, a symbol combination of “shaded 7” symbols 425 is received on a center horizontal payline, which is emphasized by markings such as win boxes 430 outlining the symbols involved in the winning combination.

Figure 4C:
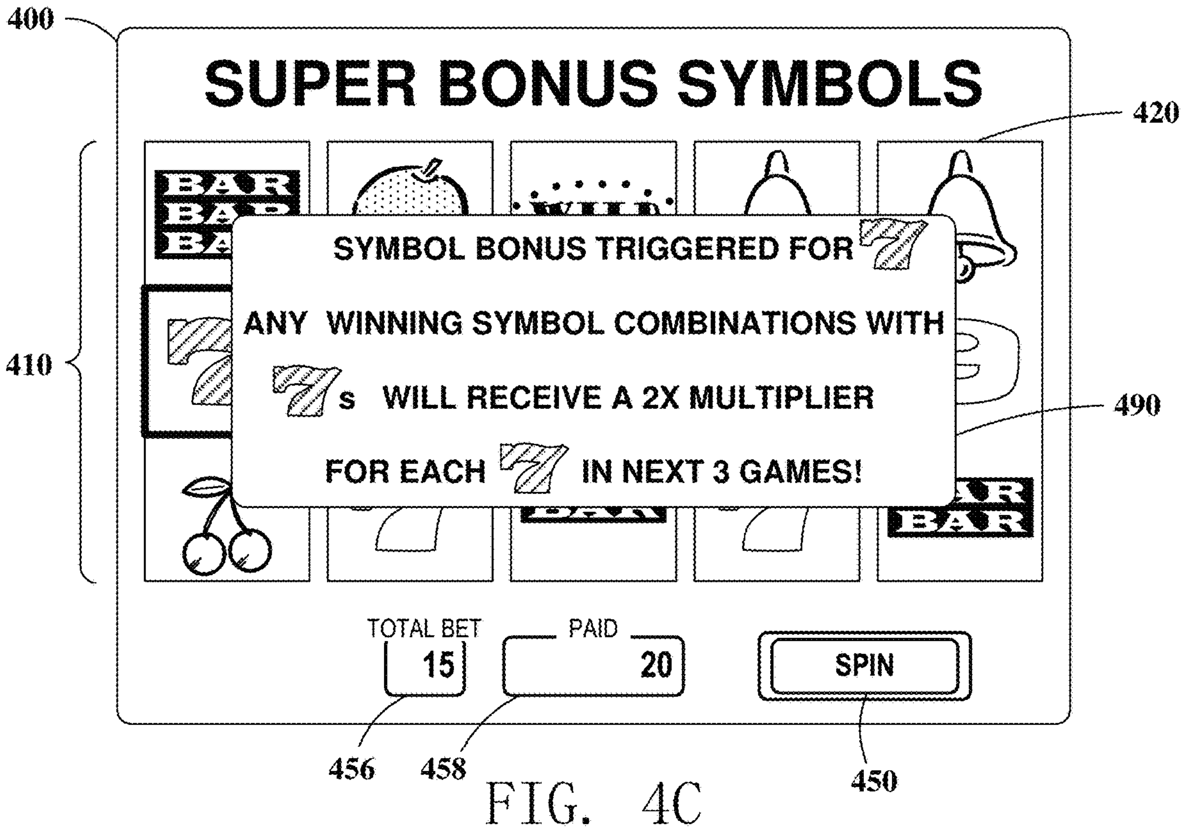
Figure 4D:
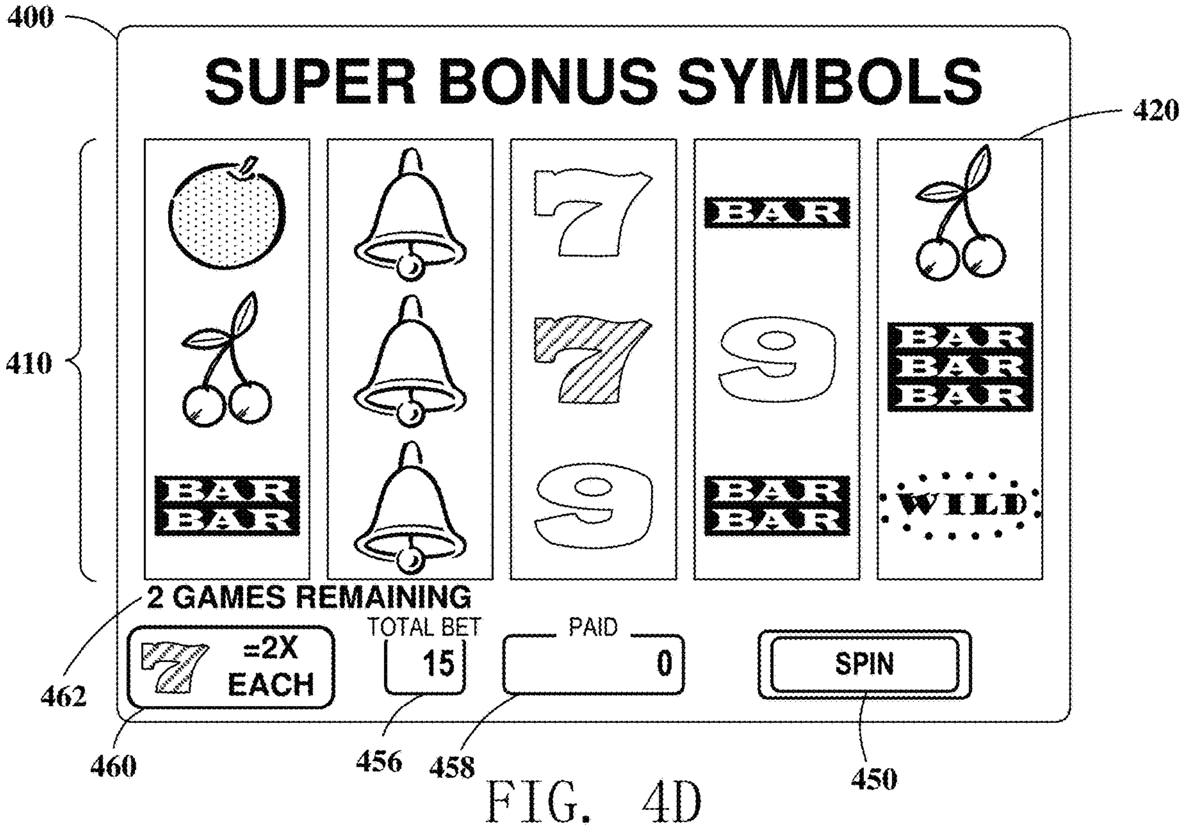
Figure 4E:
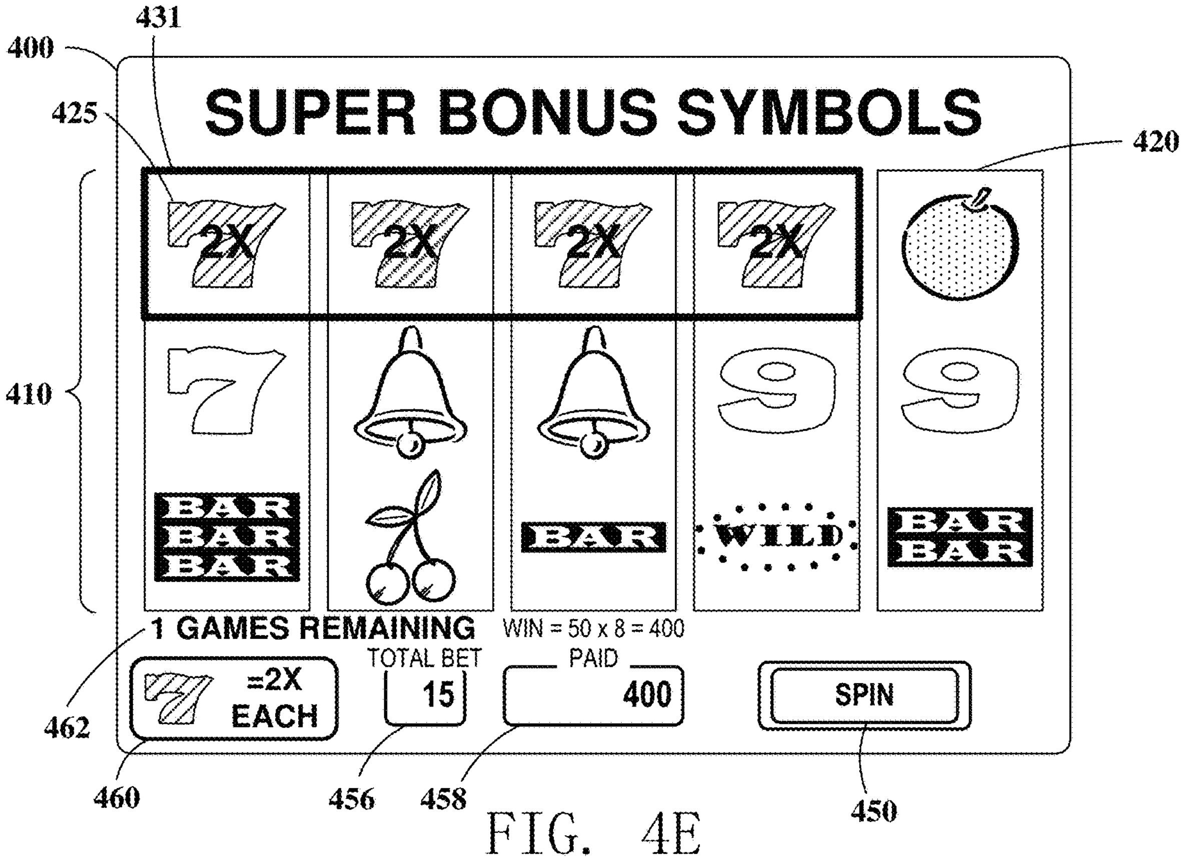

In FIG. 4C, a message box 490 indicates that this winning symbol combination has triggered a bonus where any winning symbol combination including shaded 7 symbols 425 that are received in any of the next three games will be modified by a “2×” multiplier for each shaded 7 symbol in the winning combination. In FIG. 4D, the outcome of the second gaming event is displayed. A bonus indicator 460 shows the current bonus level for the identified symbols, and a bonus meter 462 shows the number of remaining games in which the symbol bonus is active. As shown, this second gaming outcome does not include a winning symbol combination. Play then proceeds to the third gaming event, which is shown in FIG. 4E. Here, four shaded 7 symbols 425 are part of a winning symbol combination, as outlined by the win box 431. Each of the four shaded 7 symbols 425 is associated with a “2×” multiplier and the associated award of 50 credits for the four symbol pay is multiplied by the sum of the multipliers, which is “8×,” for a total award of 400 credits. In some embodiments the multipliers may be multiplied together instead of added together, which would provide a “16×” multiplier. As shown in FIG. 4E, the bonus indicator maintains the bonus amount for shaded 7s at “2×” each. In other embodiments, however, the bonus value may be increased as the games on the bonus meter 462 counts down, or may by increased when additional winning symbol combinations included the bonused symbols are received.

Figure 4F:
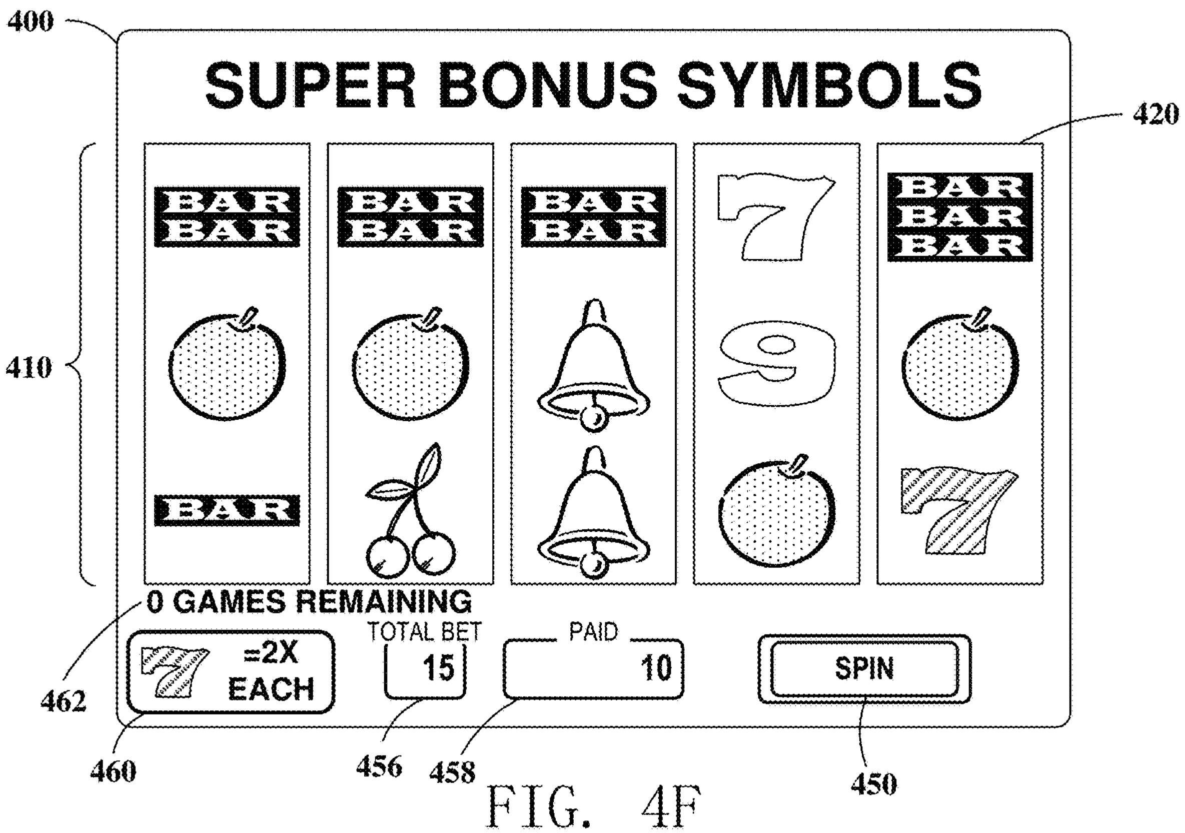

In the fourth gaming event, no winning game outcomes are received as shown in FIG. 4F. Since the three bonused gaming events have now been played, the bonusing of the shaded 7 symbols 425 will be removed for the next gaming event.

Figure 5A:
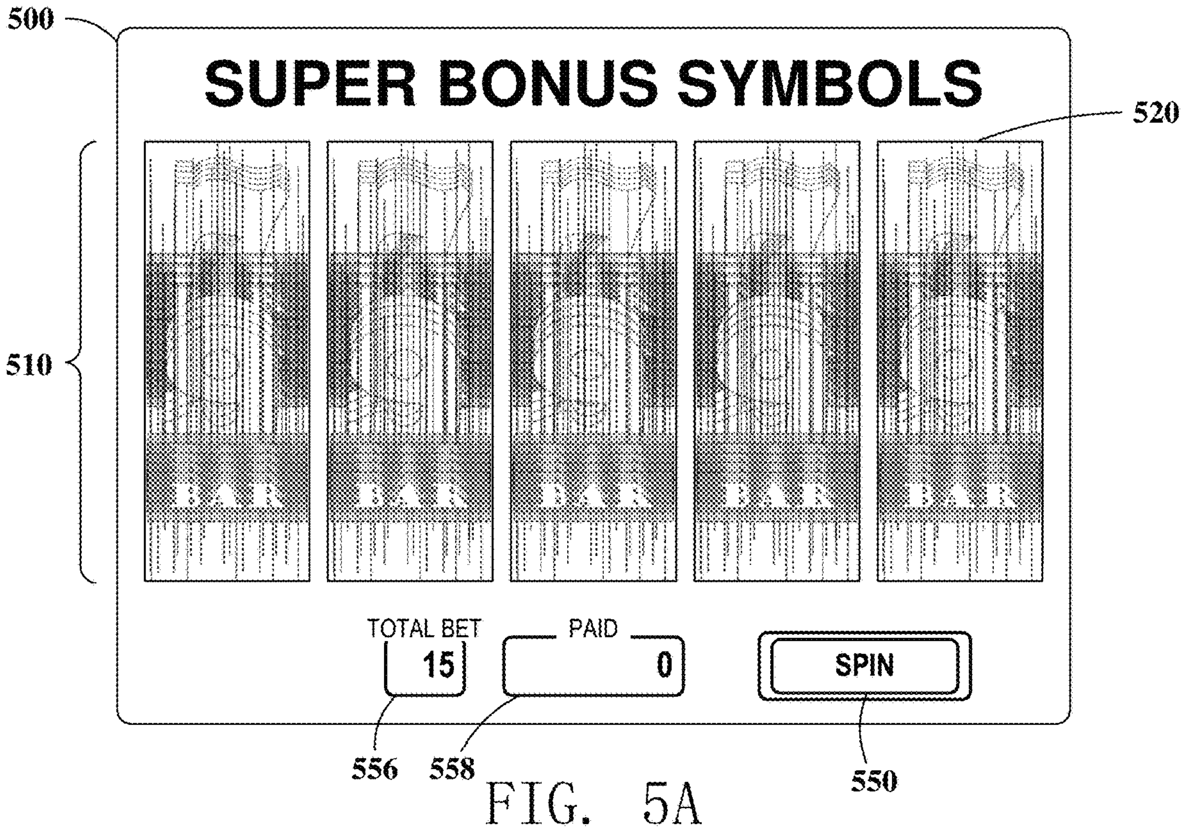
FIGS. 5A-5D are detail diagrams of a gaming device display illustrating another example game progression according to embodiments of the invention.
Figure 5B:
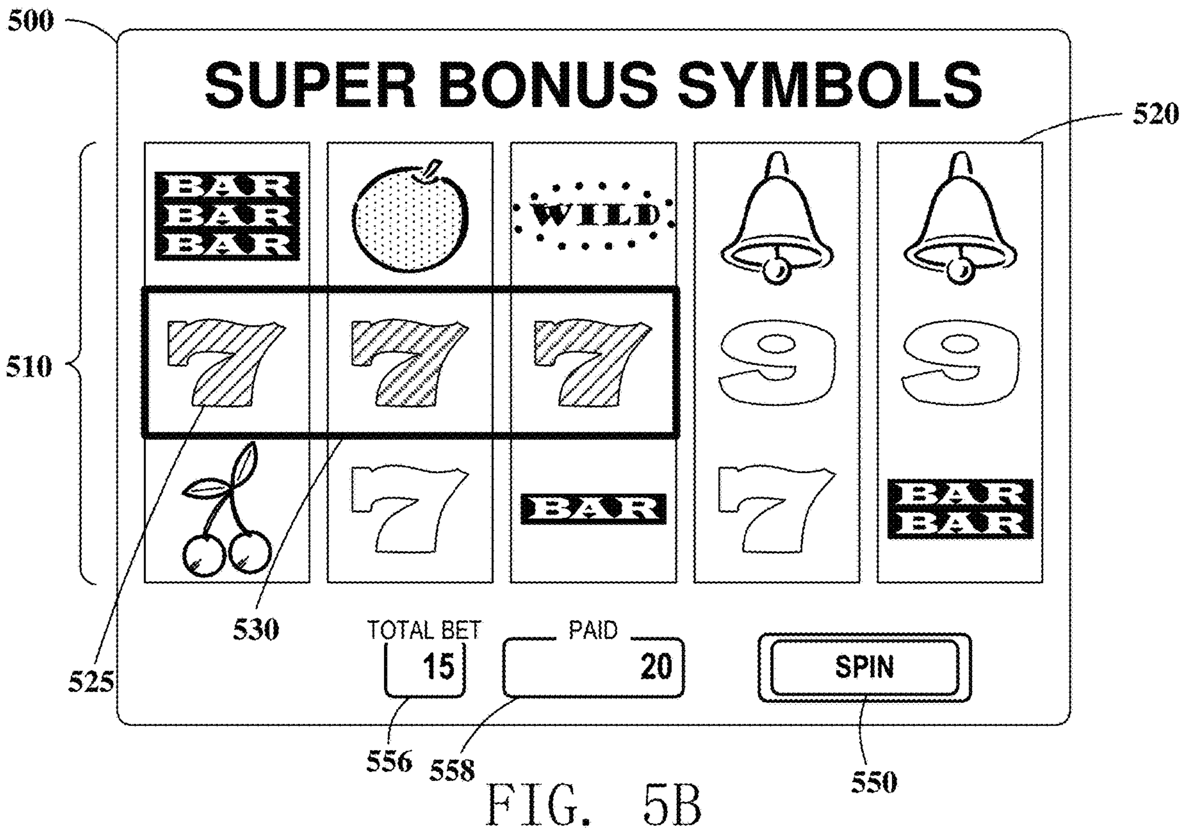

Referring to FIGS. 5A-5D, a gaming display 500 includes a game grid 510 in a game play area displaying portions of multiple game reels 520. The game display also includes a control area having various buttons and meters, such as a “Spin” button 550, a “Total Bet” meter 556, and a “Paid” meter 558. In FIG. 5A, the game reels 520 are spun when a first gaming event is initiated. In FIG. 5B, the game reels 520 are stopped to show a first game outcome in the game grid 510. As shown in FIG. 5B, a symbol combination of “shaded 7” symbols 525 is received on a center horizontal payline, which is emphasized by markings such as win boxes 530 outlining the symbols involved in the winning combination.

Figure 5C:
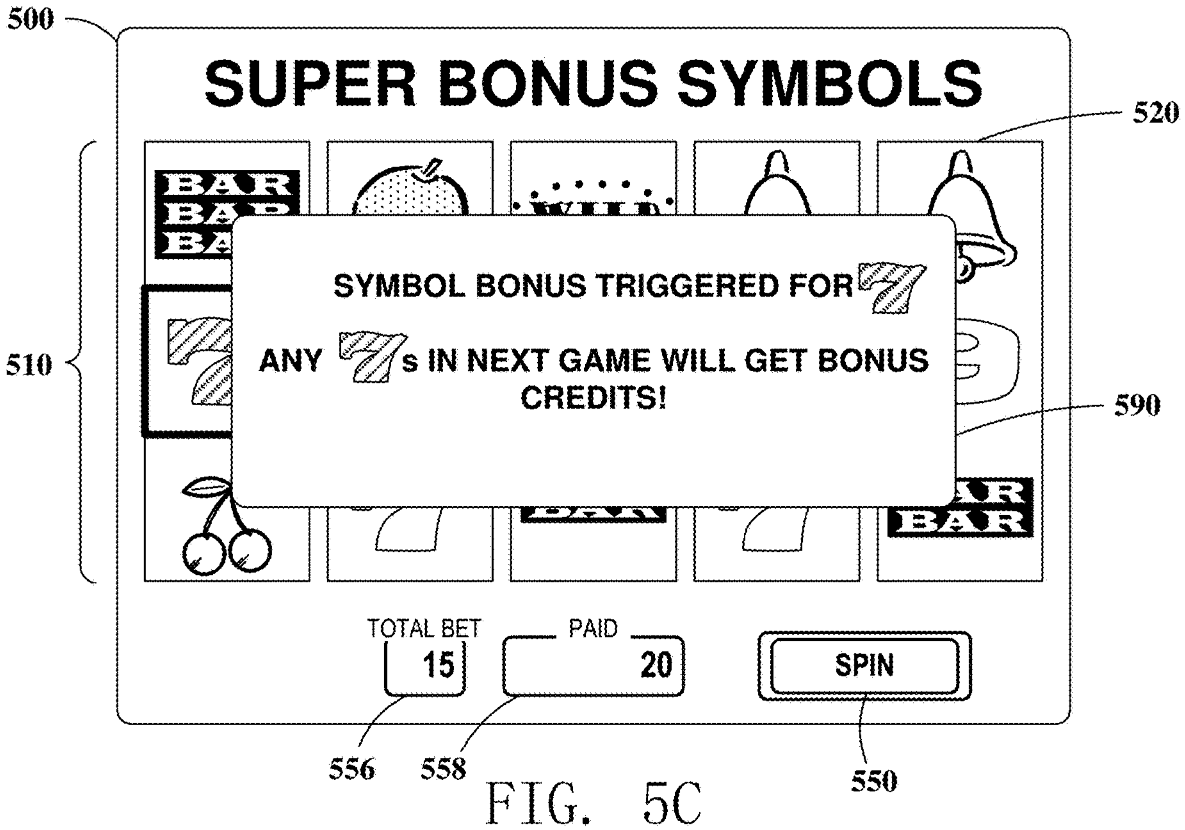

In FIG. 5C, a message box 590 indicates that this winning symbol combination has triggered a bonus where any shaded 7 symbols 525 received in the next gaming event will receive a credit award. As discussed above, there are many variations in awarding these credits, such as providing the same credit value for each bonused symbol appearing in the next gaming event, or, as shown here, incrementing the value of each bonused symbol appearing on the game grid 510 in the next gaming event according to a rule or table. Here, the credit values for the bonused symbols are based on the values shown in Table 1 above.

Figure 5D:
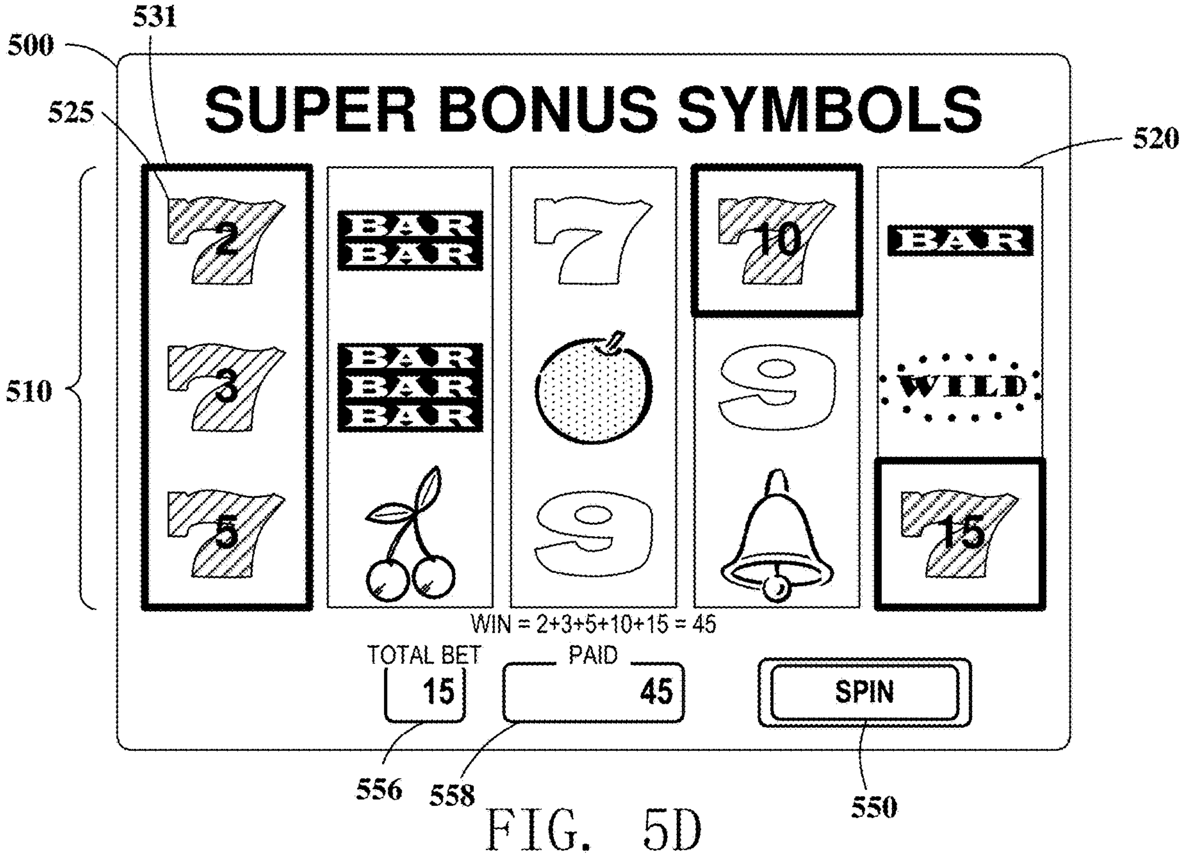

In FIG. 5D, the outcome of the second gaming event is displayed. Here, five different shaded 7 symbols 525 appear on the game grid 510. In this embodiment, the shaded 7 symbols appearing do not have to be part of a winning symbol combination to be bonused. As shown above in Table 1, each additional bonused symbol appearing is given an increasing bonus credit amount. Here, the first symbol is worth 2 credits, the second is worth 3 credits, the third is worth 5 credits, the fourth is worth 10 credits, and the fifth is worth 15 credits for a total bonus award of 45 credits, as shown on the Paid Meter 558.

Figure 6A:
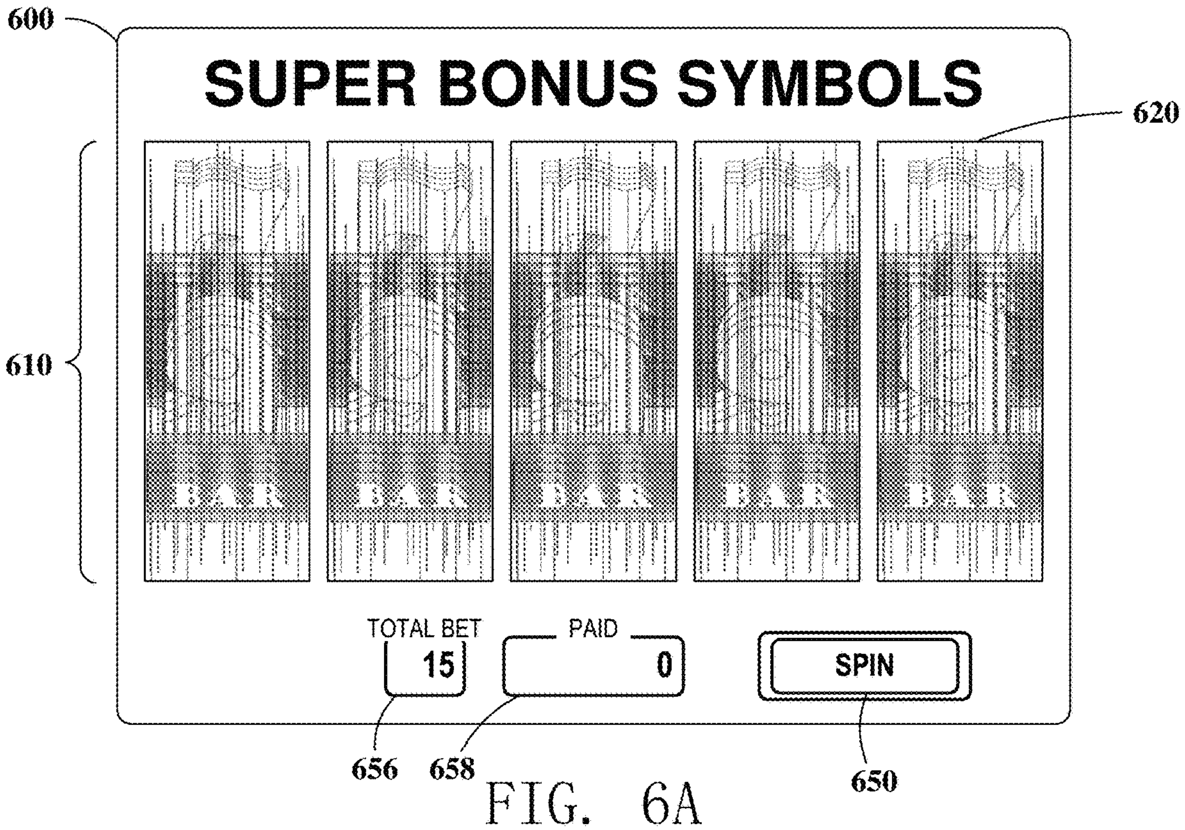
FIGS. 6A-6D are detail diagrams of a gaming device display illustrating another example game progression according to embodiments of the invention.
Figure 6B:
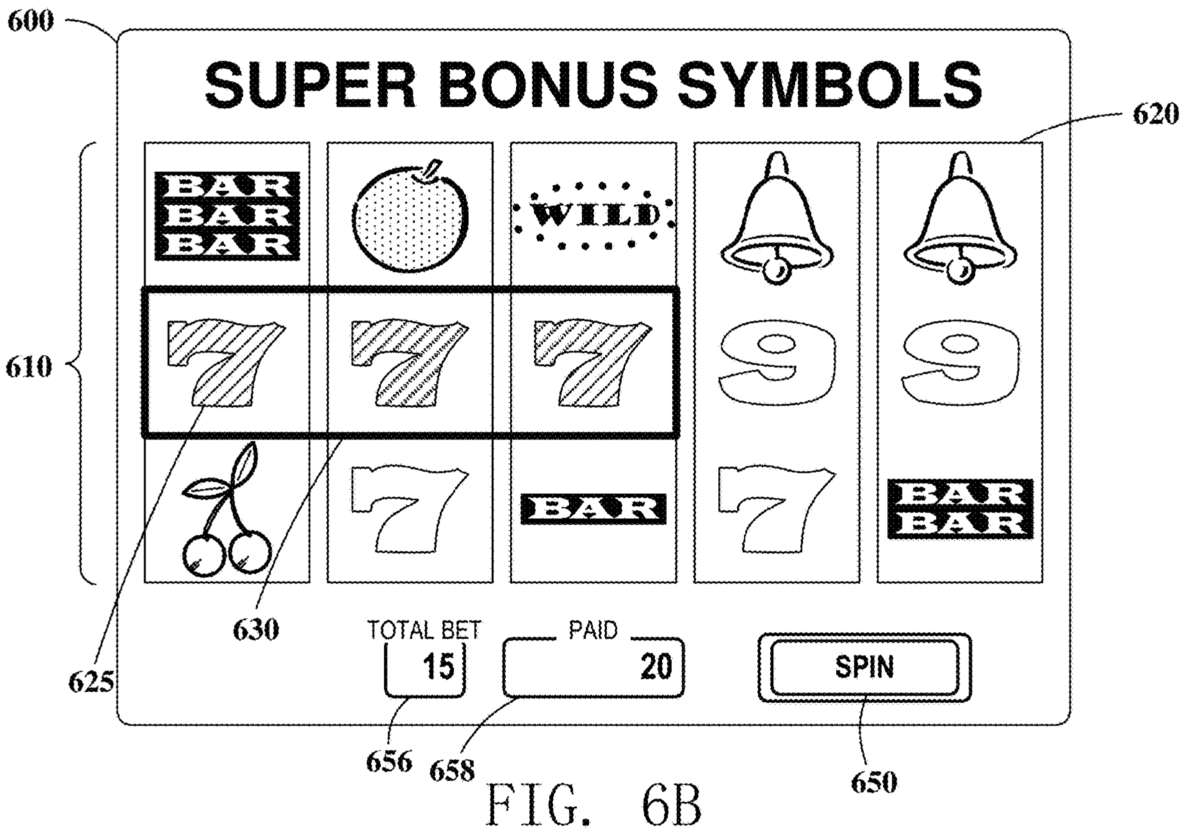

Referring to FIGS. 6A-6D, a gaming display 600 includes a game grid 610 in a game play area displaying portions of multiple game reels 620. The game display also includes a control area having various buttons and meters, such as a “Spin” button 650, a “Total Bet” meter 656, and a “Paid” meter 658. In FIG. 6A, the game reels 620 are spun when a first gaming event is initiated. In FIG. 6B, the game reels 620 are stopped to show a first game outcome in the game grid 610. As shown in FIG. 6B, a symbol combination of “shaded 7” symbols 625 is received on a center horizontal payline, which is emphasized by markings such as win boxes 630 outlining the symbols involved in the winning combination.

Figure 6C:
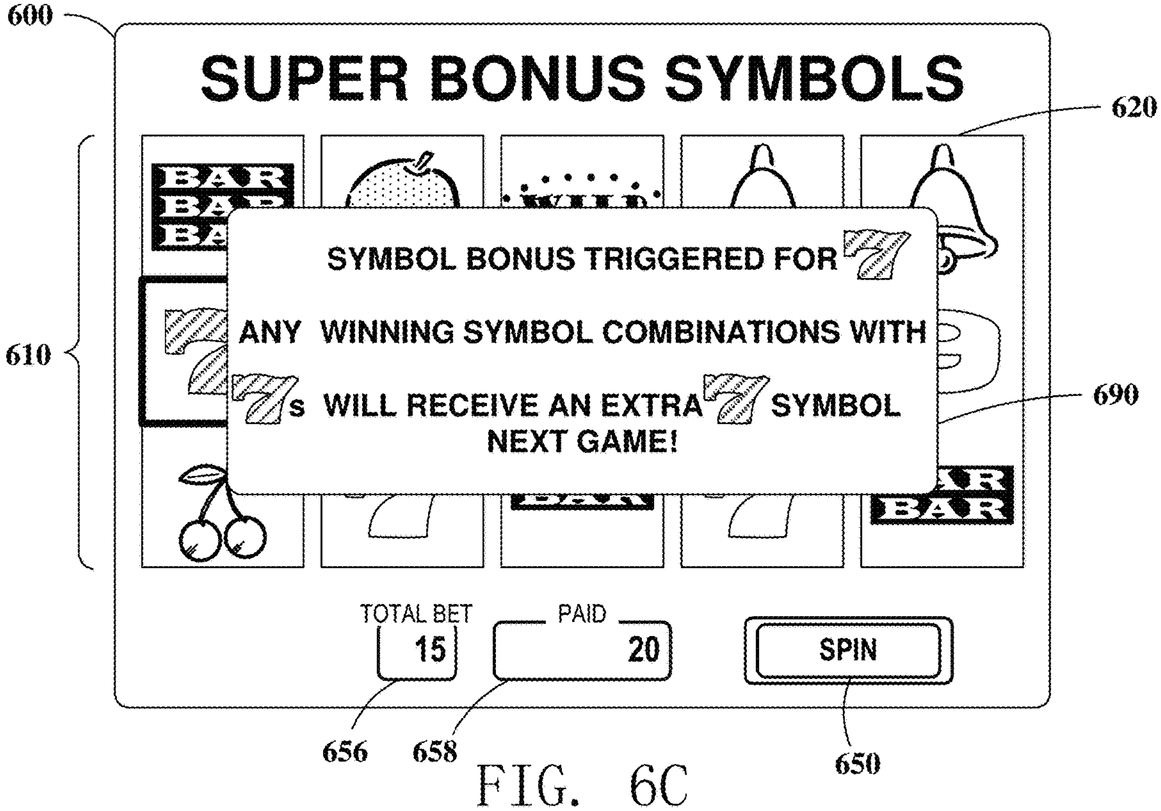

In FIG. 6C, a message box 690 indicates that this winning symbol combination has triggered a bonus where any symbol combinations including shaded 7 symbols 625 that are received in the next game will be modified by adding another shaded 7 symbol to the winning combination. Thus, a 2-symbol combination of shaded 7 symbols 625 would become a 3-symbol combination and be eligible for the improved award associated with the higher count symbol combination.

Figure 6D:
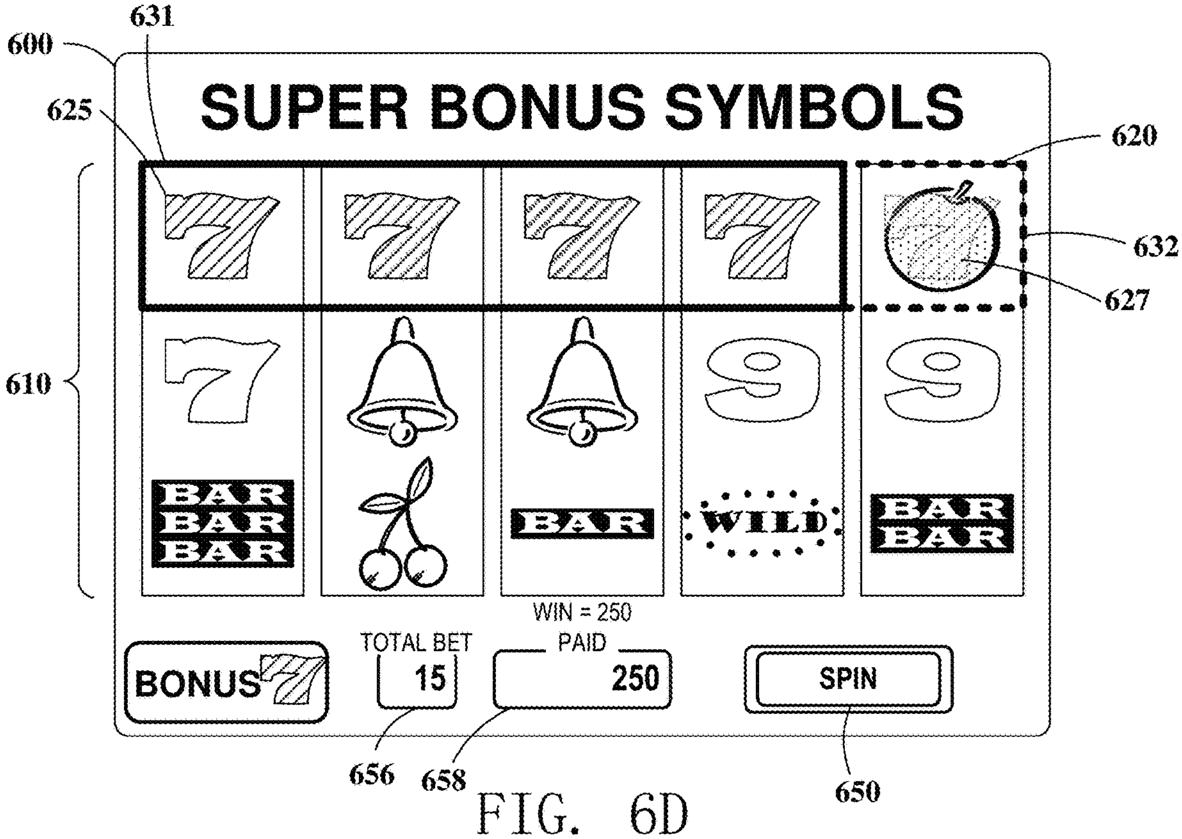

In FIG. 6D, the outcome of the second gaming event is displayed. Here, a four-symbol shaded 7 symbol 425 winning combination is received as shown by the win box 631. Since this is the bonused symbol, however, a fifth shaded 7 symbol 627 is added to the combination and the win box is extended 632 to include this added symbol. As shown on the Paid Meter, the player is awarded for a five symbol pay with 250 credits.

Figure 7A:
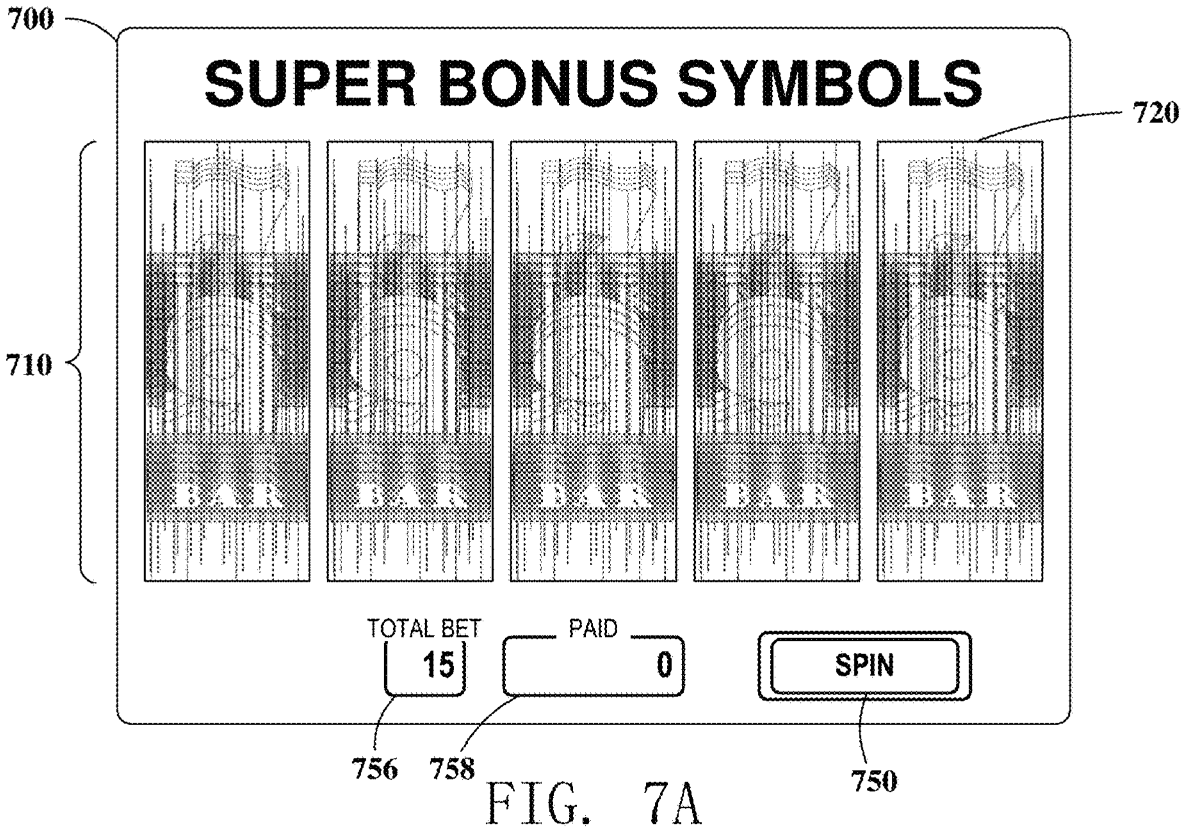
FIGS. 7A-7F are detail diagrams of a gaming device display illustrating another example game progression according to embodiments of the invention.
Figure 7B:
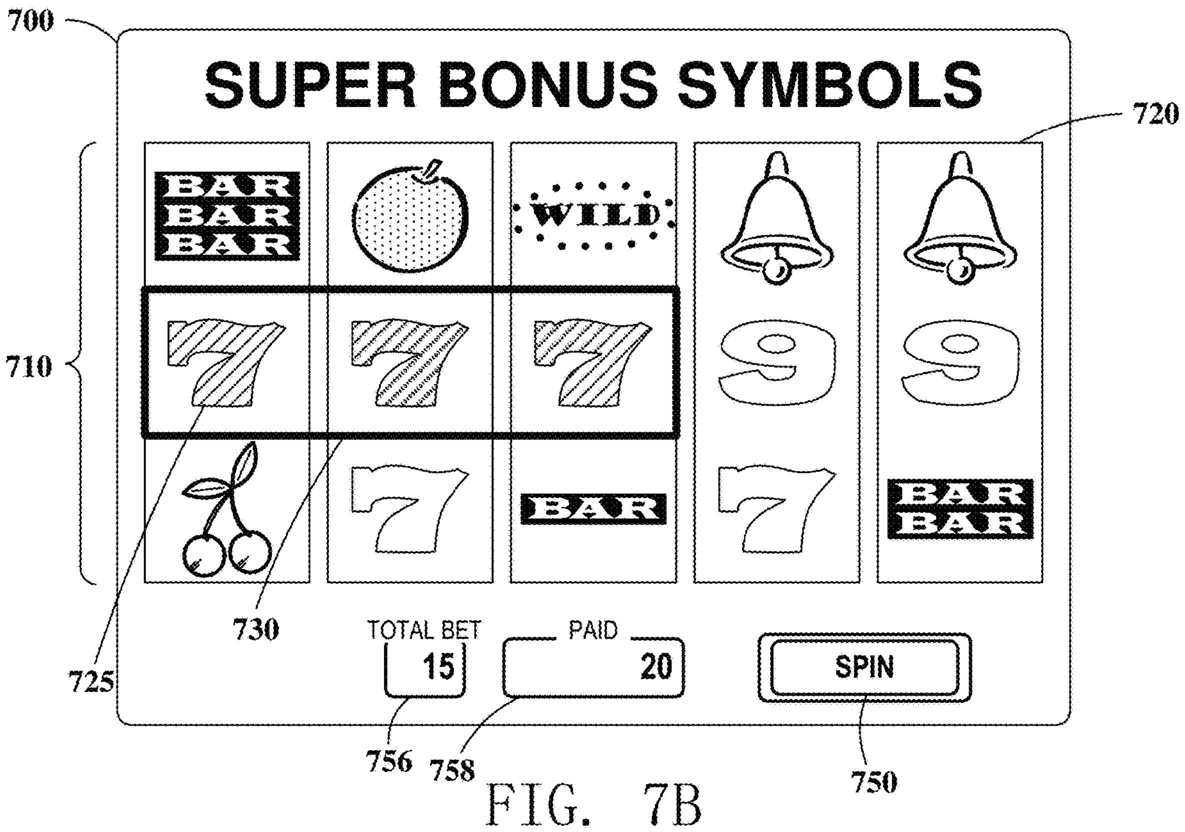

Referring to FIGS. 7A-7F, a gaming display 700 includes a game grid 710 in a game play area displaying portions of multiple game reels 720. The game display also includes a control area having various buttons and meters, such as a “Spin” button 750, a “Total Bet” meter 756, and a “Paid” meter 758. In FIG. 7A, the game reels 720 are spun when a first gaming event is initiated. In FIG. 7B, the game reels 720 are stopped to show a first game outcome in the game grid 710. As shown in FIG. 7B, a symbol combination of “shaded 7” symbols 725 is received on a center horizontal payline, which is emphasized by markings such as win boxes 730 outlining the symbols involved in the winning combination.

Figure 7C:
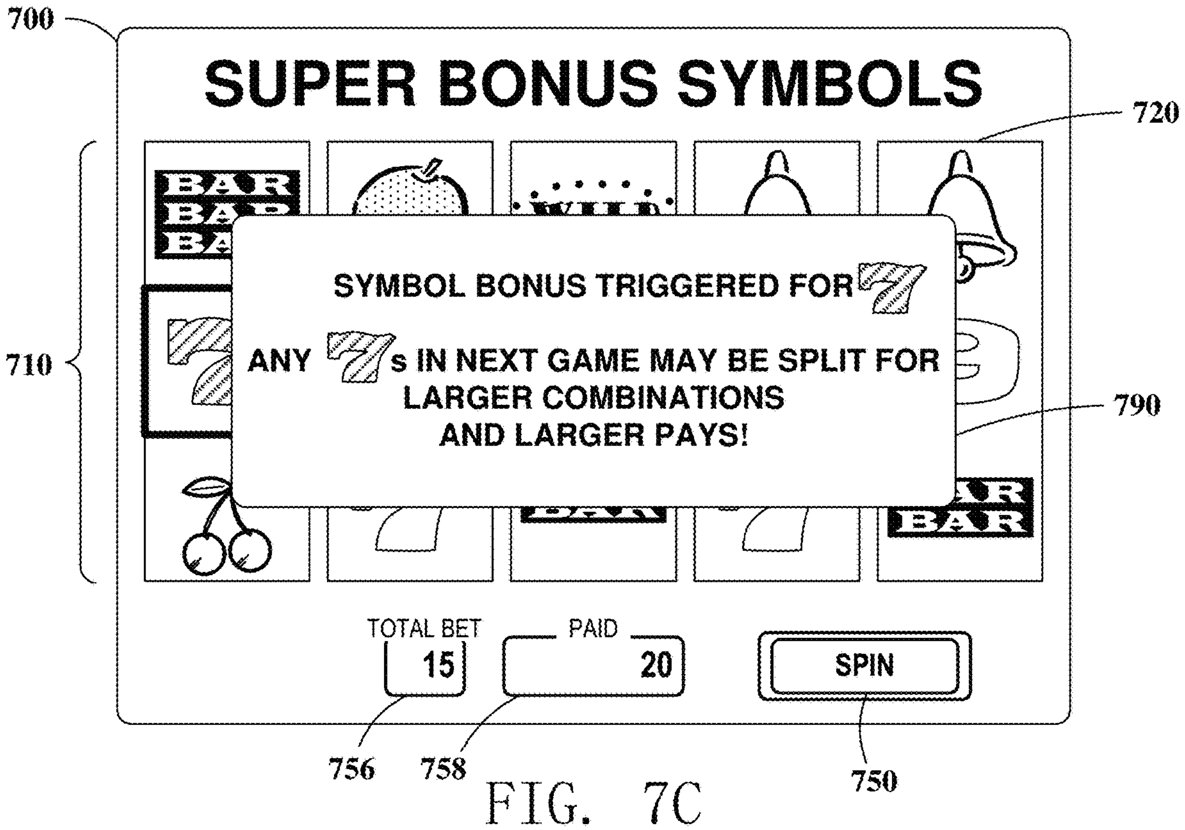

In FIG. 7C, a message box 790 indicates that this winning symbol combination has triggered a bonus where any shaded 7 symbols 725 that are received in the next game will be modified by randomly splitting one or more of the shaded 7 symbols. In some embodiments, the bonused symbols may be split to provide a copy of the symbol in the same game grid location. In other embodiments, the bonused symbol is placed in a portion of the game grid position and another symbol is established in the other section of the same symbol position. This other symbol may be chosen randomly, or may be provided by cascading the above symbols down from the reel symbols on the associated reel strip 720 to fill the empty symbol position section.

Figure 7D:
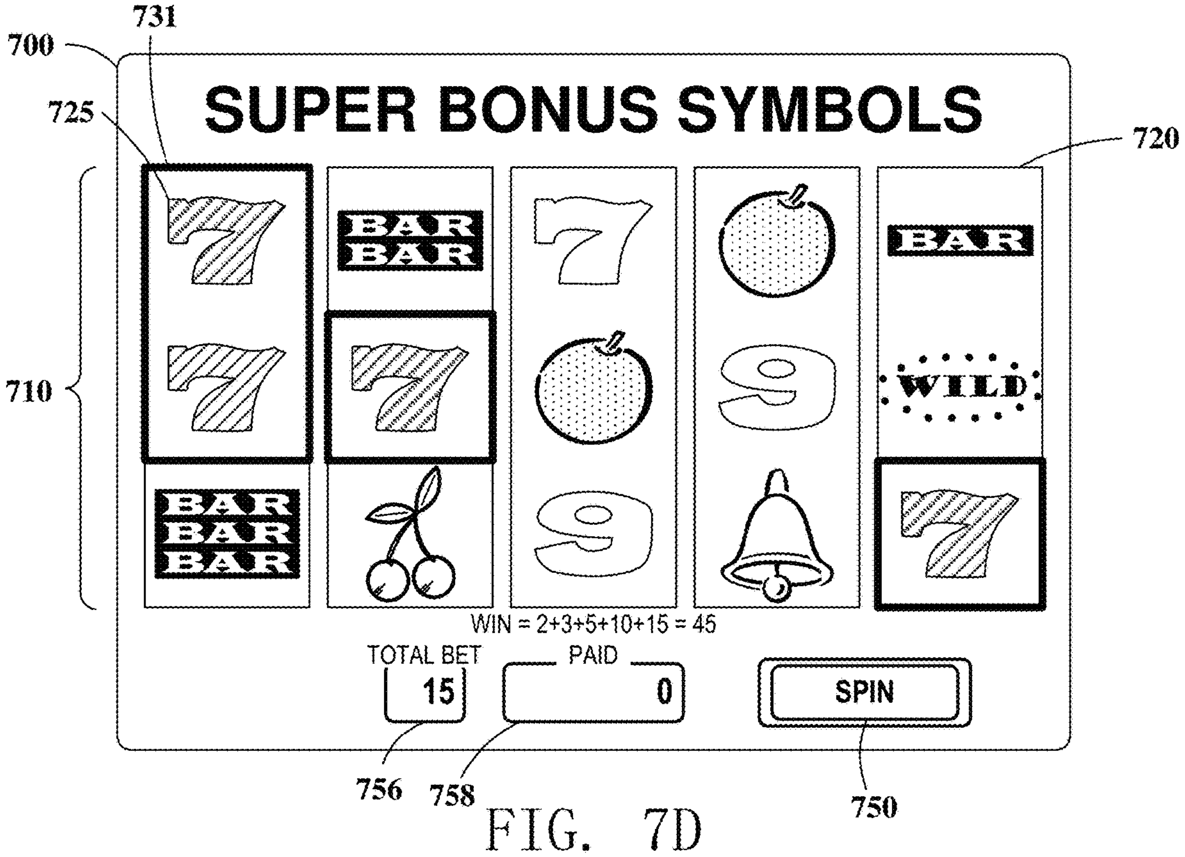
Figure 7E:
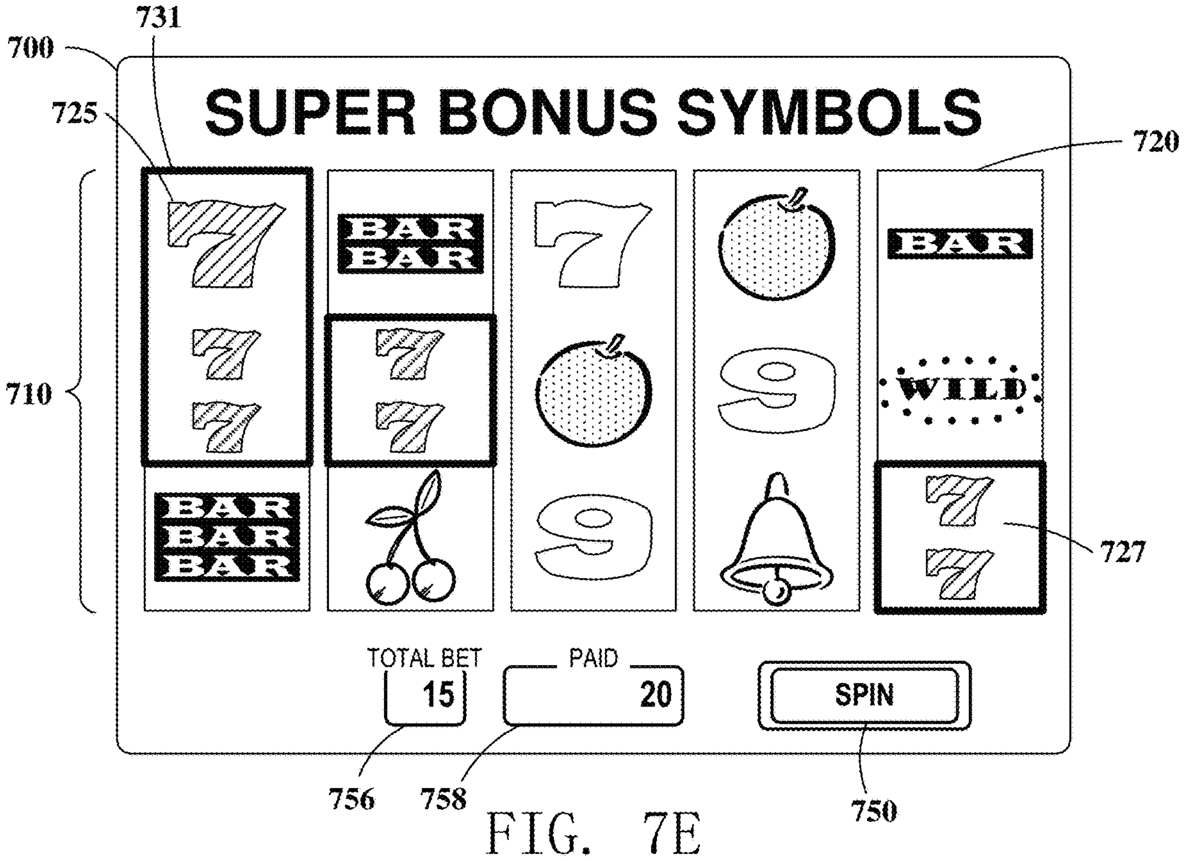
Figure 7F:
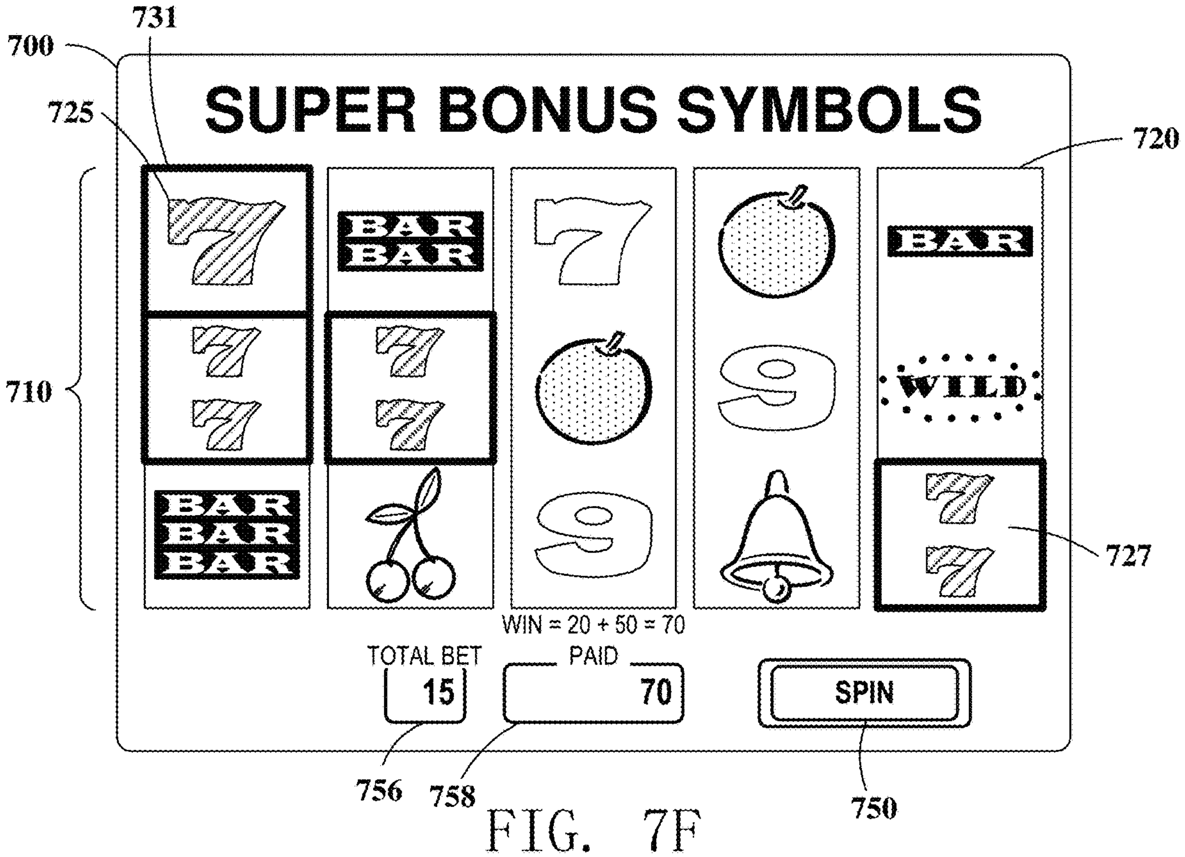

In FIG. 7D, a second gaming outcome for a second gaming event is displayed. Here, four shaded 7 symbols 725 are received and highlighted in boxes 731. For each of the bonused symbols, a random drawing is held to determine if the symbol will be split. As shown in FIG. 7E, three out of the four bonused symbols are split into double shaded 7 symbols 727. Here, each seven is counted as part of a payline. Hence, as shown in FIG. 7F, the player is paid 50 credits for a four symbol pay in the middle horizontal payline, and 20 credits for a three symbol pay on the "V-shaped" payline starting at the upper left corner of the game grid 710. This results in a total award of 70 credits.

Figure 8A:
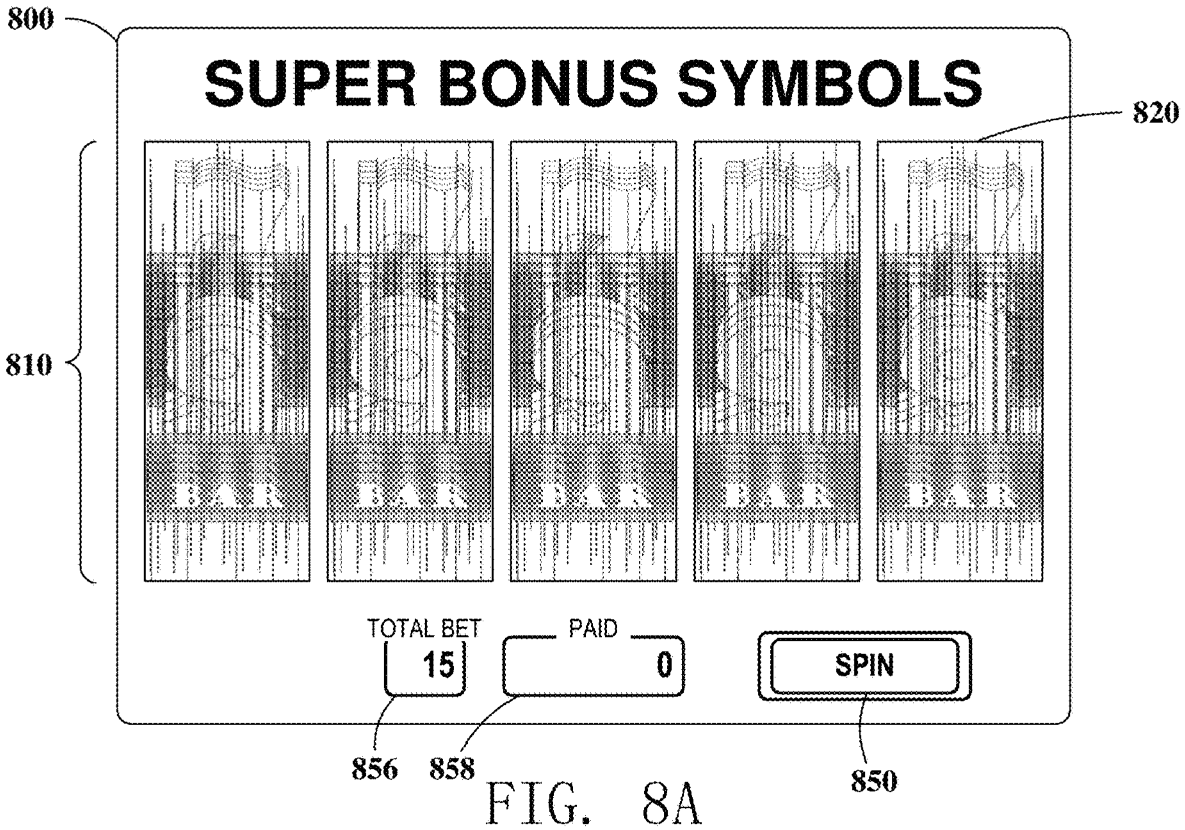
FIGS. 8A-8F are detail diagrams of a gaming device display illustrating another example game progression according to embodiments of the invention.
Figure 8B:
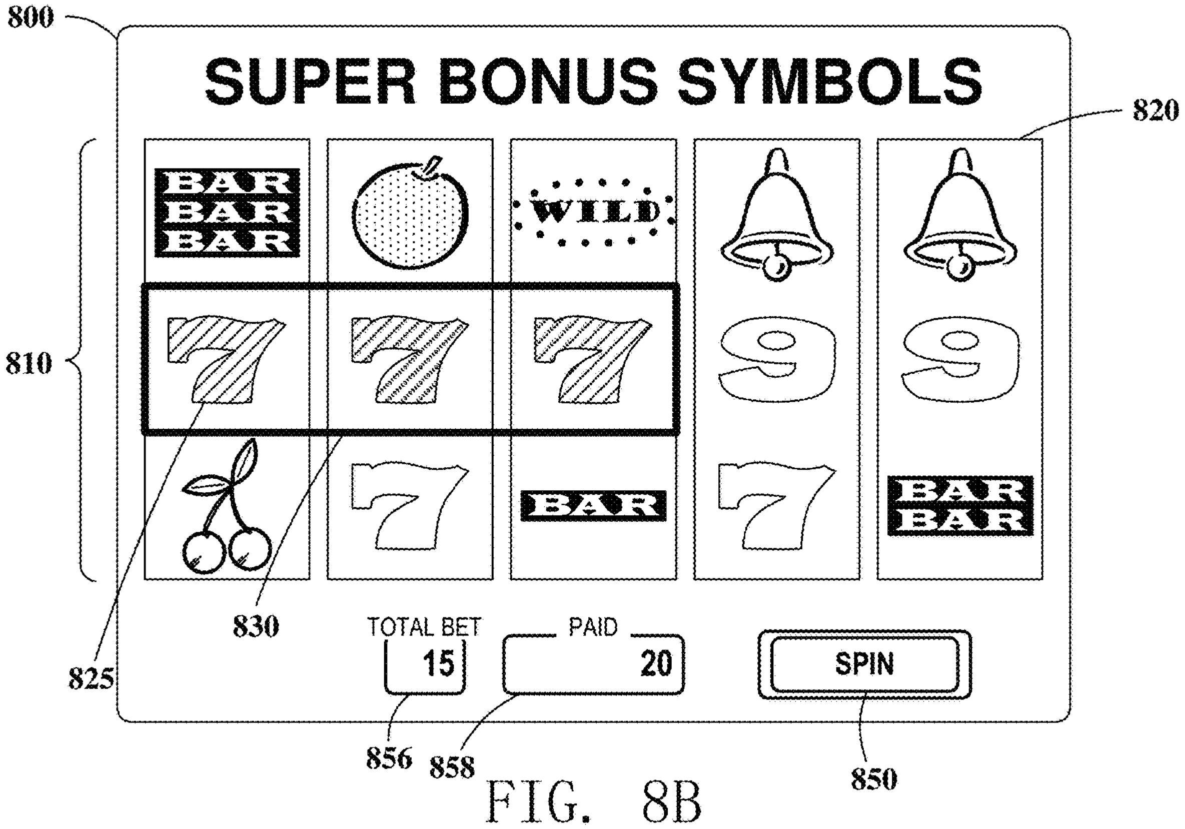

Referring to FIGS. 8A-8F, a gaming display 800 includes a game grid 810 in a game play area displaying portions of multiple game reels 820. The game display also includes a control area having various buttons and meters, such as a "Spin" button 850, a "Total Bet" meter 856, and a "Paid" meter 858. In FIG. 8A, the game reels 820 are spun when a first gaming event is initiated. In FIG. 8B, the game reels 820 are stopped to show a first game outcome in the game grid 810. As shown in FIG. 8B, a symbol combination of "shaded 7" symbols 825 is received on a center horizontal payline, which is emphasized by markings such as win boxes 830 outlining the symbols involved in the winning combination.

Although a messaging screen is not shown in this embodiment, messaging may be provided to notify a player that they are receiving a symbol bonus on one or more subsequent gaming event. In this embodiment, a symbol bonus is active or alive as long as any win appears on the game grid. Further, if a second win happens for an already bonused symbol, the bonusing of that symbol increases. Here, since the bonusing is a multiplier associated with winning symbol combinations having bonused symbols, subsequent wins with bonused symbols increase the associated multiplier.

Figure 8C:
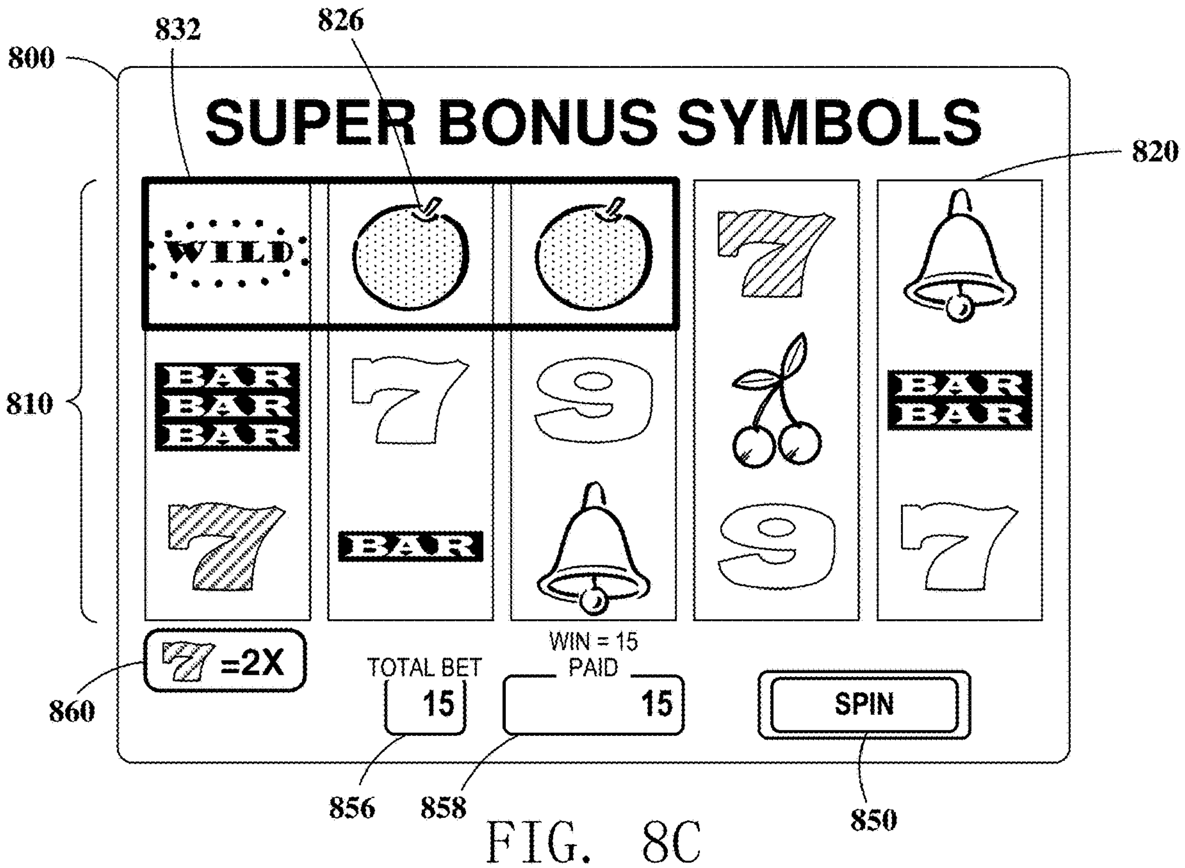
Figure 8D:
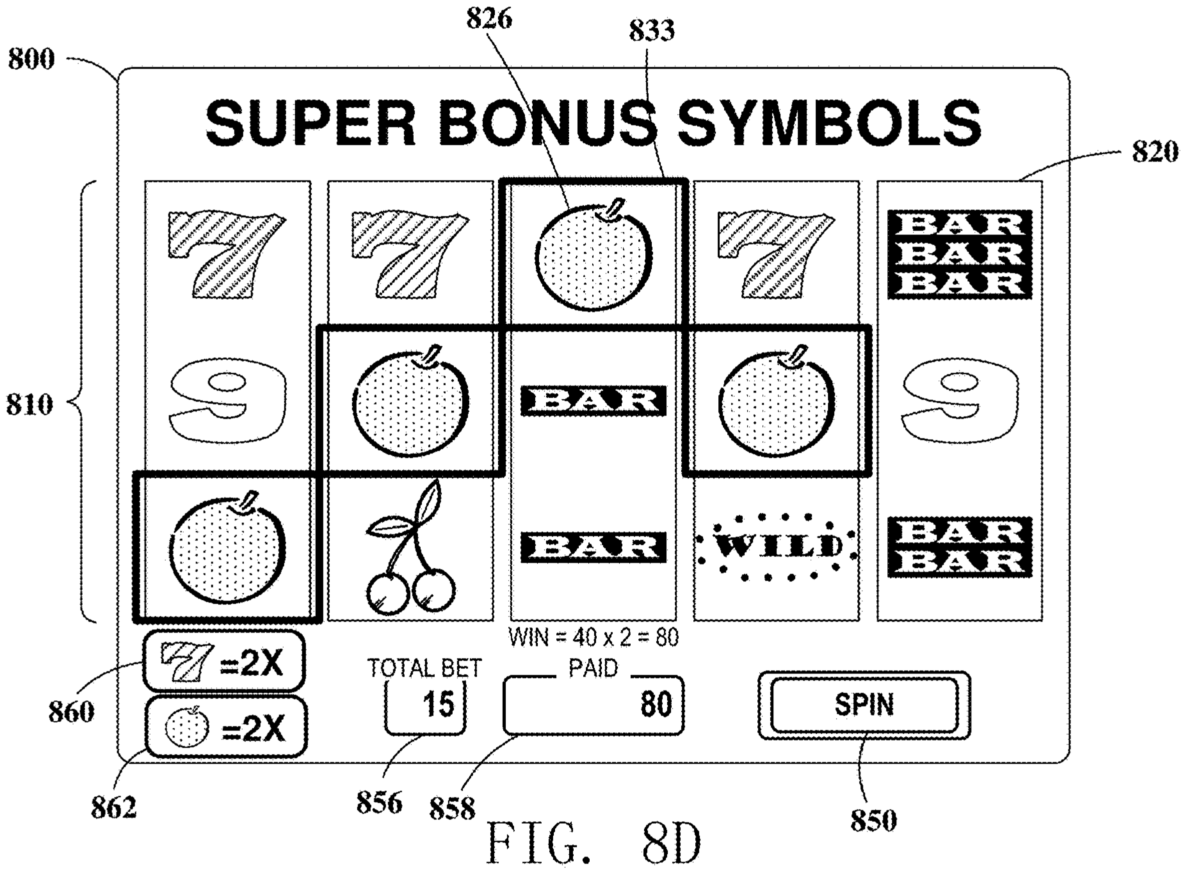
Figure 8E:
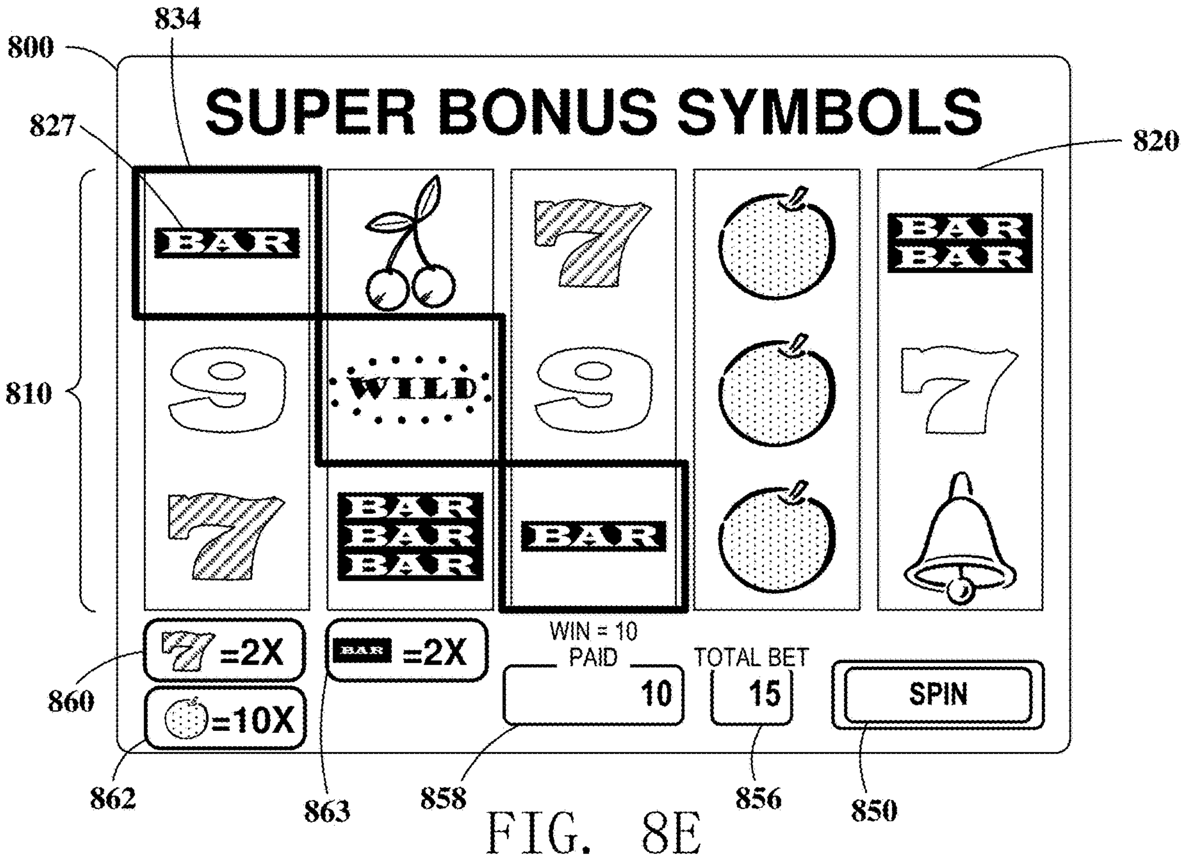
Figure 8F:
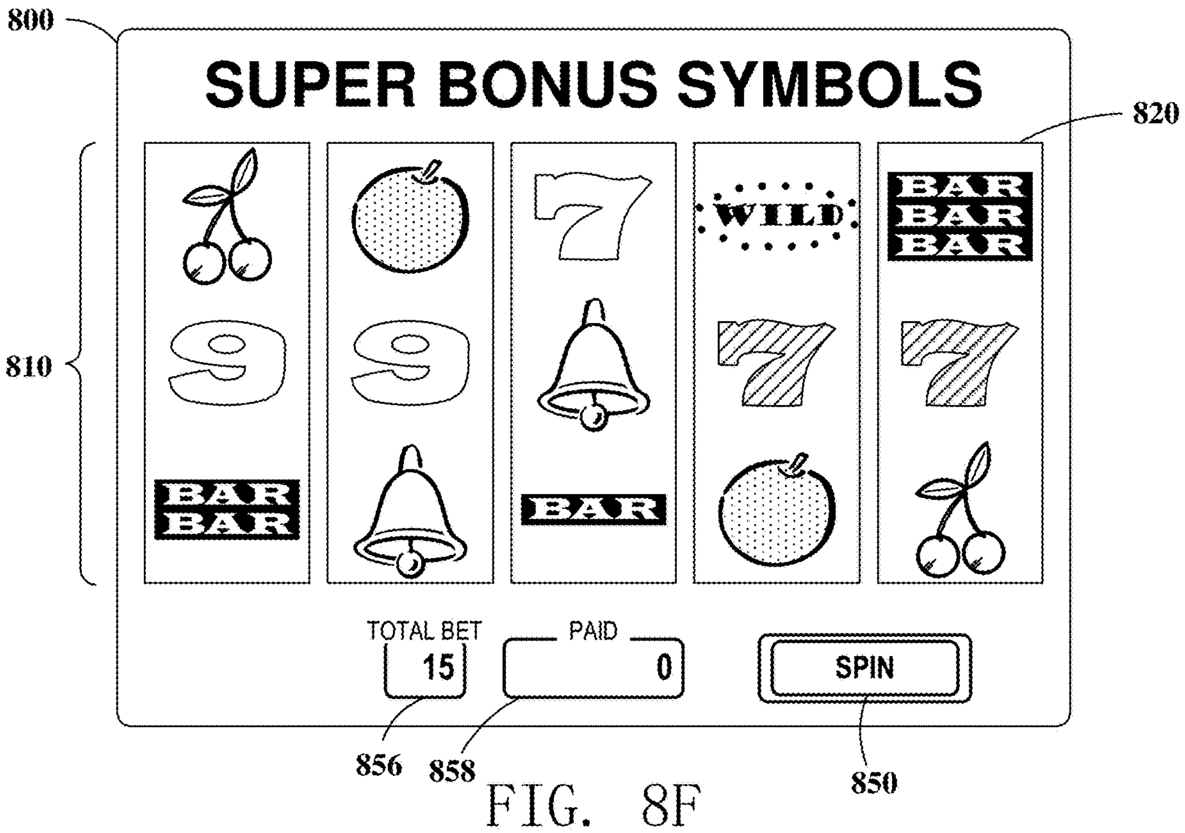

Referring to FIG. 8C, a second game outcome for a second gaming event is shown. Note that the bonusing of the shaded 7 symbols 825 from the first gaming event is indicated in the bonus indicator 860. With this second game outcome, a winning combination is received for the orange symbols 826 along the top horizontal pay line as shown by win box 832. Since a win was received, the bonus of the shaded 7 symbol 825 is maintained, and a bonus for the orange symbols 826 is implemented for the subsequent games, as shown in the second bonus indicator 862 in FIG. 8D. FIG. 8D shows the outcome of the third gaming event. Here, a four-symbol win for the orange symbols 826 is received as shown by the win box 833. Since oranges were bonused, the 40 credit award for the four symbol pay is multiplied by "2×" for an 80 credit win. Additionally, since any win was received, the bonus for the shaded 7 symbols 825 is maintained. The second bonus indicator 862 is then updated to reflect that the bonus associated with the orange symbols is increased to "10×," as shown in FIG. 8E. FIG. 8E shows the outcome of the fourth game event. Here, yet another symbol type gets a win: the single bar symbols 827, as shown by win box 834. The player is paid 10 credits for this three symbol win. FIG. 8E also shows the creation of a third bonus indicator 863 to show that the single bars are now bonused at a "2×" rate. This bonusing continues until a winning symbol combination is not received on the game grid 810. Once a game outcome is received without a winning symbol combination, the bonus indicators 860, 862, 863 are removed and the game returns to an un-bonused state, as shown in FIG. 8F.

Figure 9A:
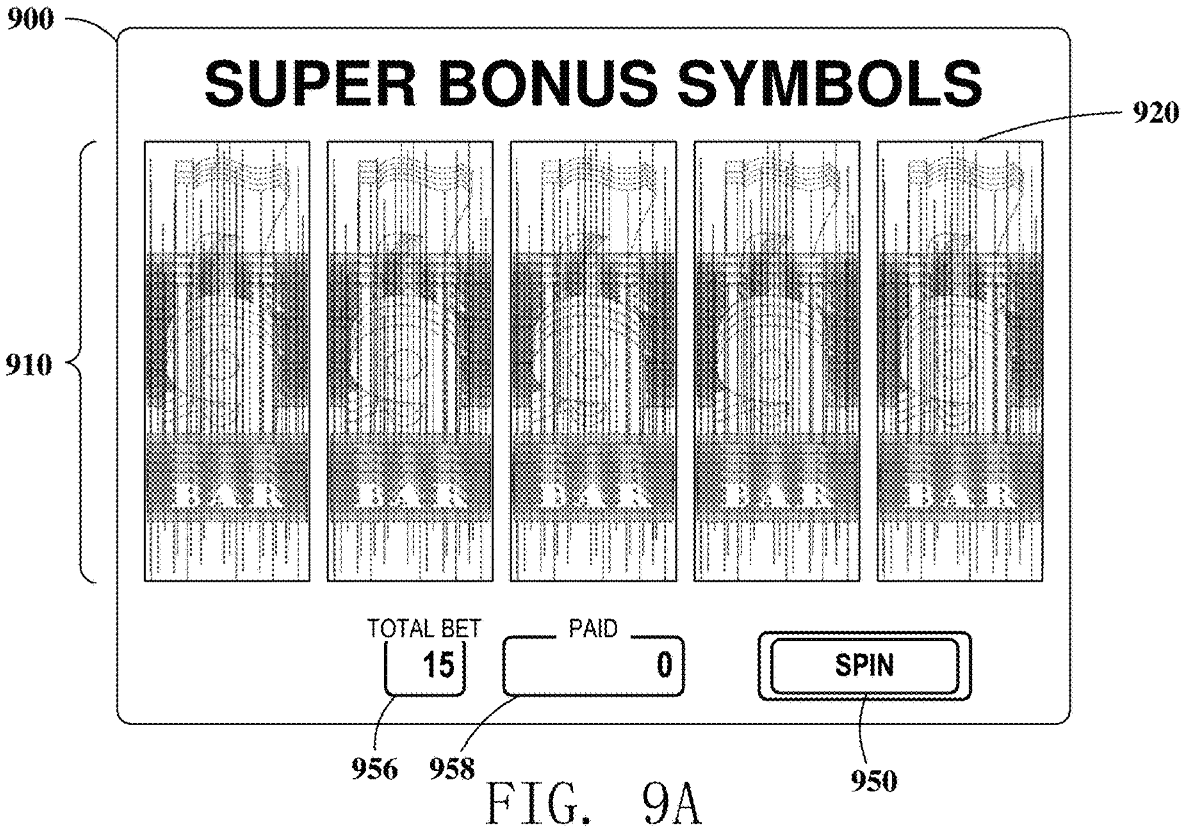
FIGS. 9A-9F are detail diagrams of a gaming device display illustrating another example game progression according to embodiments of the invention.
Figure 9B:
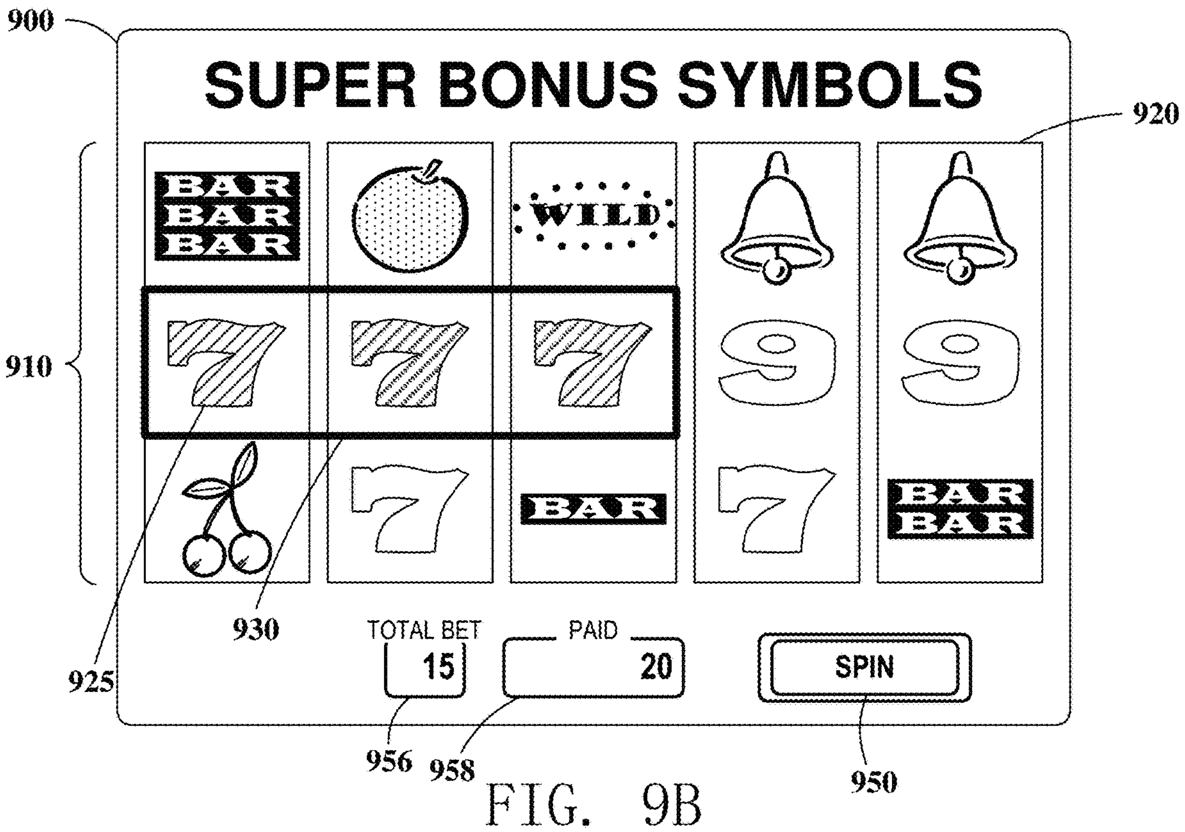

Referring to FIGS. 9A-9F, a gaming display 900 includes a game grid 910 in a game play area displaying portions of multiple game reels 920. The game display also includes a control area having various buttons and meters, such as a "Spin" button 950, a "Total Bet" meter 956, and a "Paid" meter 958. In FIG. 9A, the game reels 920 are spun when a first gaming event is initiated. In FIG. 9B, the game reels 920 are stopped to show a first game outcome in the game grid 910. As shown in FIG. 9B, a symbol combination of "shaded 7" symbols 925 is received on a center horizontal payline, which is emphasized by markings such as win boxes 930 outlining the symbols involved in the winning combination.

Figure 9C:
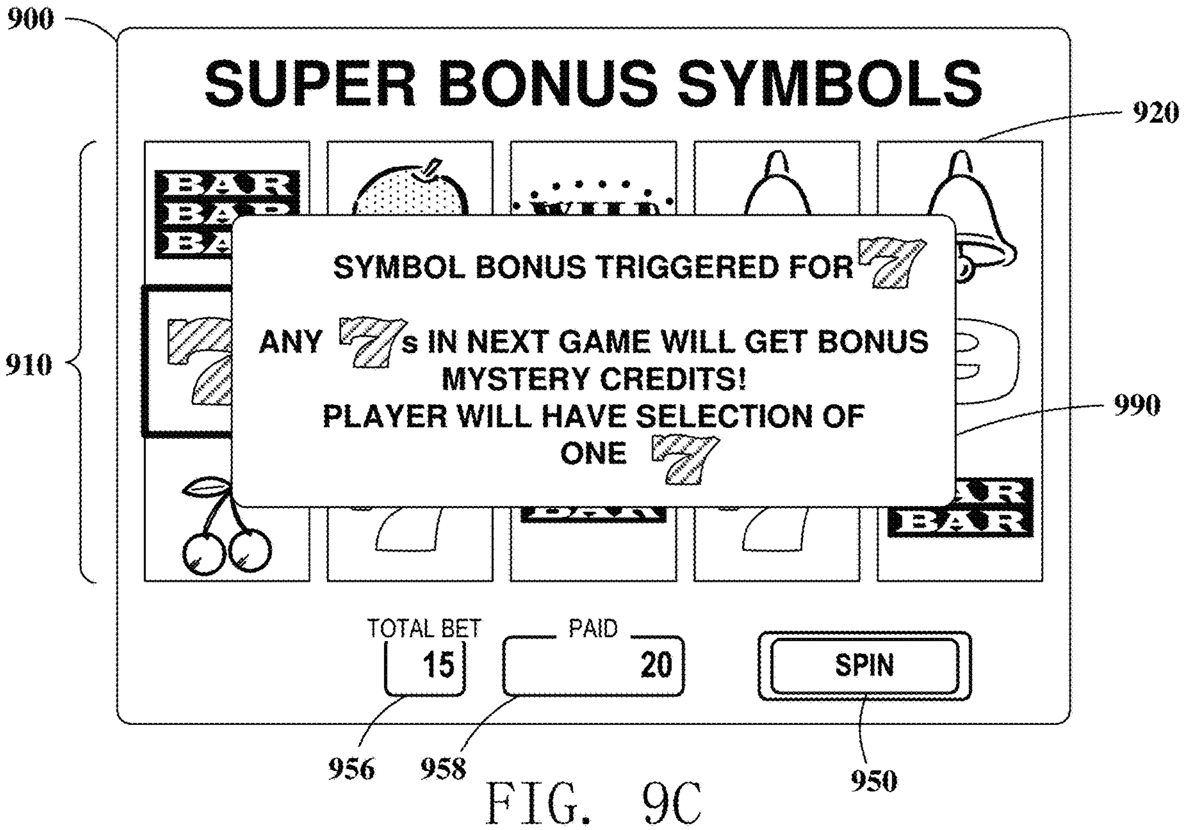

In FIG. 9C, a message box 990 indicates that this winning symbol combination has triggered a bonus where any shaded 7 symbols 925 received in the next gaming event will become associated with a secondary bonus. Here, the secondary bonus involves randomly choosing a mystery credit value for each of the shown shaded 7 symbols 925 and making each symbol selectable. The player is then allowed to select one of the shaded 7 symbols 925 to receive the associated mystery credit prize. In some embodiments, the player may need to receive a minimum number of bonused symbols to be eligible for this secondary bonus. In other embodiments, the bonused symbols may need to be part of a line pay or other winning symbol combination to be eligible for the secondary bonus. Additional bonus options are implemented in different embodiments as discussed above.

Figure 9D:
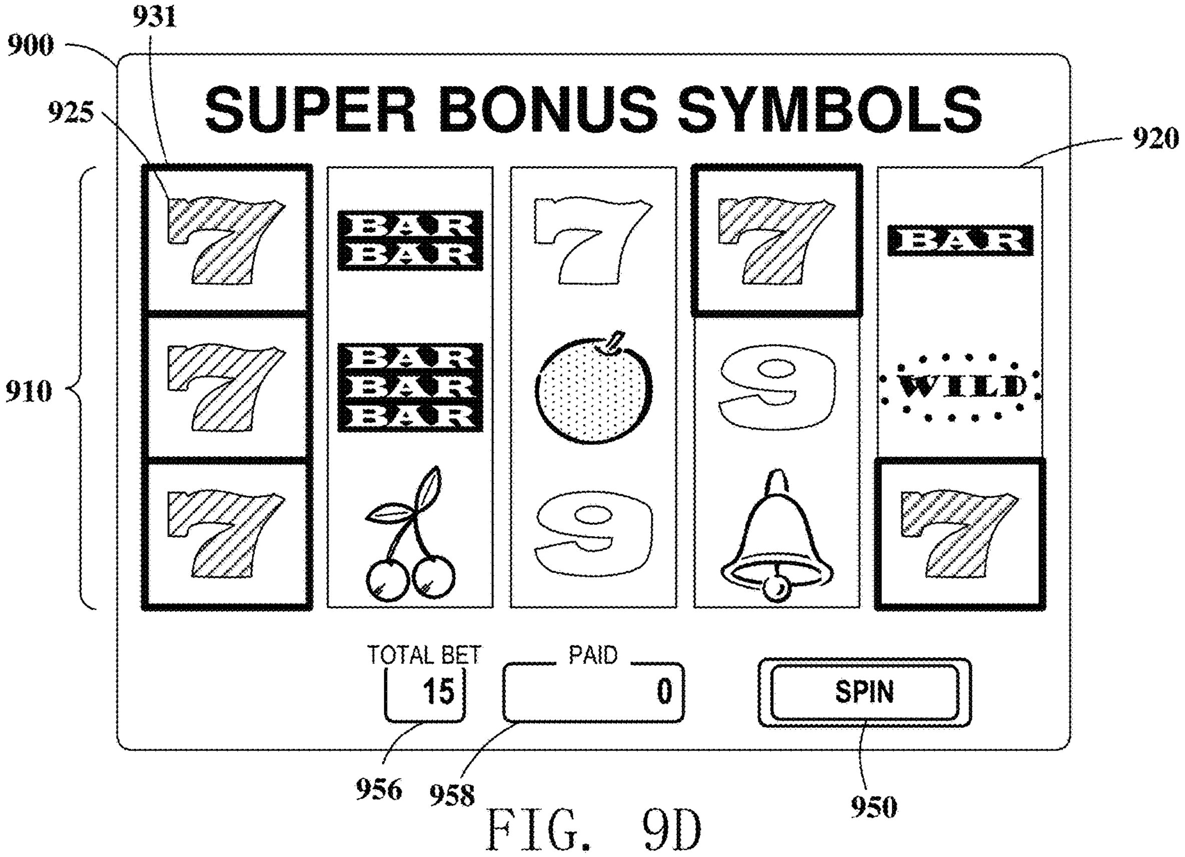
Figure 9E:
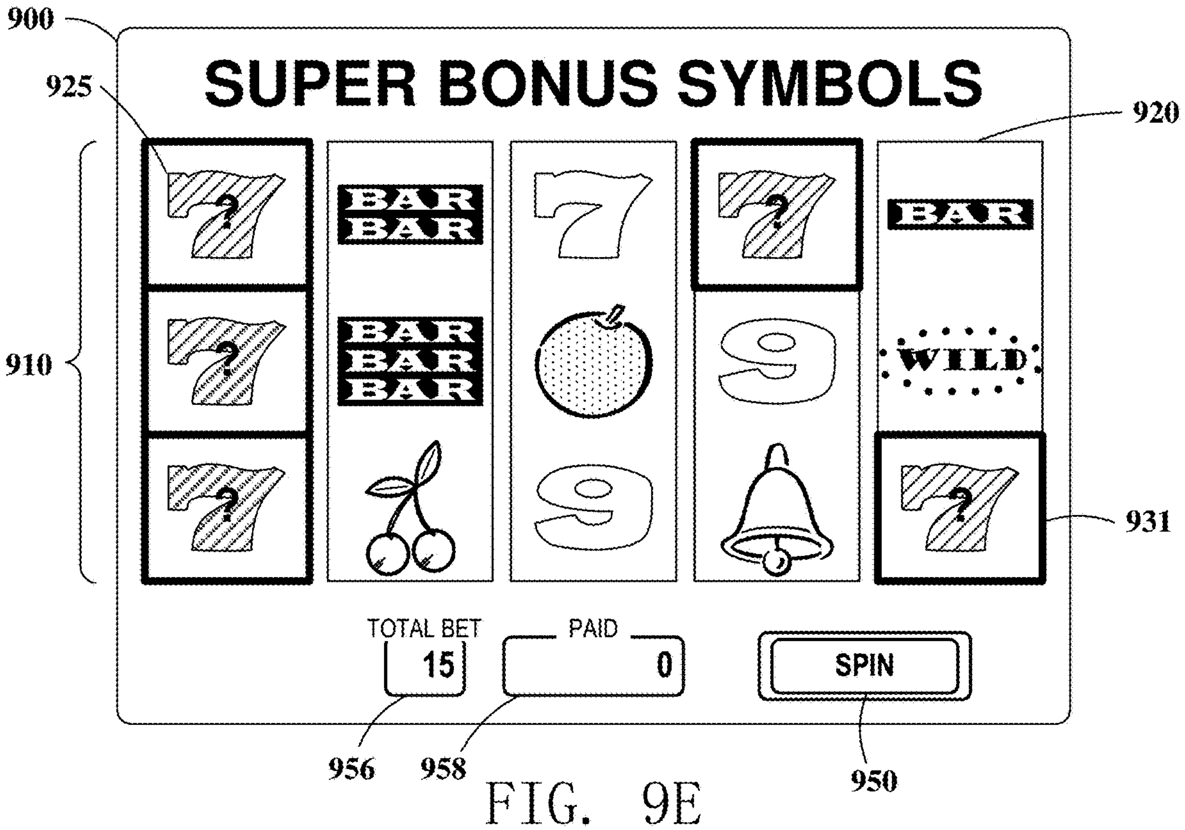
Figure 9F:
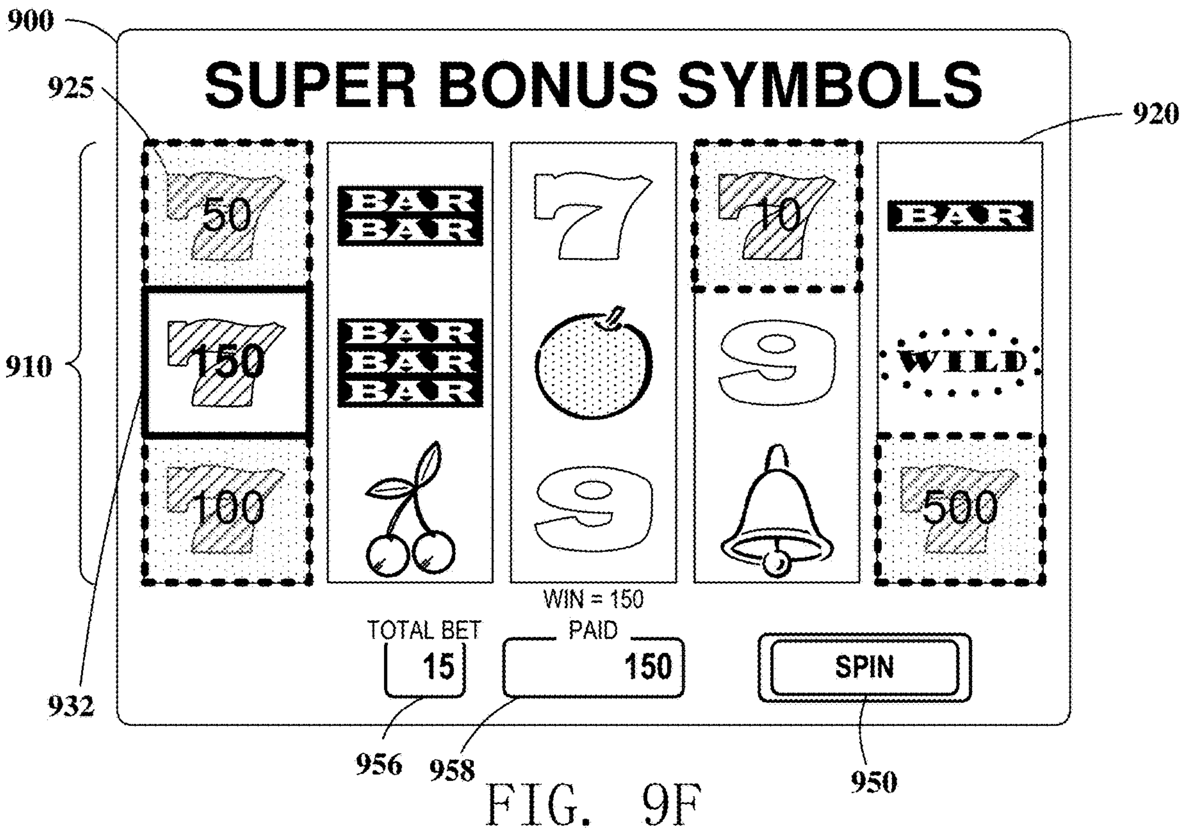

In FIG. 9D, the outcome of the second gaming event is displayed. Here, five different shaded 7 symbols 925 appear on the game grid 910. In this embodiment, the shaded 7 symbols appearing do not have to be part of a winning symbol combination to be bonused, but a minimum of three symbols must be received to trigger the secondary bonus. In FIG. 9E, these bonused symbols 925 become selectable in selection boxes 931. In FIG. 9F, a player has selected the middle bonused symbol 932 in the first column for an award of 150 credits. The other mystery credit values may be revealed for the other bonus symbols 925 that were not selected.

Figure 10A:
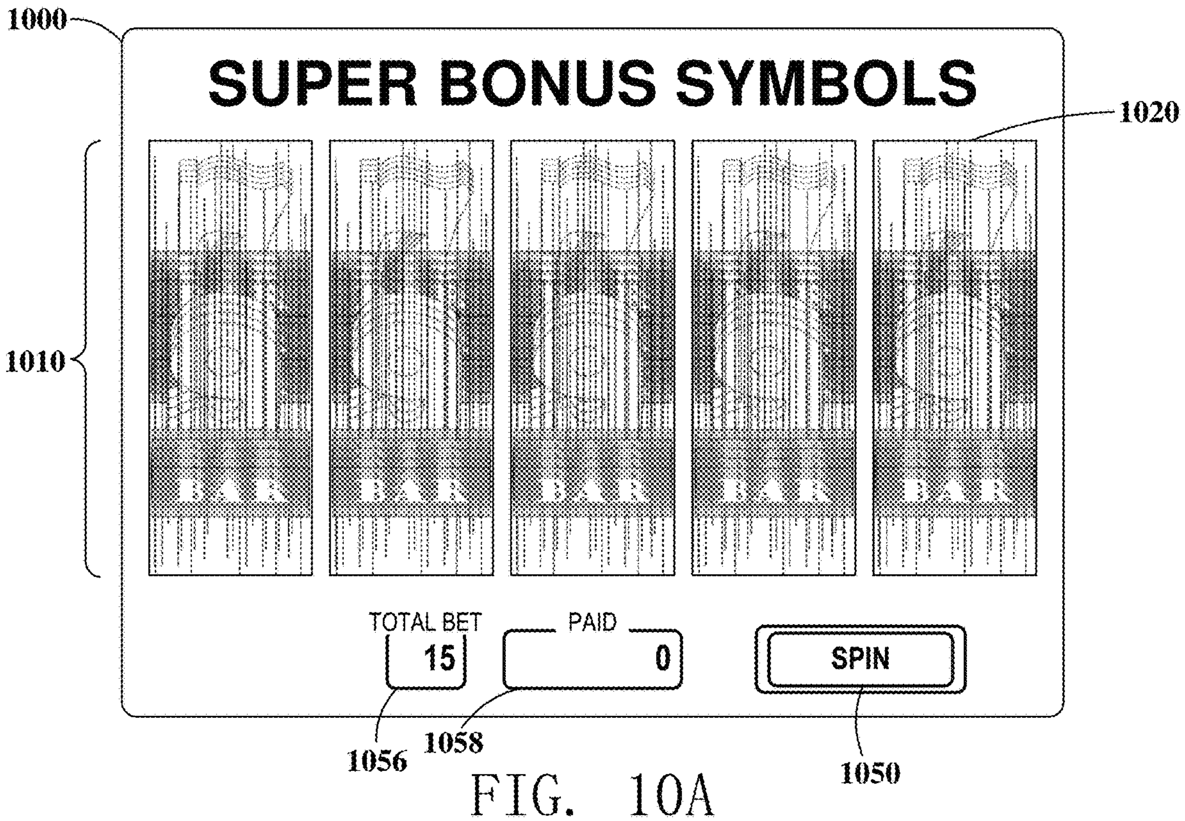
FIGS. 10A-10F are detail diagrams of a gaming device display illustrating another example game progression according to embodiments of the invention.
Figure 10B:
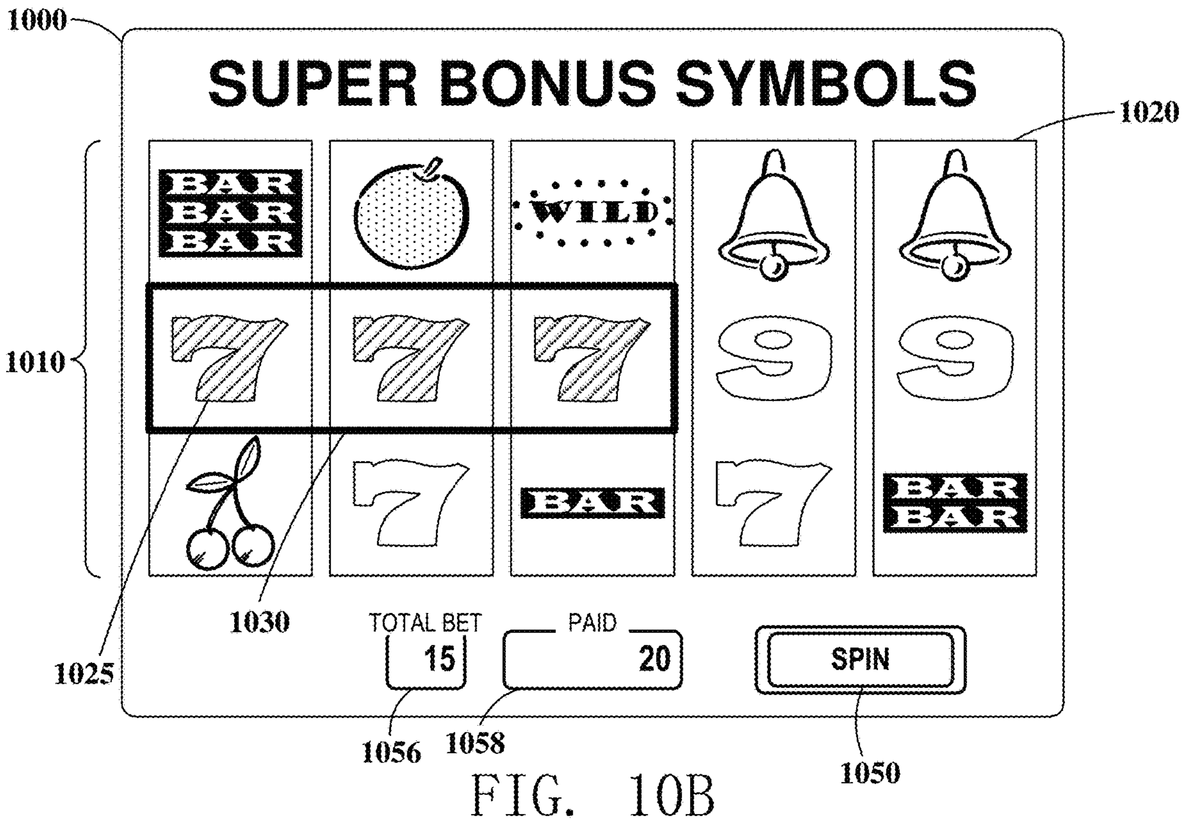
Figure 10C:
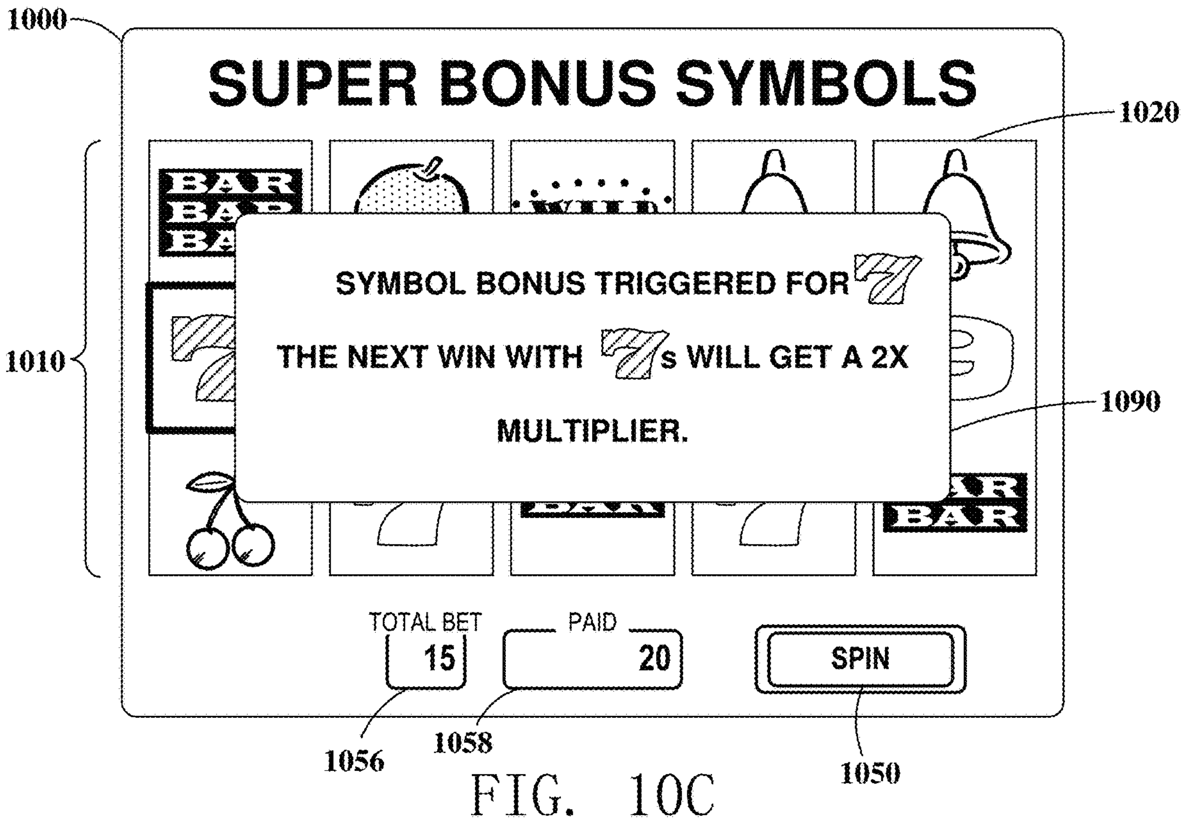
Figure 10D:
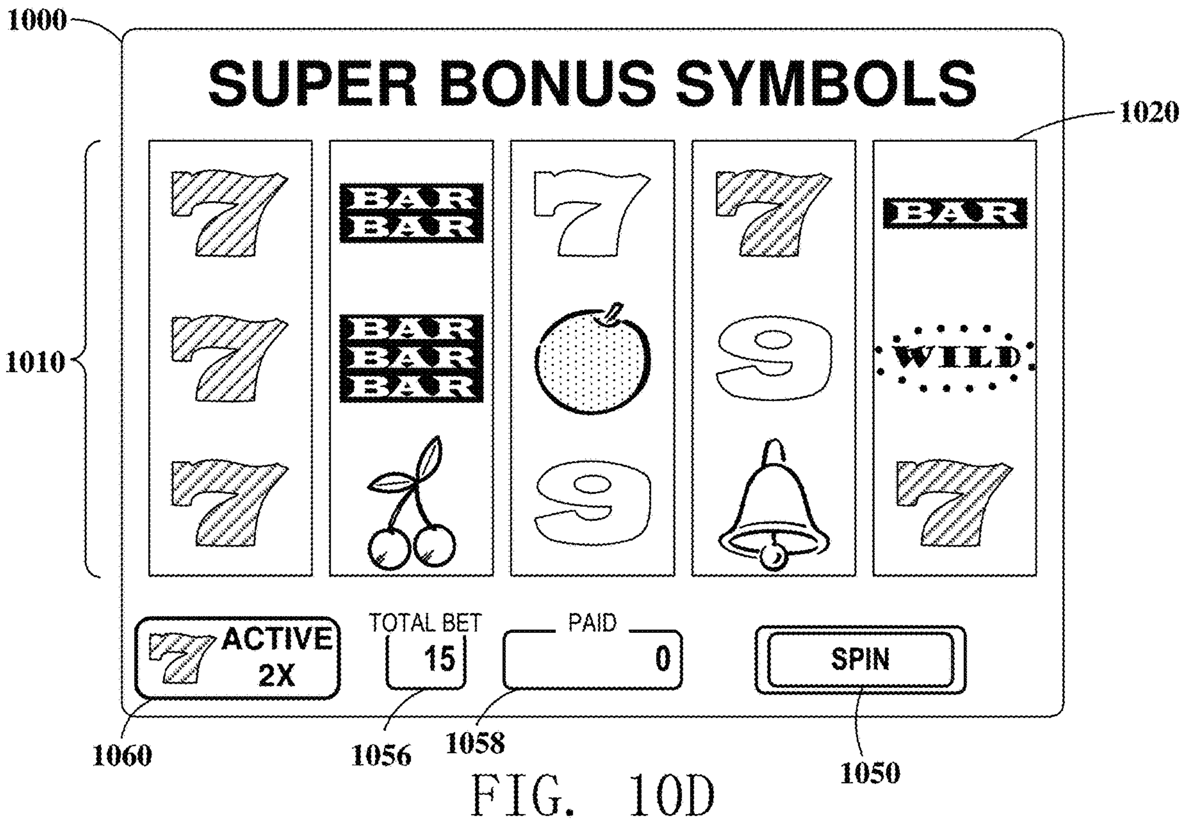
Figure 10E:
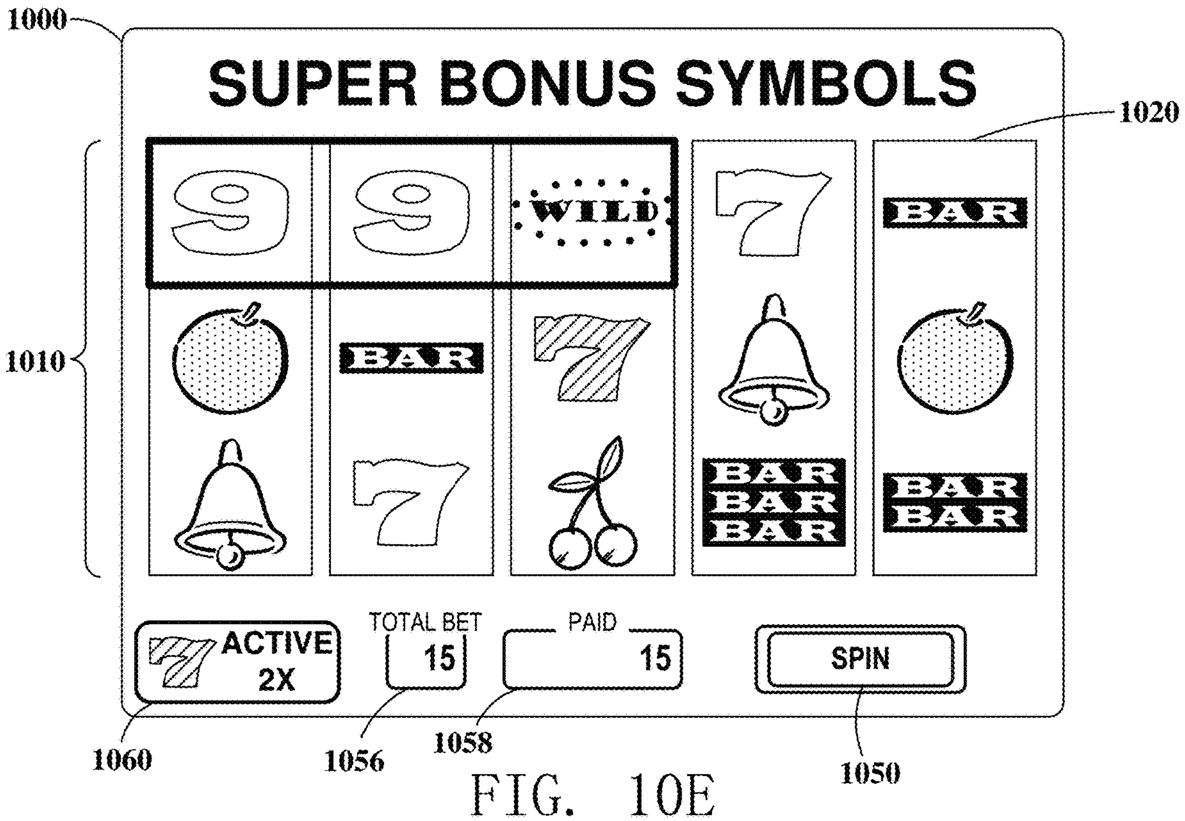
Figure 10F:
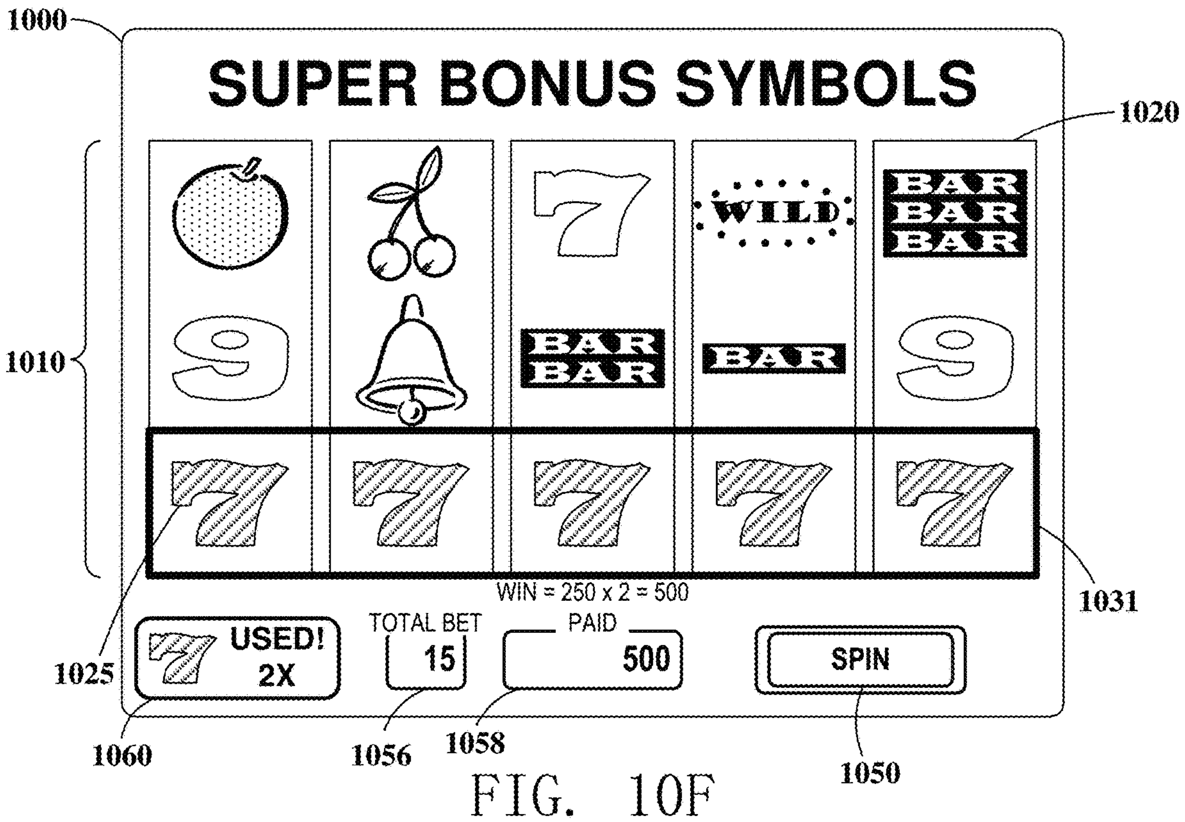

Referring to FIGS. 10A-10F, a gaming display 1000 includes a game grid 1010 in a game play area displaying portions of multiple game reels 1020. The game display also includes a control area having various buttons and meters, such as a "Spin" button 1050, a "Total Bet" meter 1056, and a "Paid" meter 1058. In FIG. 10A, the game reels 1020 are spun when a first gaming event is initiated. In FIG. 10B, the game reels 1020 are stopped to show a first game outcome in the game grid 1010. As shown in FIG. 10B, a symbol combination of "shaded 7" symbols 1025 is received on a center horizontal payline, which is emphasized by markings such as win boxes 1030 outlining the symbols involved in the winning combination. In FIG. 10C, a message box 1090 indicates that this winning symbol combination has triggered a bonus where the next winning symbol combination that includes shaded 7 symbols will be bonused with a "2×" multiplier. The bonusing of the shaded 7 symbol is reflected in the bonus indicator 1060 shown in FIG. 10D. FIG. 10D also shows the outcome of the second gaming event. Here, no winning symbol combinations were received, but the symbol bonus stays active. In FIG. 10E, a winning combination of another symbol is received in the third gaming event. However, because one symbol is already bonused, this new symbol is not bonused. In other embodiments, the new "9" symbol would become bonused and the shaded 7 symbol would no longer be bonused, or, as shown above, both symbols may become bonused. In FIG. 10F, a fourth game outcome is displayed. Here, a winning symbol combination including the bonused shaded 7 symbols 1025 is received and shown in win box 1031, and the pay associated with the winning symbol combination is multiplied by "2×" as shown in the Paid meter 1058. Since the bonus has now been used, the bonus indicator 1060 is updated and then removed in the subsequent game event and no symbol is bonused for the next game.

Figure 11A:
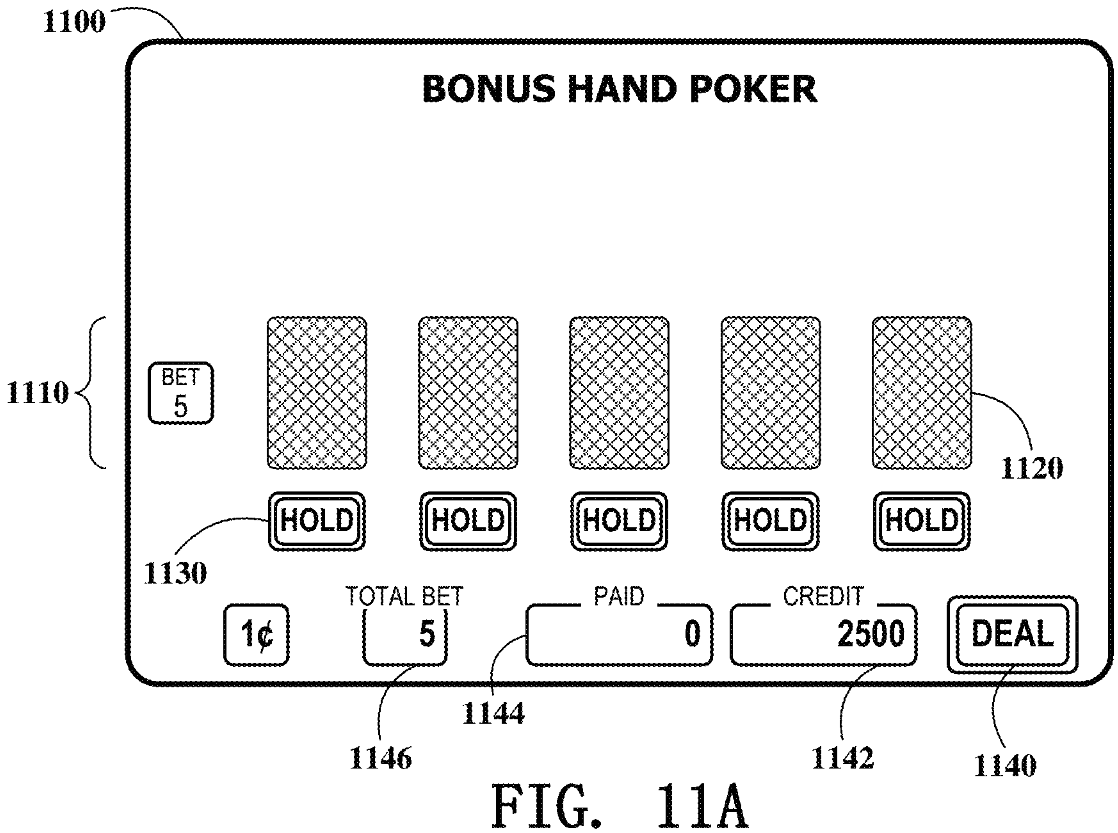
FIGS. 11A-11F are detail diagrams of a gaming device display illustrating another example game progression according to embodiments of the invention.
Figure 11B:
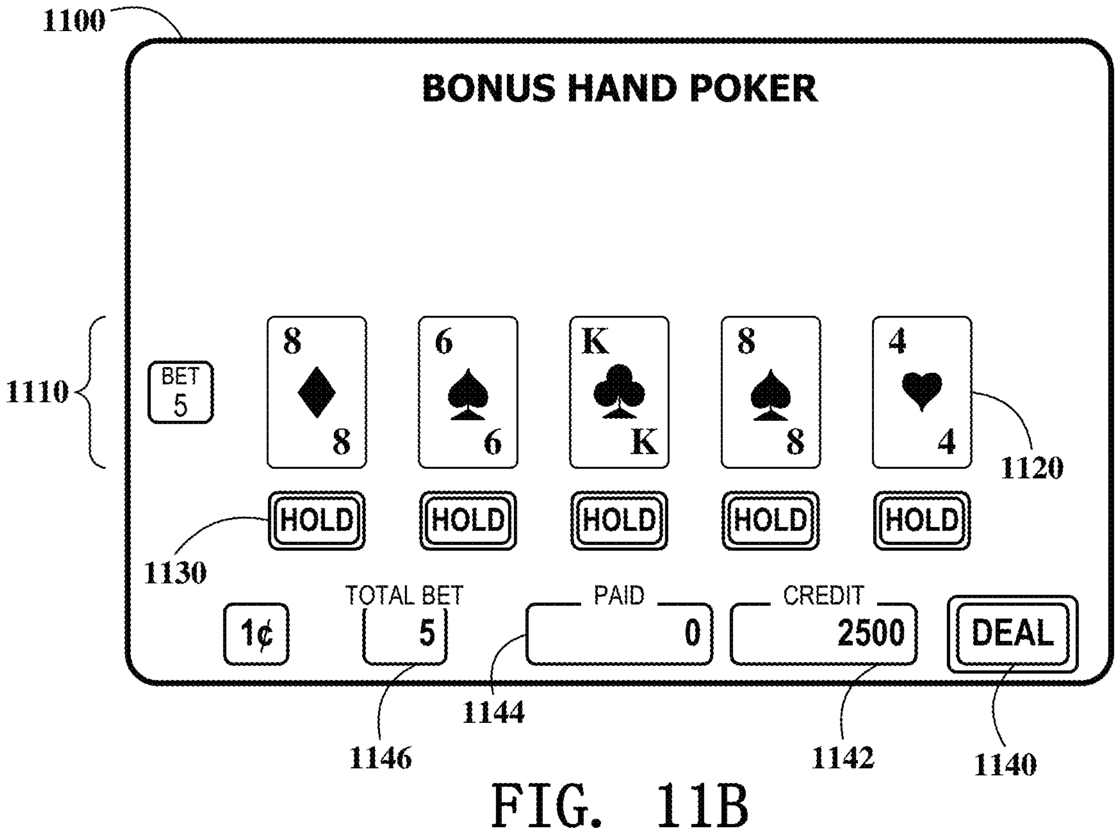
Figure 11C:
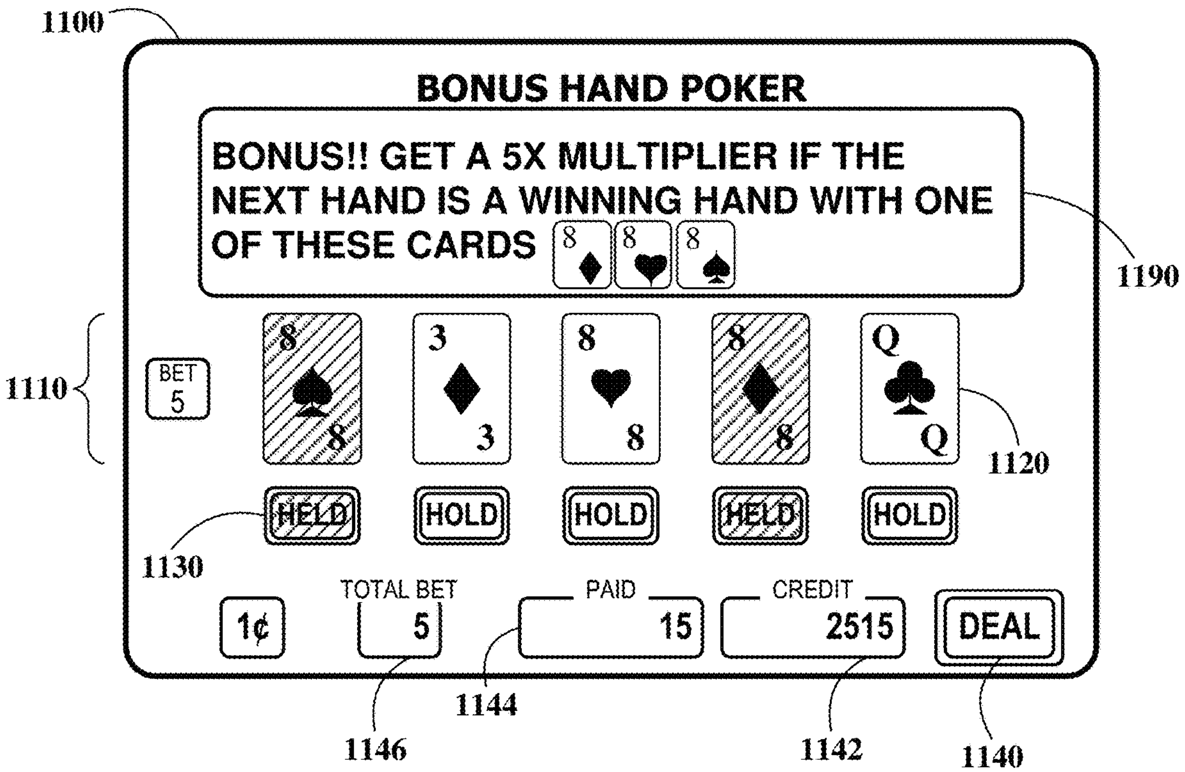

Referring to FIGS. 11A-11F, a gaming display 1100 shows a video poker game and includes a poker hand 1110 in a game play area displaying five playing cards 1120. The game display 1100 also includes a control area having various buttons and meters, such as a "Deal" button 1140, a "Total Bet" meter 1146, a "Credit" meter 1142, and a "Paid" meter 1144. Additionally, "Hold" buttons 1130 are provided for each card position in the poker hand 1110. In FIG. 11A, a first gaming event is initiated and five cards 1120 are dealt in the poker hand 1110. These dealt cards are shown in FIG. 11B for the first gaming event. In FIG. 11C, the player has "held" the two "8" cards and drawn new cards to complete the draw poker hand in the first gaming event. As shown in FIG. 11C, the player has drawn another "8" to get a three-of-a-kind poker hand. A message box 1190 is provided to inform the player of the bonusing of the "8s" for the next gaming event. Here, if any of the 8s are used in any other winning poker hand in the next gaming event, a bonus, such as a multiplier, would be used to modify the award or game outcome in the subsequent gaming event. Here, any winning hand in the next gaming event would have an associated award multiplied by a "5×" multiplier. In other embodiments, the three-of-a-kind type of win itself may be bonused in subsequent gaming events such that any three-of-a-kind received may be modified with, for example, a multiplier.

Figure 11D:
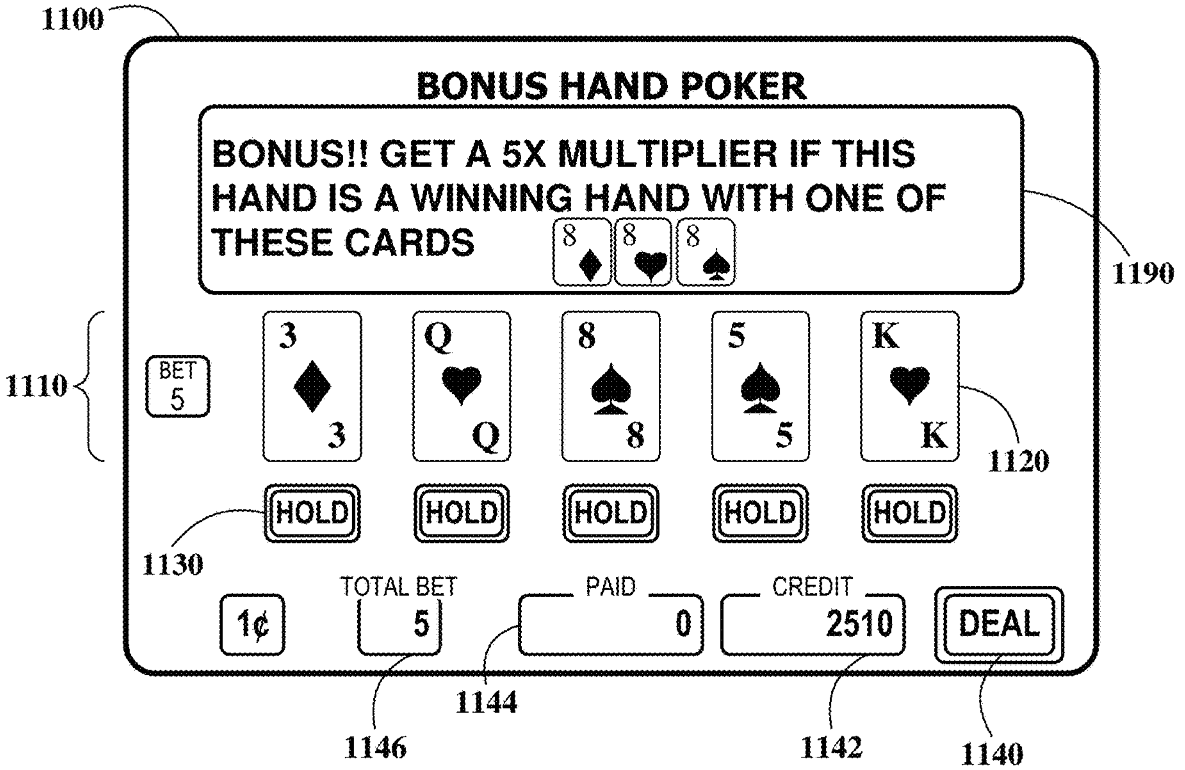
Figure 11E:
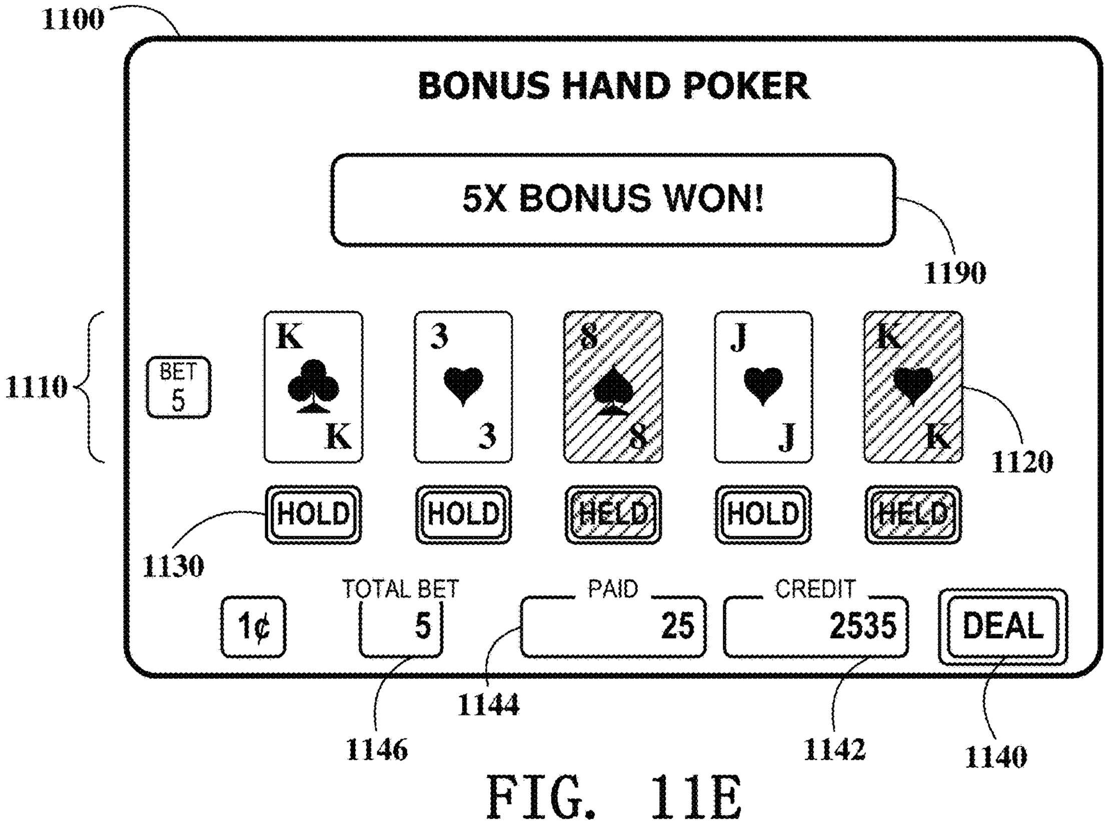
Figure 11F:
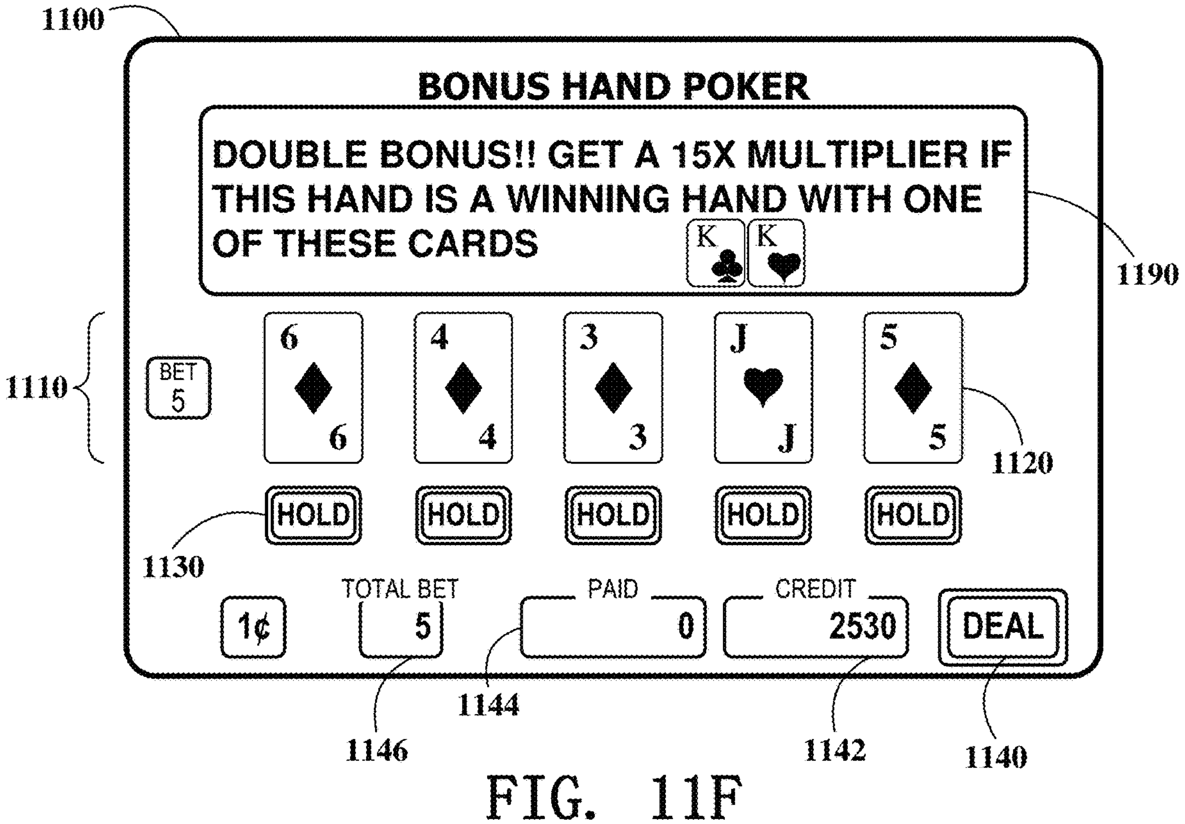

In FIG. 11D, a poker hand 1110 is dealt for a second gaming event. Here, it may be in the interest of the player to hold the dealt 8 of spades as it is one of the bonused cards. As shown in FIG. 11E, the player has held the 8 of spades along with the King of hearts, and has received replacement cards for the non-held cards to form a final poker hand. As indicated by the message box 1190, a "5×" multiplier was won since the 8 of spades is in the final hand and the final hand is a winning hand. In some embodiments, if a player receives multiple ones of the bonused cards, the multipliers (or other bonus type) can be added together, multiplied together, or otherwise improved. Returning to FIG. 11E, the 5 credit award for a pair of Kings is multiplied by the "5×" multiplier to give a final pay out of 25 credits. Since the bonus was used on a winning hand, a double bonus is provided for the subsequent hand as shown by the message box 1190 in FIG. 11F. Here, since the Kings were the winning cards, they are bonused in the next poker hand, which is dealt in FIG. 11F. Additionally, the bonus amount goes up to "15×" for this next poker hand if a winning hand is received where one of the specified Kings are used.

Figure 12A:
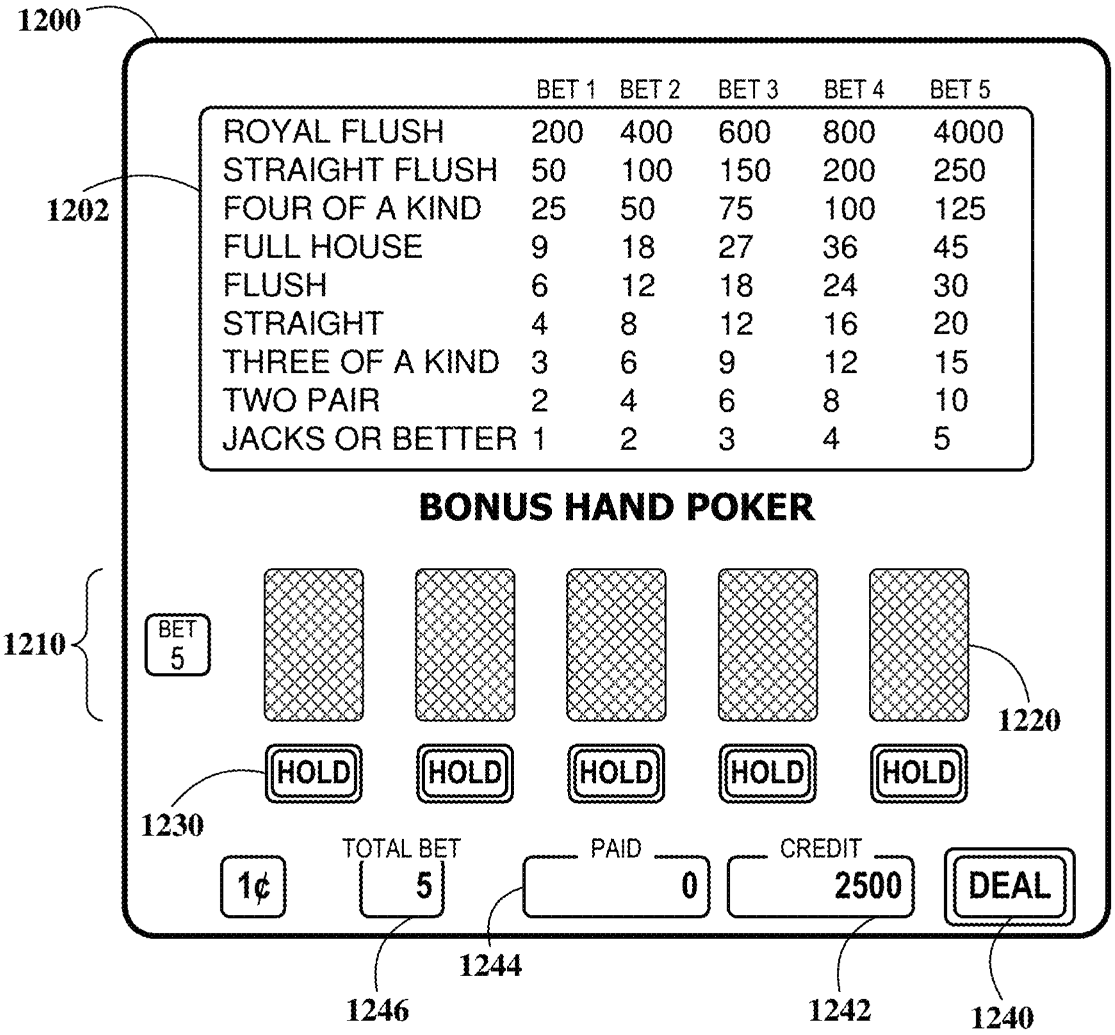
FIGS. 12A-12E are detail diagrams of a gaming device display illustrating another example game progression according to embodiments of the invention.
Figure 12B:
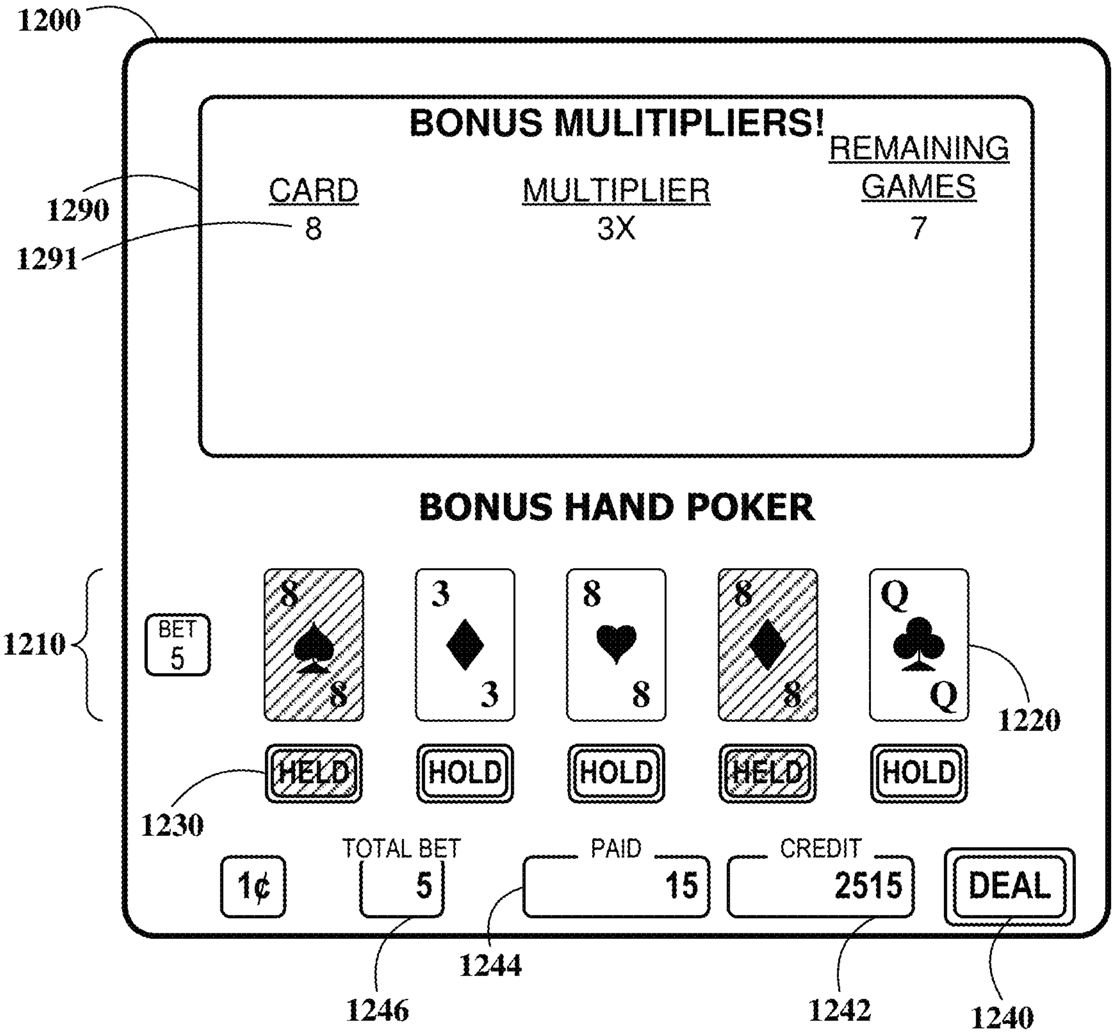

Referring to FIGS. 12A-12E, a gaming display 1200 shows a video poker game and includes a poker hand 1210 in a game play area displaying five playing cards 1220, as well as paytable information 1202. The game display 1200 also includes a control area having various buttons and meters, such as a "Deal" button 1240, a "Total Bet" meter 1246, a "Credit" meter 1242, and a "Paid" meter 1244. Additionally, "Hold" buttons 1230 are provided for each card position in the poker hand 1210. In FIG. 12A, a first gaming event is initiated where five cards 1220 from a deck of cards is selected to be dealt in the poker hand 1210. These dealt cards 1220 are displayed and signals are received from player inputs to hold none, some, or all of the cards in the poker hand 1210. Replacement cards from the deck of cards are used to replace any discarded (non-held) cards to complete a final poker hand 1210 for the first gaming event, which is shown in FIG. 12B. Here, the player has held the 8S (8 of spades) and 8D from the dealt hand and has drawn the remaining three cards including an 8H.

This results in a three-of-a-kind for the "8s" (eights), which has a 15 credit award as shown in the Paid meter 1244. Also, because the "8s" were used in a winning hand, a bonus table 1290 appears which shows a multiplier to be used in the next "x" number of gaming events. Here, bonus table 1290 includes a first entry 1291 showing that wins having an "8" card included will receive an extra "3×" multiplier for any awards, provided that the win occurs in the next seven games. In this example embodiment, all table entries in the bonus table 1290 are given a seven card window to be used. The multiplier value is fixed and is dependent on the type of winning combination. Here, since the win was a 3-of-a-kind, the fixed multiplier was a "3×" multiplier. Pairs and two pair wins may be given a "2×" multiplier while quads (4-of-a-kind) may be given a "25×" value. Straights, flushes, and full houses may have a multiplier only associated with one value (such as the highest numbered card in the straight or flush, and the 3-of-a-kind portion of the full house), may have their own entry in the table (i.e., if another straight is received in the next 7 games, a "4×" multiplier is give, etc.), or another rule may be used to include these winning combinations in the bonus table 1290.

Figure 12C:
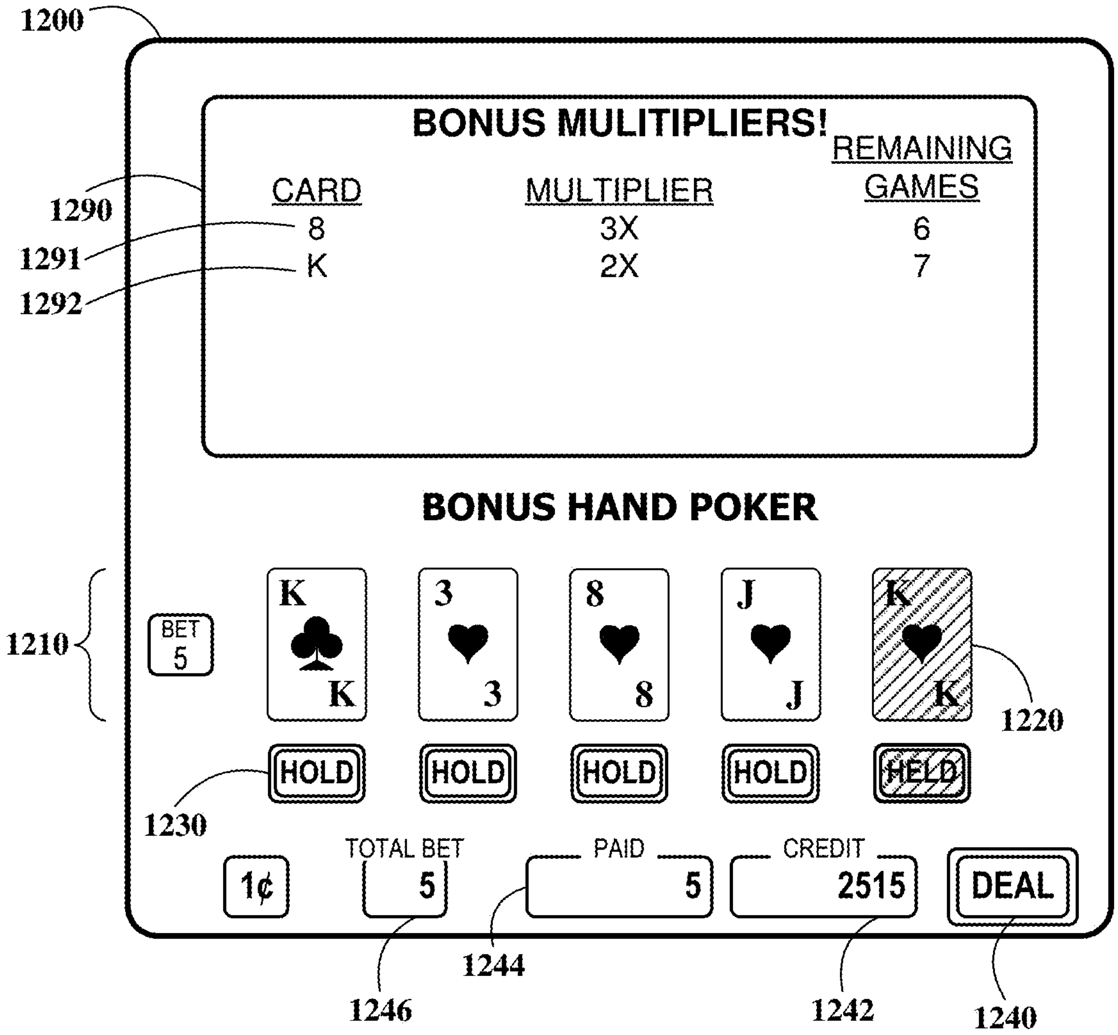
Figure 12D:
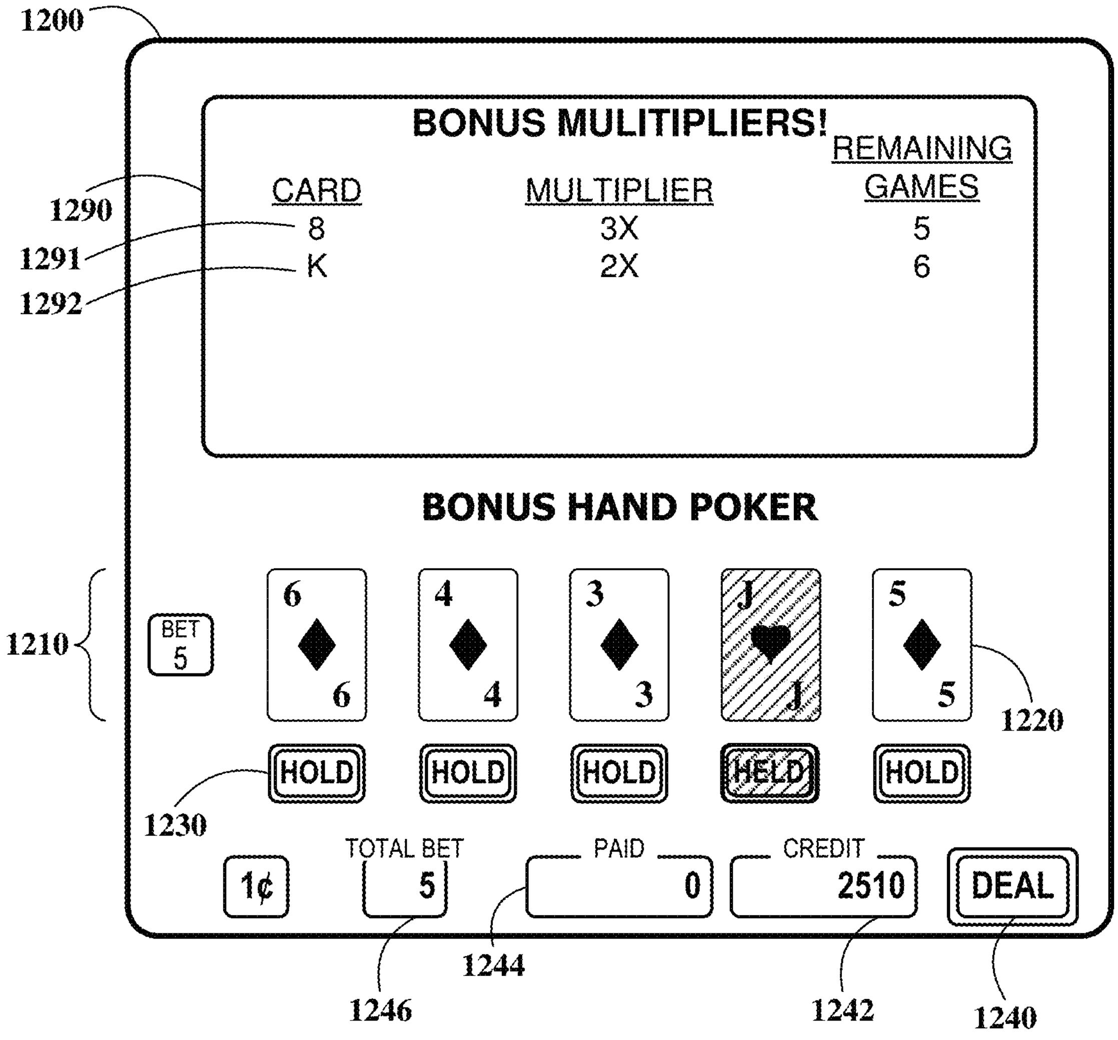

In FIG. 12C, the player has received a pair of kings in the second gaming event on the game display 1200. Here, a second entry 1292 is made in the bonus table 1290, and the number of games remaining for the first entry 1291 is decremented. Here, because the winning combination was a pair of cards, the multiplier associated with the second table entry 1292 is "2×". However, in other embodiments, all winning combinations may have the same multiplier value, or the multiplier value may be chosen at random. In FIG. 12D, the outcome of the third gaming event is shown, and no winning combinations are received. Here, both the first and second entries 1291, 1292 in the bonus table 1290 have their respective remaining game number decremented.

Figure 12E:
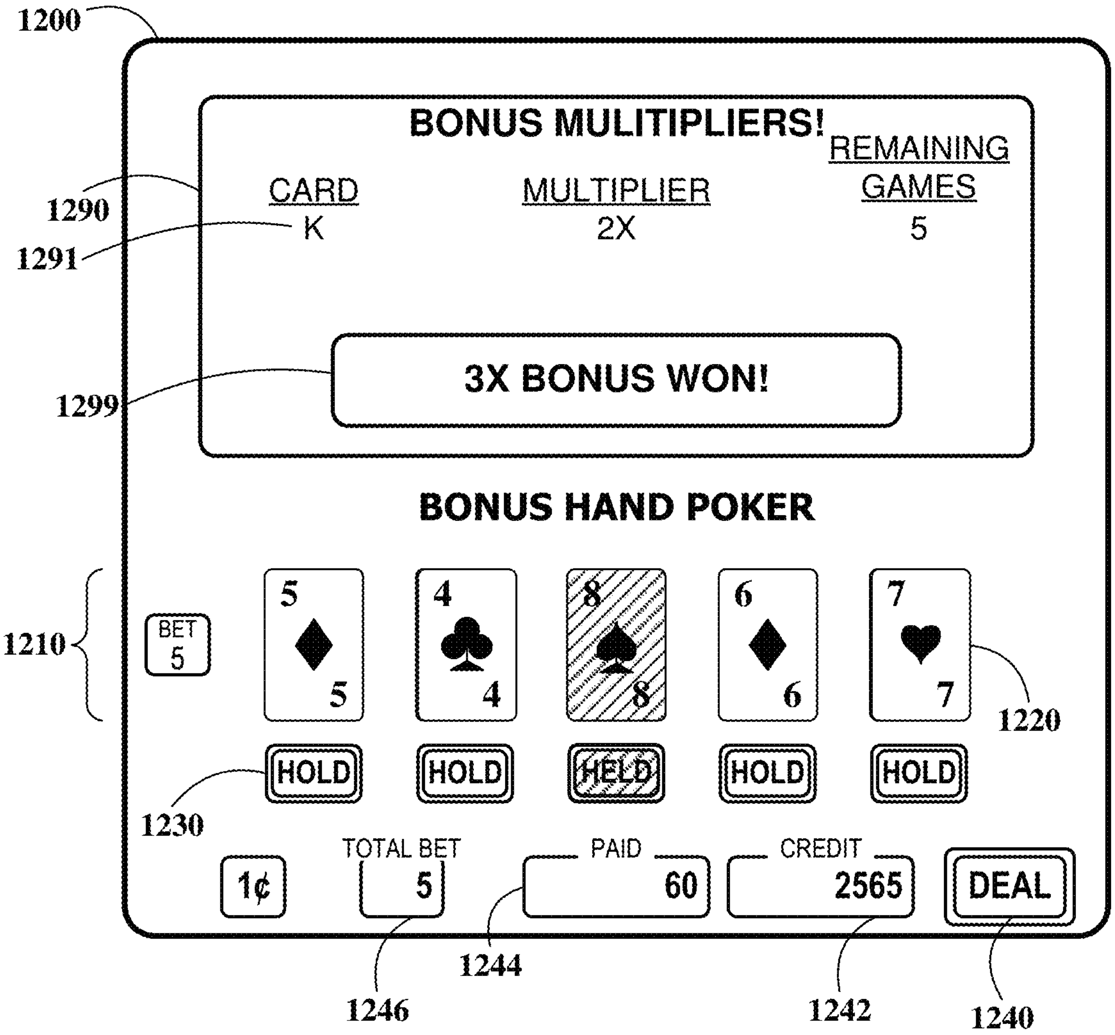

In FIG. 12E, the outcome of the fourth gaming event is shown, where an 8S is received as part of a straight. Hence, because an "8" was part of another winning combination, the award associated with that winning combination is award the multiplier value associated with "8" in the bonus table 1290. Since that multiplier value was "3×" (see FIG. 12D), a message window 1299 is shown with the awarded multiplier and the 20 credits associated with a straight is multiplied by "3×" to give a 60 credit win as shown in the Paid meter 1244. In this embodiment, because "8" was used, it is removed as an entry from the bonus table 1290. In other words, the entries in the bonus table 1290 must be used by the number of remaining games shown with each entry. If they are used, they are awarded and removed. However, in other embodiments, the entries remain for the all of the specified games. So in the above embodiment, any wins with "8" as part of the win in the next 4 games would also get a "3×" multiplier. In yet other embodiment, not only do the entries remain, but they may be positively incremented. In some of these embodiments, the remaining game number is reset to seven games, and the multiplier value may either remain at the previous fixed number, may be set to whatever number is associated with the new winning symbol combination, or may be incremented over the previous fixed value. For example, since the new winning symbol combination in FIG. 12E was a straight with "8" as the highest value, the new multiplier value associated with "8s" may be "4×" (i.e., the value associated with straights), may be "7×" by combining the previous "3×" value with the new "4×" value, or may be incremented a different way, such as by using the product of the multipliers. In other embodiments, the remaining games number for a table entry may be maintained, but the multiplier value may be increased by one of the methods described above. Thus, in the above example, the table entry for "8" would remain for another 4 gaming events, but now have a "7×" (or other) multiplier associated with it.

Figure 13A:
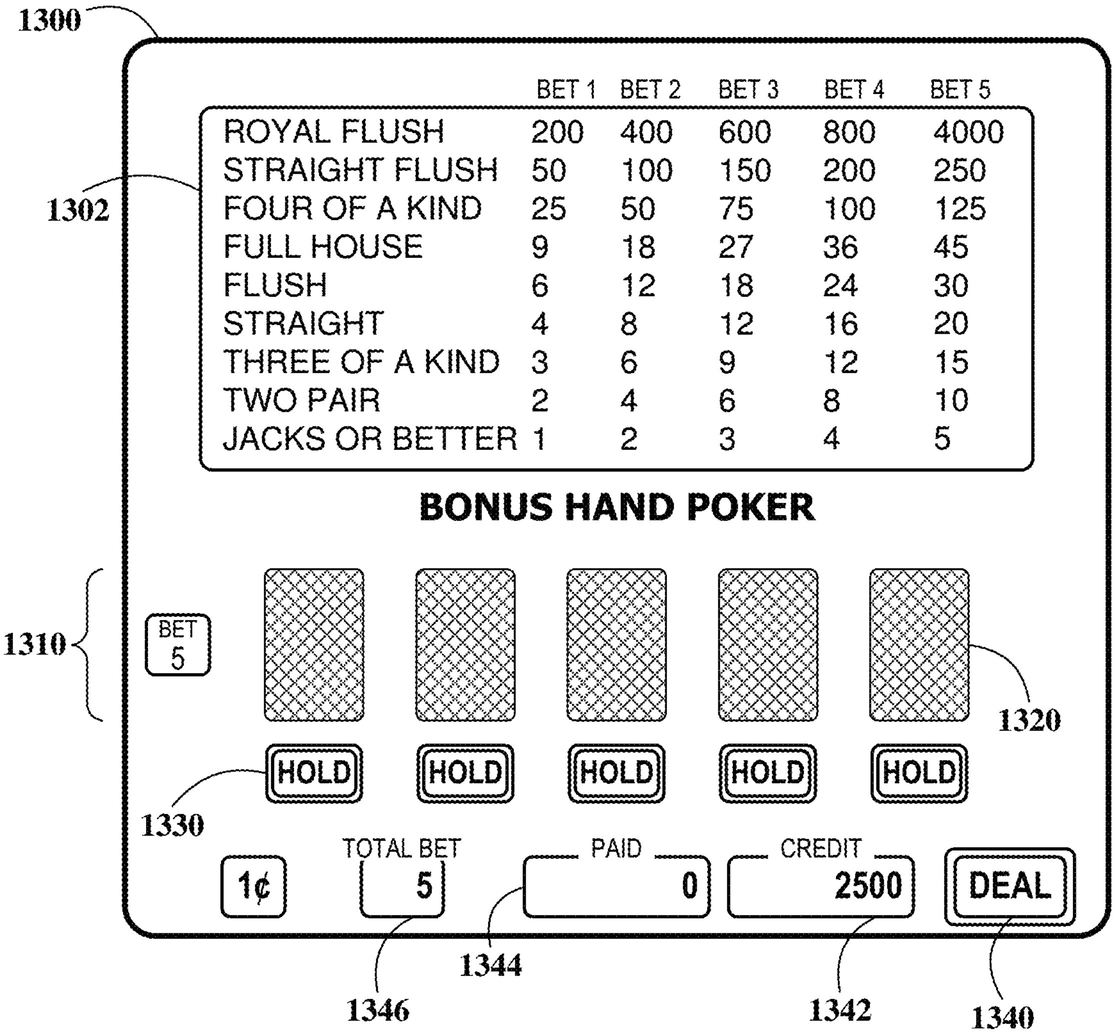
FIGS. 13A-13E are detail diagrams of a gaming device display illustrating another example game progression according to embodiments of the invention.
Figure 13B:
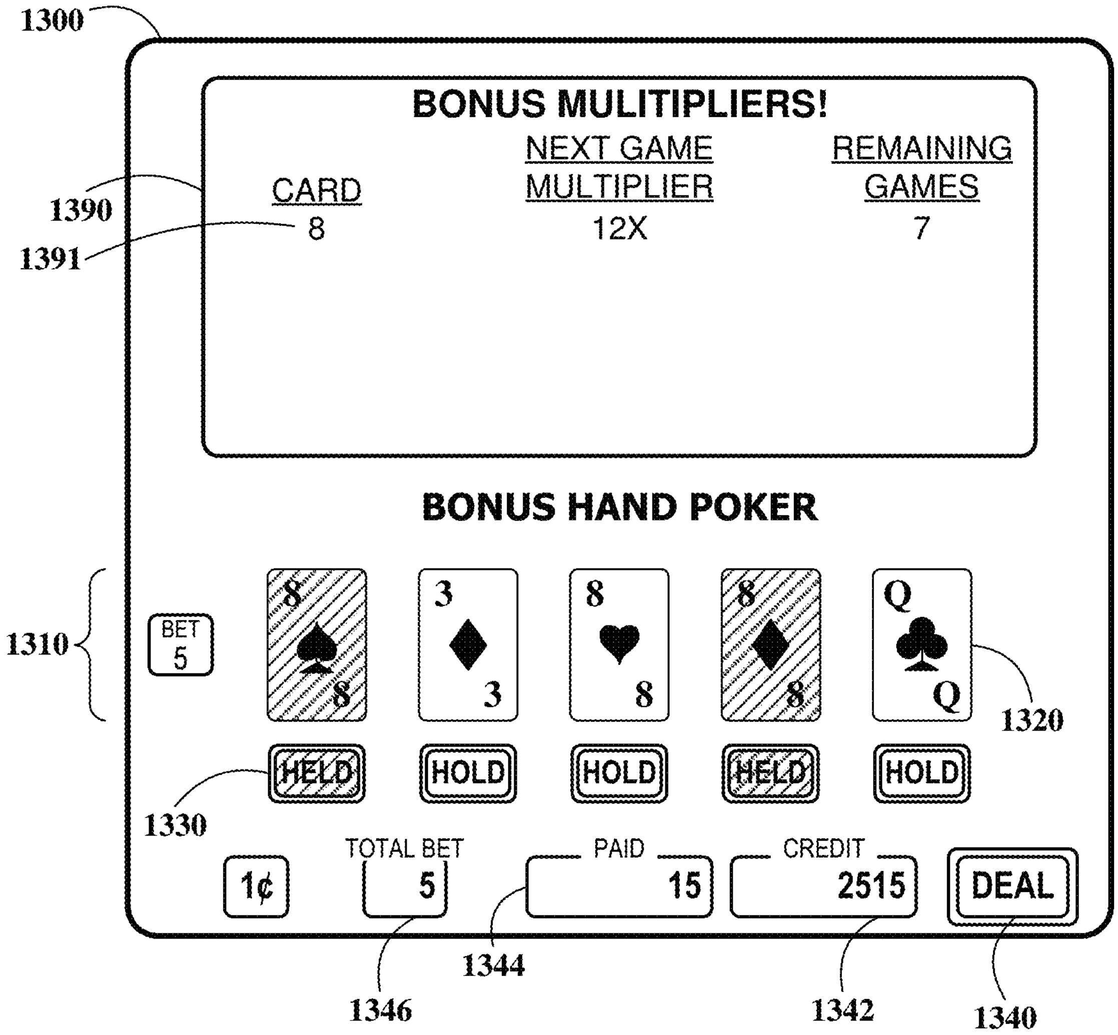

FIGS. 13A-13E show a similar game progression to the one shown in FIGS. 12A-12F, but use a different bonus mechanic Referring to FIGS. 13A-13E, a gaming display 1300 shows a video poker game and includes a poker hand 1310 in a game play area displaying five playing cards 1320, as well as paytable information 1302. The game display 1300 also includes a control area having various buttons and meters, such as a "Deal" button 1340, a "Total Bet" meter 1346, a "Credit" meter 1342, and a "Paid" meter 1344. Additionally, "Hold" buttons 1330 are provided for each card position in the poker hand 1310. In FIG. 13A, a first gaming event is initiated where five cards 1320 from a deck of cards is selected to be dealt in the poker hand 1310. These dealt cards 1320 are displayed and signals are received from player inputs to hold none, some, or all of the cards in the poker hand 1310. Replacement cards from the deck of cards are used to replace any discarded (non-held) cards to complete a final poker hand 1310 for the first gaming event, which is shown in FIG. 13B. Here, the player has held the 8S (8 of spades) and 8D from the dealt hand and has drawn the remaining three cards including an 8H.

This results in a three-of-a-kind for the "8s" (eights), which has a 15 credit award as shown in the Paid meter 1344. Also, because the "8s" were used in a winning hand, a bonus table 1290 appears which shows a multiplier to be used in the next "x" number of gaming events. Here, bonus table 1390 includes a first entry 1391 showing that wins having an "8" card included will receive an extra "12×" multiplier for any awards, provided that the win occurs in the next seven games. In this example embodiment, all table entries in the bonus table 1390 are given a seven card window to be used. The multiplier value, however, is not fixed and is set at initial value and then decremented for each gaming event. Alternatively, in other embodiments, the multiplier value may be set at an initial value and incremented for each gaming event. Here, the initial value of the multiplier is dependent on the type of winning combination. In this embodiment, since the win was a 3-of-a-kind, the fixed multiplier was a "12×" multiplier. Pairs and two pair wins may be given a "8×" multiplier while quads (4-of-a-kind) may be given a "25×" value. Straights, flushes, and full houses may have a multiplier only associated with one value (such as the highest numbered card in the straight or flush, and the 3-of-a-kind portion of the full house), may have their own entry in the table (i.e., if another straight is received in the next 7 games, a "20×" multiplier is give, etc.), or another rule may be used to include these winning combinations in the bonus table 1390.

Figure 13C:
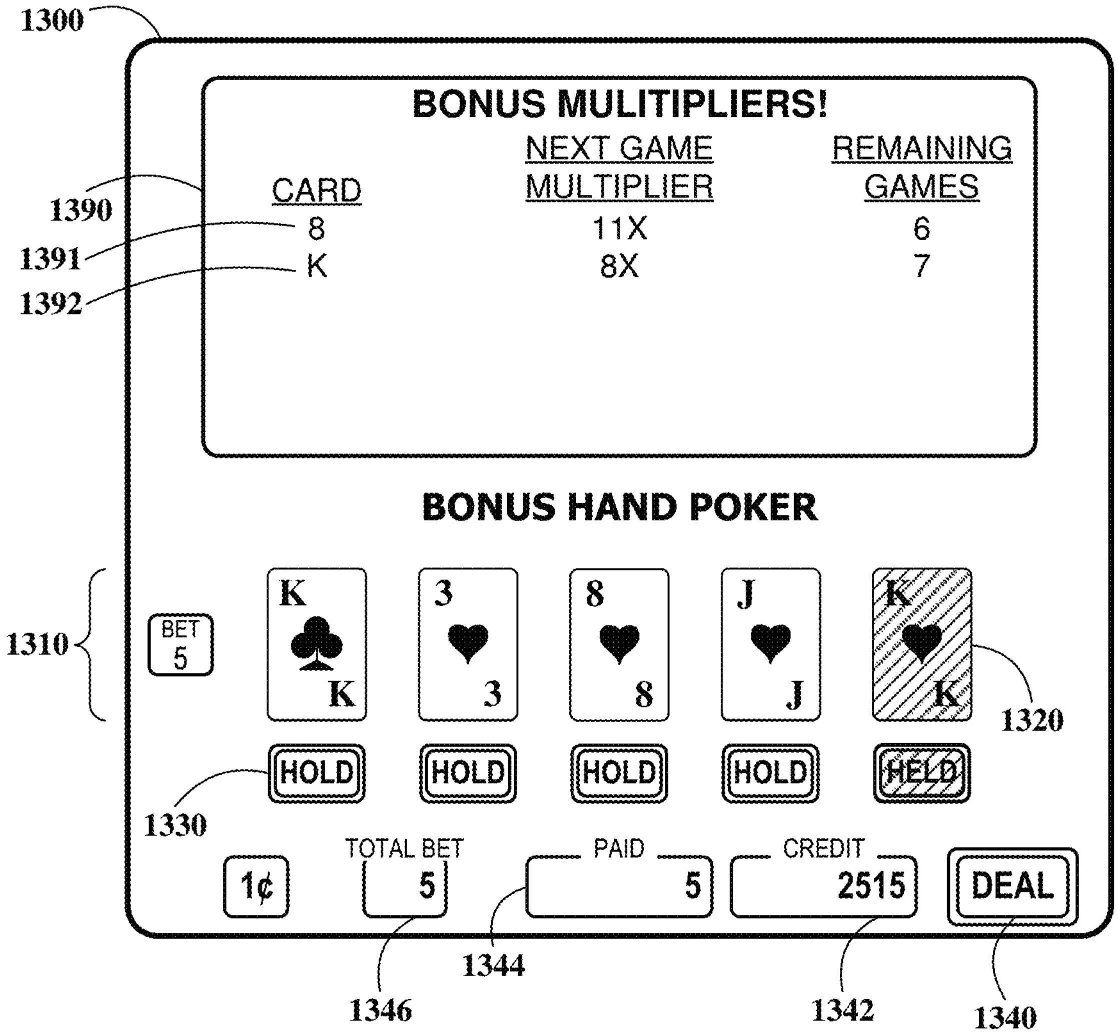
Figure 13D:
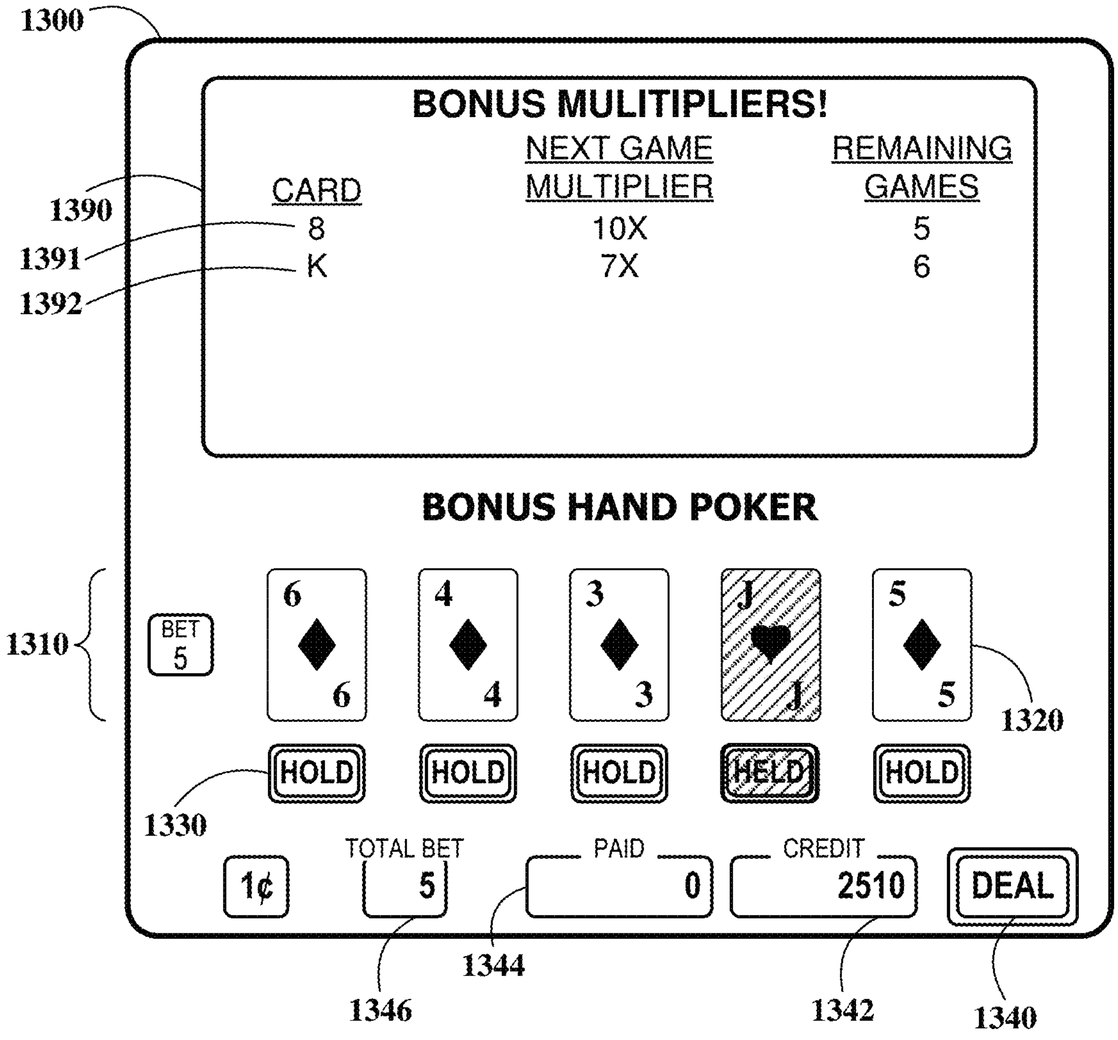

In FIG. 13C, the player has received a pair of kings in the second gaming event on the game display 1300. Here, a second entry 1392 is made in the bonus table 1390, and the number of games remaining and the associated multiplier value for the first entry 1391 are decremented. Here, because the winning combination was a pair of cards, the multiplier associated with the second table entry 1392 is "8×". However, in other embodiments, all winning combinations may have the same multiplier value, or the multiplier value may be chosen at random. In FIG. 13D, the outcome of the third gaming event is shown, and no winning combinations are received. Here, both the first and second entries 1391, 1392 in the bonus table 1390 have their respective remaining game number and next game multiplier value decremented.

Figure 13E:
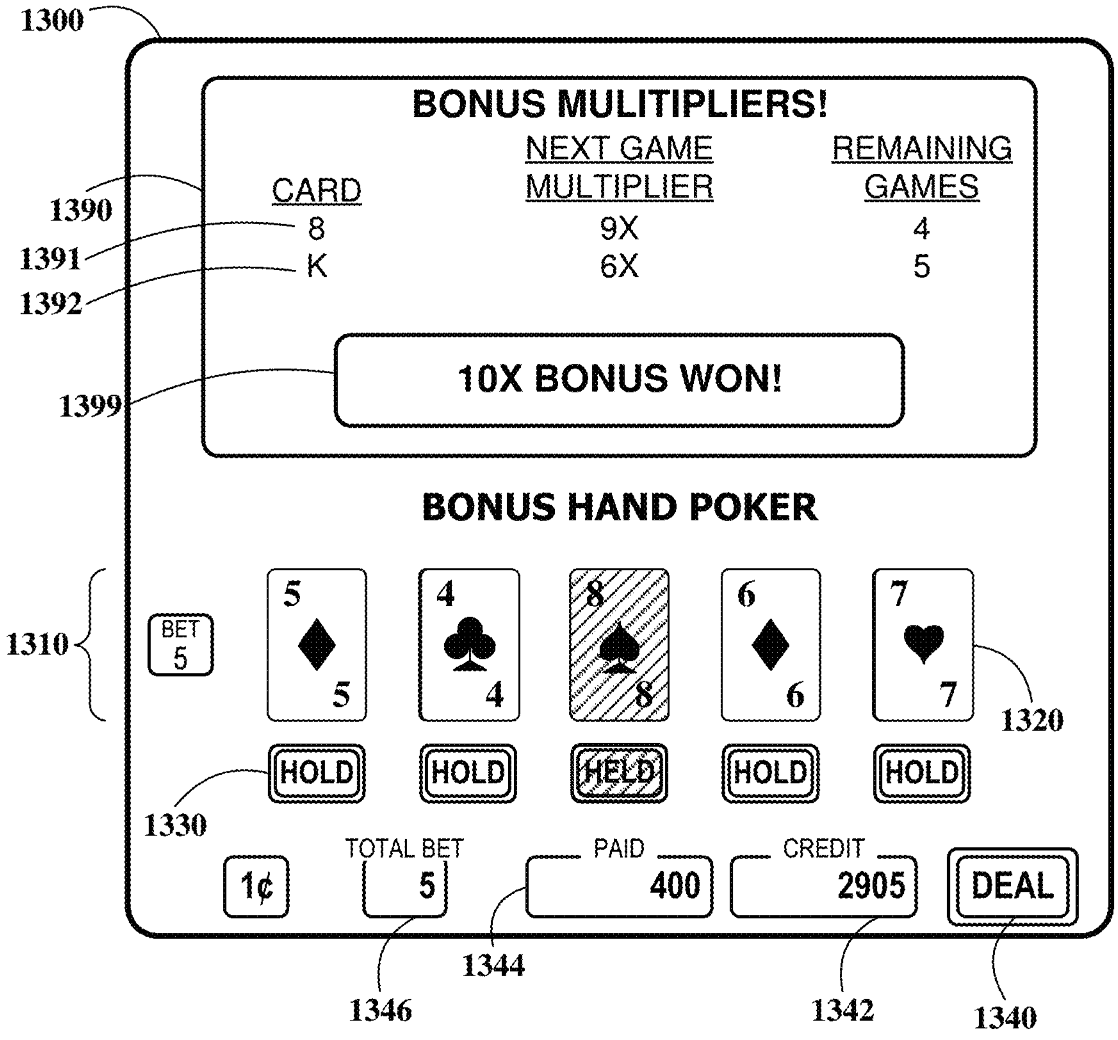

In FIG. 13E, the outcome of the fourth gaming event is shown, where an 8S is received as part of a straight. Hence, because an "8" was part of another winning combination, the award associated with that winning combination is award the multiplier value associated with "8" in the bonus table 1390. Since that multiplier value was "10×" (see FIG. 13D), a message window 1399 is shown with the awarded multiplier and the 20 credits associated with a straight is multiplied by "10×" to give a 400 credit win as shown in the Paid meter 1344. In this embodiment, the first table entry 1391 for the "8s" remains in the bonus table 1390, but has its remaining game number decremented. In other embodiments, the remaining game number could be reset to 7 games and/or the multiplier value could be reset to another "initial" value. Here, since the current win was a straight with "8" as the highest value, the value of the multiplier may be set to the value associated with a straight (20X), the value associated with the straight may be added to the current value of the multiplier (29X), or another technique may be used to set a new higher multiplier value.

Figure 14:
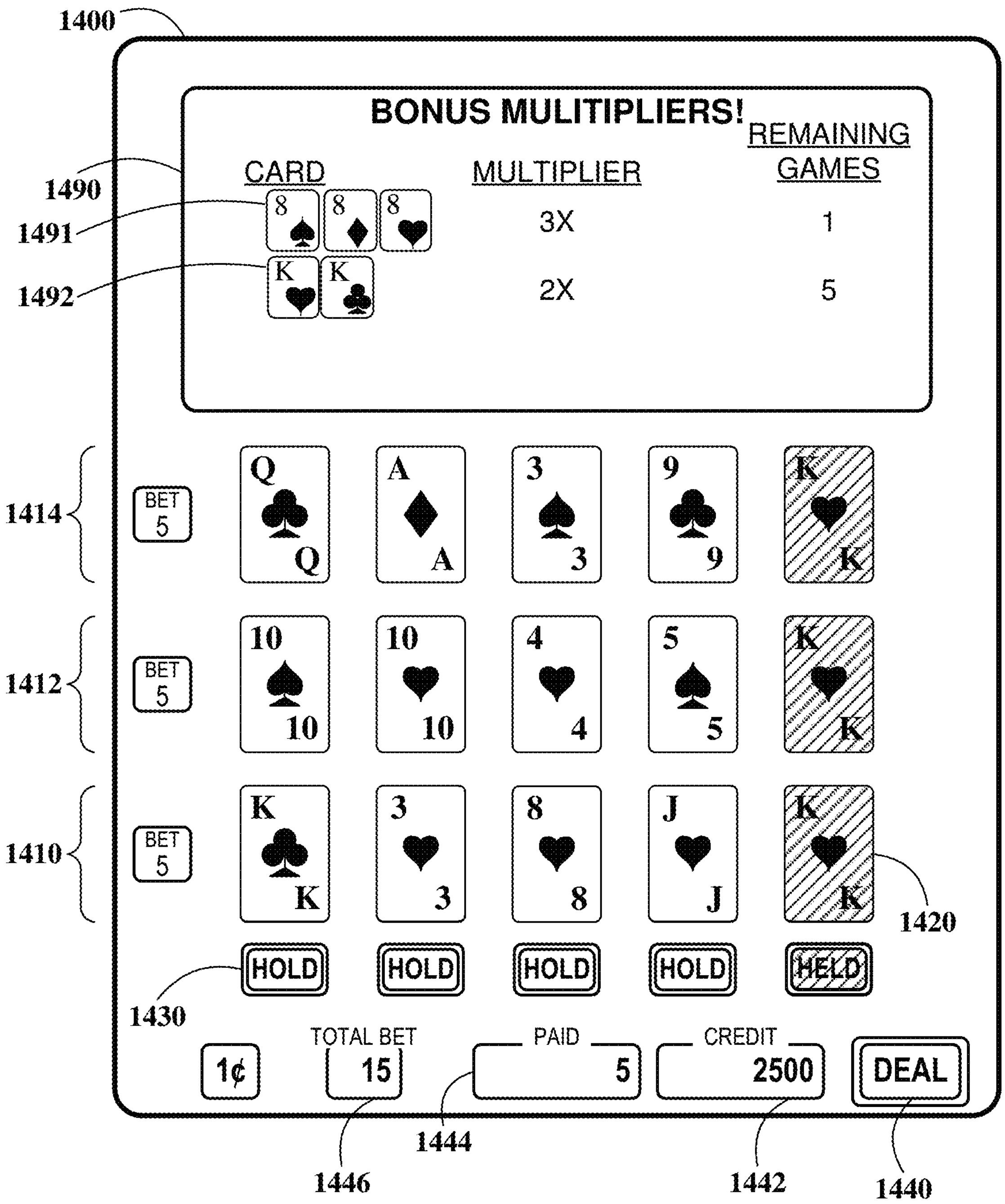
FIG. 14 is a detail diagram of a gaming device display illustrating an example game event according to embodiments of the invention.

FIG. 14 shows a multi-hand poker embodiment using the subsequent symbol-based bonus feature implemented. Referring to FIG. 14, a gaming display 1400 shows a video poker game and includes a first poker hand 1410, a second poker hand 1412, and a third poker hand 1414 in a game play area where each had displays five playing cards 1420. The game display 1400 also includes a control area having various buttons and meters, such as a "Deal" button 1440, a "Total Bet" meter 1446, a "Credit" meter 1442, and a "Paid" meter 1444. Additionally, "Hold" buttons 1430 are provided for each card position in the poker hand 1410. In this embodiment, the result of a gaming event is shown where five cards 1320 from a deck of cards were dealt to the first poker hand 1410. After these dealt cards 1420 were displayed, signals received from player inputs to hold none, some, or all of the cards in the first poker hand 1410, caused cards to be held in each of the first, second, and third poker hands 1410, 1412, 1414. Replacement cards from the deck of cards were then drawn to replace any discarded (non-held) cards in the first poker hand 1410, and separate replacement cards were drawn from separate decks to complete the second poker hand 1412 and third poker hand 1414. The gaming display also includes a bonus table 1490 including bonus entries 1491, 1492. Here, an existing first entry 1491 is associated with any of 8S, 8D, 8H and a new second table entry 1492 is made based on the receipt of the pair of kings from the first poker hand 1410 shown. In this embodiment, the cards values in the table include both the rank and suit of the cards rather than only the card rank as shown in the previous embodiments. These cards may have to be part of another winning symbol combination to have the associated multiplier awarded, or may only have to appear in the final poker hand as described in other embodiments above.

Although some types of poker games are illustrated above, many variations exist for the bonusing of the poker cards or symbols in other poker games. Additionally the above poker examples may be configured to combine other features from other illustrated embodiments or descriptions herein to implement a poker game where bonused cards found in any winning hand create multipliers or other bonuses.

Figure 15:
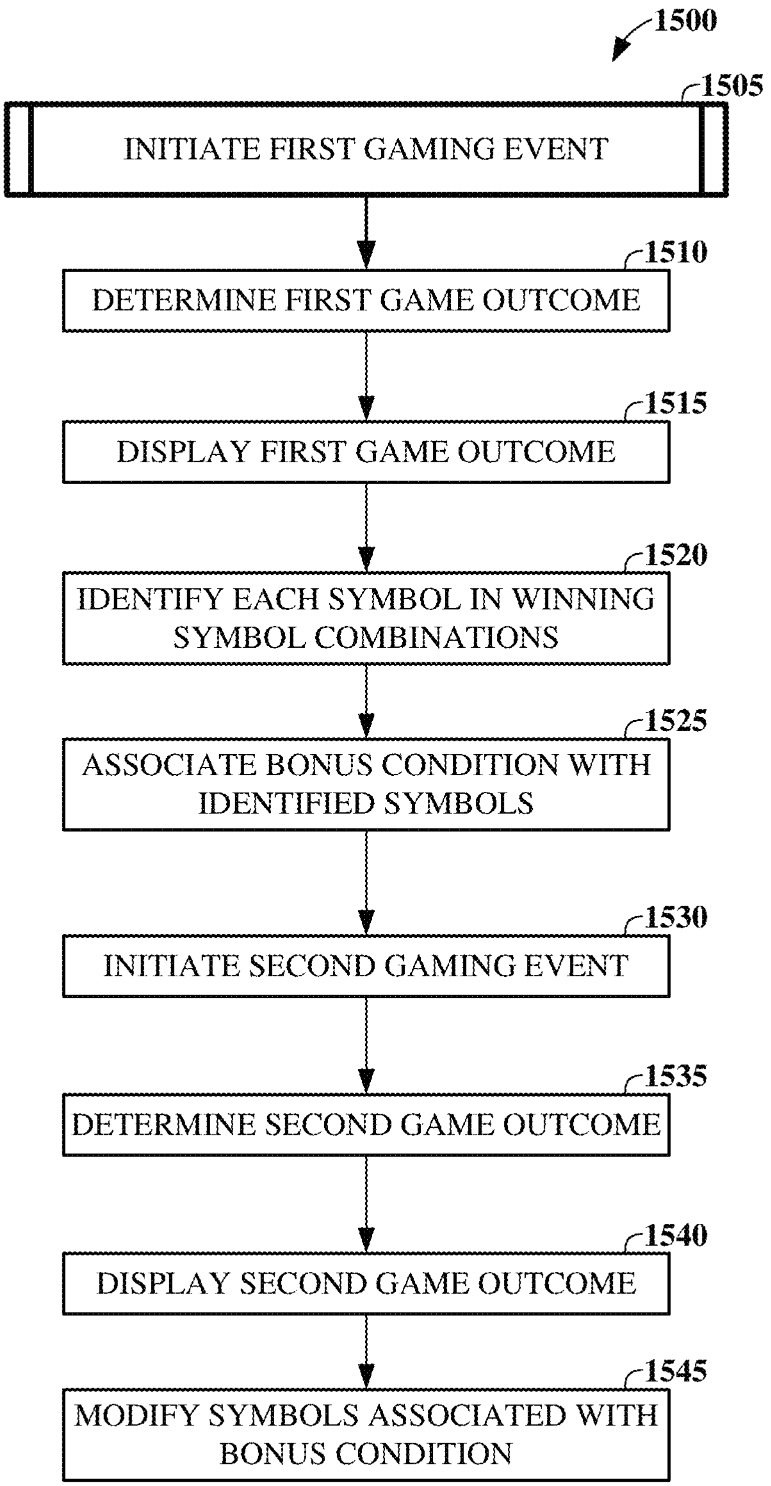
FIG. 15 is a flow diagram showing a method for bonusing symbols in subsequent games of gaming devices based on a current game outcome according to embodiments of the invention.

FIG. 15 is a flow diagram representing methods in which a gaming device and/or gaming system can be operated according to embodiments of the invention. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device. Note that these example methods are just some embodiments of how the steps of a game operation can be implemented. As discussed and shown above, many variations exist which may require additional, fewer, or different processes to complete.

Referring to FIG. 15, flow 1500 begins at process 1505 where a first gaming event is initiated. As discussed above, this gaming event may be a base game event, a "free spin" in a free games bonus, or another type of gaming event. In process 1510, a first game outcome is determined. The first game outcome is displayed on a game display in process 1515. Game circuitry or a game processor identifies symbols in any winning symbol combinations in process 1520. These identified symbols are then associated with bonus conditions that are implemented in one or more subsequent games in process 1525. Theses bonus conditions may be displayed in a message to the player in the first gaming event to inform the player of the bonus situation for the following gaming event, or may not be displayed until a second gaming event is initiated. Either way, the second gaming event is initiated in process 1530, and flow 1500 proceeds to process 1535 to determine a second game outcome. This second game outcome is displayed in process 1540. In process 1545, the symbols associated with a bonus condition from process 1525 are modified to reflect the bonus condition. As discussed above, this modification can take many different forms. For example, a multiplier may be associated with particular symbols so that if they form a winning symbol combination in the second game, the award associated with the winning symbol combination is multiplied by the multiplier. In other examples, individual symbols may be associated with bonus credit values, or have other bonus functionality as discussed above.

Figure 16:
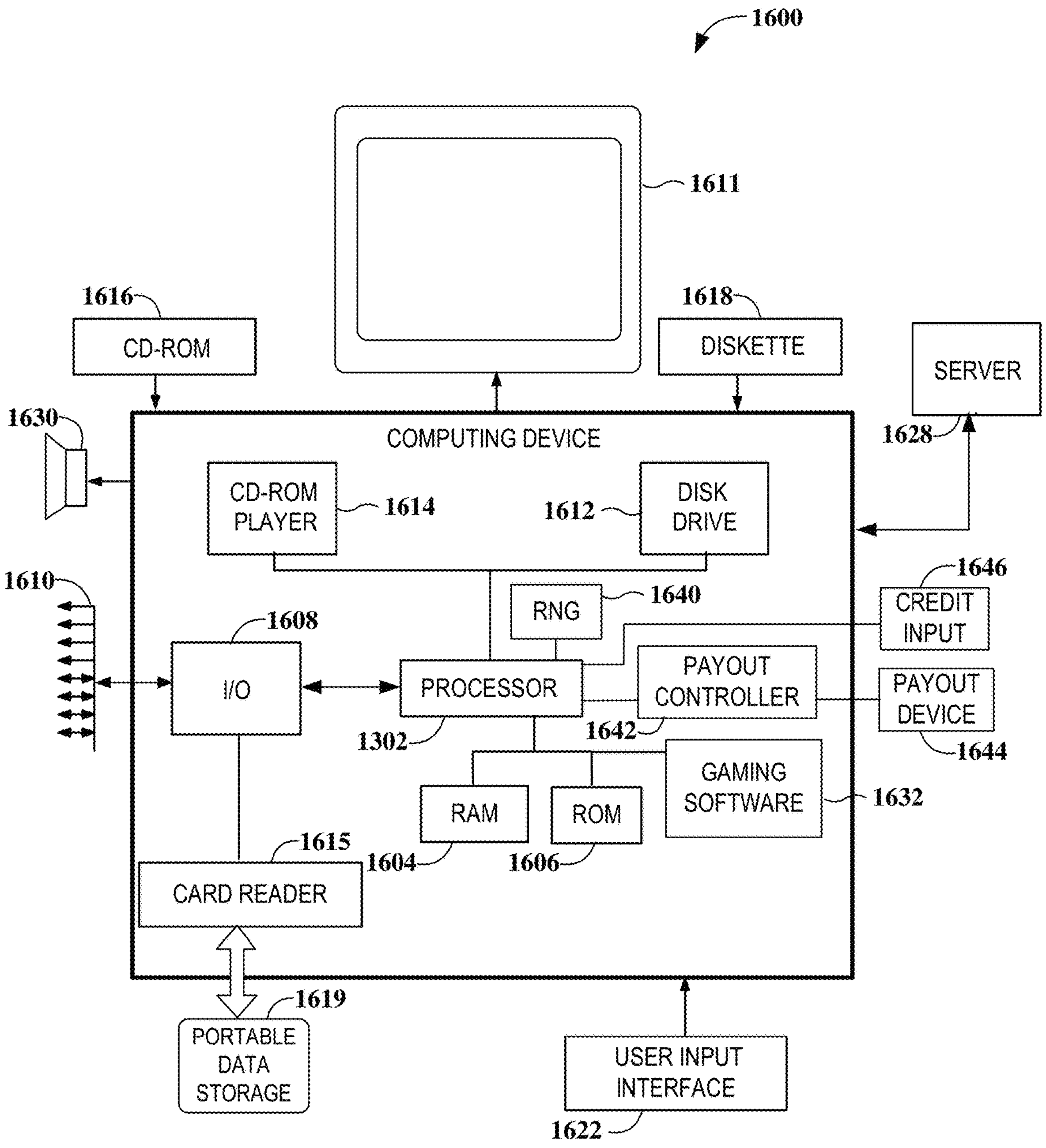
FIG. 16 is a block diagram illustrating a computing arrangement according to embodiments of the invention.

Although FIG. 1 illustrates a particular implementation of some of the embodiments of this invention in a casino or electronic gaming machine ("EGM"), one or more devices may be programmed to play various embodiments of the invention. The present invention may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the invention is illustrated in FIG. 16.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1600 of FIG. 16 is an example computing structure that can be used in connection with such electronic gaming machines, computers, or other computer-implemented devices to carry out operations of the present invention. Although numerous components or elements are shown as part of this computing structure 1600 in FIG. 16, additional or fewer components may be utilized in particular implementations of embodiments of the invention.

The example computing arrangement 1600 suitable for performing the gaming functions in accordance with the present invention typically includes a central processor (CPU) 1602 coupled to random access memory (RAM) 1604 and some variation of read-only memory (ROM) 1606. The ROM 1606 may also represent other types of storage media to store programs, such as programmable ROM (PROM), erasable PROM (EPROM), etc. The processor 1602 may communicate with other internal and external components through input/output (I/O) circuitry 1608 and bussing 1610, to provide control signals, communication signals, and the like.

The computing arrangement 1600 may also include one or more data storage devices, including hard and floppy disk drives 1612, CD-ROM drives 1614, card reader 1615, and other hardware capable of reading and/or storing information such as DVD, etc. In one embodiment, software for carrying out the operations in accordance with the present invention may be stored and distributed on a CD-ROM 1616, diskette 1618, access card 1619, or other form of computer readable media capable of portably storing information. These storage media may be inserted into, and read by, devices such as the CD-ROM drive 1614, the disk drive 1612, card reader 1615, etc. The software may also be transmitted to the computing arrangement 1600 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 1600, such as in the ROM 1606.

The computing arrangement 1600 is coupled to the display 1611, which represents a display on which the gaming activities in accordance with the invention are presented. The display 1611 represents the "presentation" of the game information in accordance with the invention, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 1600 represents a stand-alone or networked computer, the display 1611 may represent a standard computer terminal or display capable of displaying multiple windows, frames, etc. Where the computing device 1600 represents a mobile electronic device, the display 1611 may represent the video display of the mobile electronic device. Where the computing device 1600 is embedded within an electronic gaming machine, the display 1611 corresponds to the display screen of the gaming machine/kiosk.

A user input interface 1622 such as a mouse, keyboard/keypad, microphone, touch pad, trackball, joystick, touch screen, voice-recognition system, card reader, biometric scanner, RFID detector, etc. may be provided. The user input interface 1622 may be used to input commands in the computing arrangement 1600, such as placing wagers or initiating gaming events on the computing arrangement 1600, inputting currency or other payment information to establish a credit amount or wager amount, or inputting data to identify a player for a player loyalty system. The display 1611 may also act as a user input device, e.g., where the display 1611 is a touchscreen device. In embodiments, where the computing device 1600 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs may be implemented using hardware, software operable in connection with the processor 1602, or some combination of hardware and software. The present invention is operable using any known RNG, and may be integrally programmed as part of the processor 1602 operation, or alternatively may be a separate RNG controller 1640. The RNGs are often protected by one or more security measures to prevent tampering, such as by using secured circuitry, locks on the physical game cabinet, and/or remote circuitry that transmits data to the gaming device.

The computing arrangement 1600 may be connected to other computing devices or gaming machines, such as via a network. The computing arrangement 1600 may be connected to a network server 1628 in an intranet or local network configuration. The computer may further be part of a larger network configuration as in a global area network (GAN) such as the Internet. In such a case, the computer may have access to one or more web servers via the Internet. In other arrangements, the computing arrangement 1600 may be configured as an Internet server and software for carrying out the operations in accordance with the present invention may interact with the player via one or more networks. The computing arrangement 1600 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 1600 may also include a payout controller 1642 to receive a signal from the processor 1602 indicating a payout is to made to a player and controlling a payout device 1644 to facilitate payment of the payout to the player. In some embodiments, the payout controller 1642 may independently determine the amount of payout to be provided to the participant or player. In other embodiments, the payout controller 1642 may be integrally implemented with the processor 1602. The payout controller 1642 may be a hopper controller, a print driver, credit-transmitting device, bill-dispensing controller, accounting software, or other controller device configured to verify and/or facilitate payment to a player.

A payout device 1644 may also be provided in gaming machine embodiments, where the payout device 1644 serves as the mechanism providing the payout to the player or participant. In some embodiments, the payout device may be a hopper, where the hopper serves as the mechanism holding the coins/tokens of the machine, and/or distributing the coins/tokens to the player in response to a signal from the payout controller 1642. In other embodiments, the payout device 1644 may be a printer mechanism structured to print credit-based tickets that may be redeemed by the player for cash, credit, or other casino value-based currency. In yet other embodiments, the payout device 1644 may send a signal via the network server 1628 or other device to electronically provide a credit amount to an account associated with the player, such as a credit card account or player loyalty account. The computing arrangement 1600 may also include accounting data stored in one of the memory devices 1604, 1606. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 1646 represents any mechanism for accepting coins, tokens, coupons, bills, electronic fund transfer (EFT), tickets, credit cards, smart cards, membership/loyalty cards, etc., for which a participant inputs a wager amount. The wager input device 1646 may include magnetic strip readers, bar code scanners, light sensors, or other detection devices to identify and validate physical currency, currency-based tickets, cards with magnetized-strips, or other medium inputted into the wager input device. When a particular medium is received in the wager input device 1646, a signal may be generated to establish or increase an available credit amount or balance stored in the internal memory/storage of the computing device 1600, such as in the RAM 1604. Thereafter, specific wagers placed on games may reduce the available credit amount, while awards won may increase the available credit amount. It will be appreciated that the primary gaming software 1632 may be able to control payouts via the payout device 1644 and payout controller 1642 for independently determined payout events.

Among other functions, the computing arrangement 1600 provides an interactive experience to players via an input interface 1622 and output devices, such as the display 1611, speaker 1630, etc. These experiences are generally controlled by gaming software 1632 that controls a primary gaming activity of the computing arrangement 1600. The gaming software 1632 may be temporarily loaded into RAM 1604, and may be stored locally using any combination of ROM 1606, drives 1612, media player 1614, or other computer-readable storage media known in the art. The primary gaming software 1632 may also be accessed remotely, such as via the server 1628 or the Internet.

The primary gaming software 1632 in the computing arrangement 1600 may be an application software module. According to embodiments of the present invention, this software 1632 provides a slot game or similar game of chance as described hereinabove. For example, the software 1632 may present, by way of the display 1611, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1632 may include instructions to provide other functionality as known in the art or as described and shown herein.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out is the appended claims.

The invention claimed is:

1. A video poker gaming machine configured to provide games of chance, the video poker gaming machine comprising:

a video display having a plurality of card positions forming at least one poker hand for play of a video poker game and a bonus indication area;

a wager input device structured to receive physical currency or currency-based tickets, the currency or currency-based tickets establishing a credit balance, the credit balance being increasable or decreasable based at least on wagering activity; and a processor configured to:

receive a signal to initiate a first poker gaming event in response to placement of a wager, the wager decreasing the credit balance;

determine a first game outcome to display on the game grid;

evaluate the game grid for poker hands associated with awards for the first poker gaming event;

provide any awards for the first poker gaming event from the evaluation, where the provided awards increase the credit balance;

when a virtual card is used in a poker hand associated with an award for the first poker gaming event:

indicate the virtual card used in the poker hand associated with the award as a bonus card, display the bonus card in the bonus indication area of the game display, associate a bonus meter with the bonus card, where the bonus meter is initialized with a number of gaming events that the bonus card is active, and randomly determine a bonus multiplier to use with the identified bonus card in a second poker gaming event by randomly selecting the bonus multiplier from a predefined table of possible multipliers;

receive a signal to initiate a second poker gaming event in response to placement of a wager, the wager decreasing the credit balance;

determine a second game outcome to display on the game grid;

evaluate the game grid for poker hands associated with awards for the second poker gaming event;

determine if any of the virtual playing cards associated with awards in the second gaming event include the bonus card;

decrement the bonus meter to reduce the number of gaming events that the bonus card is active;

when poker hands associated with awards in the second gaming event include the bonus card, multiply the awards associated with the poker hands including the bonus card in the second poker gaming event by the bonus multiplier; and provide any awards for the second poker gaming event from the evaluation, where the provided awards increase the credit balance.

* * * * *